(12) United States Patent
Nemecek et al.

(10) Patent No.: US 8,103,497 B1
(45) Date of Patent: Jan. 24, 2012

(54) EXTERNAL INTERFACE FOR EVENT ARCHITECTURE

(75) Inventors: Craig Nemecek, Seattle, WA (US); Steve Roe, Woodinville, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1253 days.

(21) Appl. No.: 10/113,581

(22) Filed: Mar. 28, 2002

(51) Int. Cl.
- G06F 9/455 (2006.01)
- H03K 17/693 (2006.01)
- G01R 31/00 (2006.01)
- G06F 13/28 (2006.01)

(52) U.S. Cl. ........... 703/28; 703/14; 703/15; 703/16; 703/17; 703/23; 716/1; 716/16; 716/17; 716/18; 714/733; 714/734; 710/22

(58) Field of Classification Search .......... 703/28, 703/14, 15, 16, 17, 27, 23; 716/1, 16, 17, 716/18; 714/733, 734; 710/22
See application file for complete search history.

(56) References Cited

U.S. PATENT DOCUMENTS

| 3,600,690 | A | 8/1971 | White |
|---|---|---|---|
| 3,725,804 | A | 4/1973 | Langan |
| 3,740,588 | A | 6/1973 | Stratton et al. |
| 3,805,245 | A | 4/1974 | Brooks et al. |
| 3,810,036 | A | 5/1974 | Bloedom |
| 3,831,113 | A | 8/1974 | Ahmed |
| 3,845,328 | A | 10/1974 | Hollingsworth |
| 3,940,760 | A | 2/1976 | Brokaw |
| 4,061,987 | A | 12/1977 | Nagahama |
| 4,134,073 | A | 1/1979 | MacGregor |
| 4,138,671 | A | 2/1979 | Comer et al. |
| 4,176,258 | A | 11/1979 | Jackson |
| 4,250,464 | A | 2/1981 | Schade, Jr. |
| 4,272,760 | A | 6/1981 | Prazak et al. |
| 4,283,713 | A | 8/1981 | Philipp |
| 4,326,135 | A | 4/1982 | Jarrett et al. |
| 4,344,067 | A | 8/1982 | Lee |
| 4,380,083 | A | 4/1983 | Andersson et al. |
| 4,438,404 | A | 3/1984 | Philipp |
| 4,475,151 | A | 10/1984 | Philipp |
| 4,497,575 | A | 2/1985 | Philipp |
| 4,604,363 | A | 8/1986 | Newhouse et al. |
| 4,608,502 | A | 8/1986 | Dijkmans et al. |

(Continued)

FOREIGN PATENT DOCUMENTS

DE 19710829 A1 9/1998

(Continued)

OTHER PUBLICATIONS

USPTO Notice of Allowance for U.S. Appl. No. 10/238,966 dated Jan. 27, 2009; 4 pages.

(Continued)

*Primary Examiner* — Kamini S Shah
*Assistant Examiner* — Kibrom Gebresilassie

(57) ABSTRACT

A device for monitoring events. The device may have a programmable event engine for detecting events and a memory array coupled to the event engine. The array may store data for programming the event engine to monitor for the events. The device may have an external pin coupled to the event engine. The event engine may monitor a signal on the external pin to detect events external to the device. Alternatively, the device may output a signal on an external pin in response to detecting one of the events.

30 Claims, 26 Drawing Sheets

U.S. PATENT DOCUMENTS

| | | |
|---|---|---|
| 4,656,603 A | 4/1987 | Dunn |
| 4,670,838 A | 6/1987 | Kawata |
| 4,689,740 A | 8/1987 | Moelands et al. |
| 4,692,718 A | 9/1987 | Roza et al. |
| 4,701,907 A | 10/1987 | Collins |
| 4,727,541 A | 2/1988 | Mori et al. |
| 4,736,097 A | 4/1988 | Philipp |
| 4,740,966 A | 4/1988 | Goad |
| 4,755,766 A | 7/1988 | Metz |
| 4,773,024 A | 9/1988 | Faggin et al. |
| 4,794,558 A | 12/1988 | Thompson |
| 4,802,103 A | 1/1989 | Faggin et al. |
| 4,802,119 A | 1/1989 | Heene et al. |
| 4,807,183 A | 2/1989 | Kung et al. |
| 4,809,345 A | 2/1989 | Tabata et al. |
| 4,812,684 A | 3/1989 | Yamagiwa et al. |
| 4,813,013 A | 3/1989 | Dunn |
| 4,814,646 A * | 3/1989 | Hoberman et al. ............. 326/43 |
| 4,827,401 A | 5/1989 | Hrustich et al. |
| 4,831,546 A | 5/1989 | Mitsuta et al. |
| 4,833,418 A | 5/1989 | Quintus et al. |
| 4,868,525 A | 9/1989 | Dias |
| 4,876,466 A | 10/1989 | Kondou et al. |
| 4,876,534 A | 10/1989 | Mead et al. |
| 4,878,200 A | 10/1989 | Asghar et al. |
| 4,879,461 A | 11/1989 | Philipp |
| 4,879,688 A | 11/1989 | Turner et al. |
| 4,885,484 A | 12/1989 | Gray |
| 4,907,121 A | 3/1990 | Hrassky |
| 4,935,702 A | 6/1990 | Mead et al. |
| 4,939,637 A | 7/1990 | Pawloski |
| 4,942,540 A | 7/1990 | Black et al. |
| 4,947,169 A | 8/1990 | Smith et al. |
| 4,953,928 A | 9/1990 | Anderson et al. |
| 4,962,342 A | 10/1990 | Mead et al. |
| 4,964,074 A | 10/1990 | Suzuki et al. |
| 4,969,087 A | 11/1990 | Tanagawa et al. |
| 4,970,408 A | 11/1990 | Hanke et al. |
| 4,972,372 A | 11/1990 | Ueno |
| 4,977,381 A | 12/1990 | Main |
| 4,980,652 A | 12/1990 | Tarusawa et al. |
| 4,999,519 A | 3/1991 | Kitsukawa et al. |
| 5,043,674 A | 8/1991 | Bonaccio et al. |
| 5,049,758 A | 9/1991 | Mead et al. |
| 5,050,168 A | 9/1991 | Paterson |
| 5,053,949 A | 10/1991 | Allison et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,088,822 A | 2/1992 | Kanda |
| 5,095,284 A | 3/1992 | Mead |
| 5,097,305 A | 3/1992 | Mead et al. |
| 5,099,191 A | 3/1992 | Galler et al. |
| 5,107,146 A | 4/1992 | El-Ayat |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,127,103 A | 6/1992 | Hill et al. |
| 5,128,871 A | 7/1992 | Schmitz |
| 5,136,188 A | 8/1992 | Ha et al. |
| 5,140,197 A | 8/1992 | Grider |
| 5,142,247 A | 8/1992 | Lada et al. |
| 5,144,582 A | 9/1992 | Steele |
| 5,146,106 A | 9/1992 | Anderson et al. |
| 5,150,079 A | 9/1992 | Williams et al. |
| 5,155,836 A | 10/1992 | Jordan et al. |
| 5,159,292 A | 10/1992 | Canfield et al. |
| 5,159,335 A | 10/1992 | Veneruso |
| 5,160,899 A | 11/1992 | Anderson et al. |
| 5,161,124 A | 11/1992 | Love |
| 5,165,054 A | 11/1992 | Platt et al. |
| 5,166,562 A | 11/1992 | Allen et al. |
| 5,175,884 A | 12/1992 | Suarez |
| 5,179,531 A | 1/1993 | Yamaki |
| 5,184,061 A | 2/1993 | Lee et al. |
| 5,198,817 A | 3/1993 | Walden et al. |
| 5,200,751 A | 4/1993 | Smith |
| 5,202,687 A | 4/1993 | Distinti |
| 5,204,549 A | 4/1993 | Platt et al. |
| 5,206,582 A | 4/1993 | Ekstedt et al. |
| 5,220,512 A | 6/1993 | Watkins et al. |
| 5,225,991 A | 7/1993 | Dougherty |
| 5,230,000 A | 7/1993 | Mozingo et al. |
| 5,235,617 A | 8/1993 | Mallard, Jr. |
| 5,241,492 A | 8/1993 | Girardeau, Jr. |
| 5,243,554 A | 9/1993 | Allen et al. |
| 5,245,262 A | 9/1993 | Moody et al. |
| 5,248,843 A | 9/1993 | Billings |
| 5,248,873 A | 9/1993 | Allen et al. |
| 5,258,760 A | 11/1993 | Moody et al. |
| 5,260,592 A | 11/1993 | Mead et al. |
| 5,260,979 A | 11/1993 | Parker et al. |
| 5,270,963 A | 12/1993 | Allen et al. |
| 5,276,407 A | 1/1994 | Mead et al. |
| 5,276,739 A | 1/1994 | Krokstad et al. |
| 5,276,890 A | 1/1994 | Arai |
| 5,280,199 A | 1/1994 | Itakura |
| 5,280,202 A | 1/1994 | Chan et al. |
| 5,289,023 A | 2/1994 | Mead |
| 5,303,329 A | 4/1994 | Mead et al. |
| 5,304,955 A | 4/1994 | Atriss et al. |
| 5,305,017 A | 4/1994 | Gerpheide |
| 5,305,312 A | 4/1994 | Fornek et al. |
| 5,307,381 A | 4/1994 | Ahuja |
| 5,313,618 A | 5/1994 | Pawloski |
| 5,317,202 A | 5/1994 | Waizman |
| 5,319,370 A | 6/1994 | Signore et al. |
| 5,319,771 A | 6/1994 | Takeda |
| 5,321,828 A | 6/1994 | Phillips et al. |
| 5,324,958 A | 6/1994 | Mead et al. |
| 5,325,512 A | 6/1994 | Takahashi |
| 5,329,471 A | 7/1994 | Swoboda et al. |
| 5,331,215 A | 7/1994 | Allen et al. |
| 5,331,315 A | 7/1994 | Crosette |
| 5,331,571 A | 7/1994 | Aronoff et al. |
| 5,334,952 A | 8/1994 | Maddy et al. |
| 5,335,342 A | 8/1994 | Pope et al. |
| 5,336,936 A | 8/1994 | Allen et al. |
| 5,339,213 A | 8/1994 | O'Callaghan |
| 5,339,262 A | 8/1994 | Rostoker et al. |
| 5,341,044 A | 8/1994 | Ahanin et al. |
| 5,341,267 A | 8/1994 | Whitten |
| 5,345,195 A | 9/1994 | Cordoba et al. |
| 5,349,303 A | 9/1994 | Gerpheide |
| 5,355,097 A | 10/1994 | Scott et al. |
| 5,357,626 A | 10/1994 | Johnson et al. |
| 5,361,290 A | 11/1994 | Akiyama |
| 5,371,524 A | 12/1994 | Herczeg et al. |
| 5,371,860 A | 12/1994 | Mura et al. |
| 5,371,878 A | 12/1994 | Coker |
| 5,371,883 A | 12/1994 | Gross et al. |
| 5,374,787 A | 12/1994 | Miller et al. |
| 5,377,333 A | 12/1994 | Nakagoshi et al. |
| 5,378,935 A | 1/1995 | Korhonen et al. |
| 5,381,515 A | 1/1995 | Platt et al. |
| 5,384,467 A | 1/1995 | Plimon et al. |
| 5,384,745 A | 1/1995 | Konishi et al. |
| 5,384,910 A | 1/1995 | Torres |
| 5,390,173 A | 2/1995 | Spinney et al. |
| 5,392,784 A | 2/1995 | Gudaitis |
| 5,394,522 A | 2/1995 | Sanchez-Frank et al. |
| 5,396,245 A | 3/1995 | Rempfer |
| 5,398,261 A | 3/1995 | Marbot |
| 5,399,922 A | 3/1995 | Kiani et al. |
| 5,408,194 A | 4/1995 | Steinbach et al. |
| 5,408,235 A | 4/1995 | Doyle et al. |
| 5,414,308 A | 5/1995 | Lee et al. |
| 5,414,380 A | 5/1995 | Floyd et al. |
| 5,416,895 A | 5/1995 | Anderson et al. |
| 5,422,823 A | 6/1995 | Agrawal et al. |
| 5,424,689 A | 6/1995 | Gillig et al. |
| 5,426,378 A | 6/1995 | Ong |

| Patent No. | Date | Inventor(s) |
|---|---|---|
| 5,426,384 A | 6/1995 | May |
| 5,428,319 A | 6/1995 | Marvin et al. |
| 5,430,395 A | 7/1995 | Ichimaru |
| 5,430,687 A | 7/1995 | Hung et al. |
| 5,430,734 A | 7/1995 | Gilson |
| 5,432,476 A | 7/1995 | Tran |
| 5,438,672 A | 8/1995 | Dey |
| 5,440,305 A | 8/1995 | Signore et al. |
| 5,448,496 A * | 9/1995 | Butts et al. ............... 716/16 |
| 5,451,887 A | 9/1995 | El-Avat et al. |
| 5,453,904 A | 9/1995 | Higashiyama et al. |
| 5,455,525 A | 10/1995 | Ho et al. |
| 5,455,731 A | 10/1995 | Parkinson |
| 5,455,927 A | 10/1995 | Huang |
| 5,457,410 A | 10/1995 | Ting |
| 5,457,479 A | 10/1995 | Cheng |
| 5,463,591 A | 10/1995 | Aimoto et al. |
| 5,479,603 A | 12/1995 | Stone et al. |
| 5,479,643 A | 12/1995 | Bhaskar et al. |
| 5,479,652 A | 12/1995 | Dreyer et al. |
| 5,481,471 A | 1/1996 | Naglestad |
| 5,488,204 A | 1/1996 | Mead et al. |
| 5,491,458 A | 2/1996 | McCune |
| 5,493,246 A | 2/1996 | Anderson |
| 5,493,723 A | 2/1996 | Beck et al. |
| 5,495,077 A | 2/1996 | Miller et al. |
| 5,495,593 A | 2/1996 | Elmer et al. |
| 5,495,594 A | 2/1996 | MacKenna et al. |
| 5,497,119 A | 3/1996 | Tedrow et al. |
| 5,499,192 A | 3/1996 | Knapp et al. |
| 5,500,823 A | 3/1996 | Martin et al. |
| 5,517,198 A | 5/1996 | McEwan |
| 5,519,854 A | 5/1996 | Watt |
| 5,521,529 A | 5/1996 | Agrawal et al. |
| 5,530,444 A | 6/1996 | Tice et al. |
| 5,530,673 A | 6/1996 | Tobita et al. |
| 5,530,813 A | 6/1996 | Paulsen et al. |
| 5,537,057 A | 7/1996 | Leong et al. |
| 5,541,878 A | 7/1996 | LeMoncheck et al. |
| 5,542,055 A | 7/1996 | Amini et al. |
| 5,543,588 A | 8/1996 | Bisset et al. |
| 5,543,590 A | 8/1996 | Gillespie et al. |
| 5,543,591 A | 8/1996 | Gillespie et al. |
| 5,544,067 A | 8/1996 | Rostoker et al. |
| 5,544,311 A | 8/1996 | Harenberg et al. |
| 5,546,433 A | 8/1996 | Tran et al. |
| 5,546,562 A | 8/1996 | Patel |
| 5,552,725 A | 9/1996 | Ray et al. |
| 5,552,748 A | 9/1996 | O'Shaughnessy |
| 5,554,951 A | 9/1996 | Gough |
| 5,555,452 A | 9/1996 | Callaway et al. |
| 5,555,907 A | 9/1996 | Philipp |
| 5,557,762 A | 9/1996 | Okuaki et al. |
| 5,559,502 A | 9/1996 | Schutte |
| 5,559,996 A | 9/1996 | Fujioka et al. |
| 5,563,526 A | 10/1996 | Hastings et al. |
| 5,563,529 A | 10/1996 | Seltzer et al. |
| 5,564,010 A | 10/1996 | Henry et al. |
| 5,564,108 A | 10/1996 | Hunsaker et al. |
| 5,565,658 A | 10/1996 | Gerpheide et al. |
| 5,566,702 A | 10/1996 | Philipp |
| 5,572,665 A | 11/1996 | Nakabayashi et al. |
| 5,572,719 A | 11/1996 | Biesterfeldt |
| 5,574,678 A | 11/1996 | Gorecki |
| 5,574,852 A | 11/1996 | Bakker et al. |
| 5,574,892 A | 11/1996 | Christensen |
| 5,579,353 A | 11/1996 | Parmenter et al. |
| 5,587,945 A | 12/1996 | Lin et al. |
| 5,587,957 A | 12/1996 | Kowalczyk et al. |
| 5,590,354 A | 12/1996 | Klapproth et al. |
| 5,594,388 A | 1/1997 | O'Shaughnessy et al. |
| 5,594,734 A | 1/1997 | Worsley et al. |
| 5,594,876 A | 1/1997 | Getzlaff et al. |
| 5,594,890 A | 1/1997 | Yamaura et al. |
| 5,600,262 A | 2/1997 | Kolze |
| 5,604,466 A | 2/1997 | Dreps et al. |
| 5,608,892 A | 3/1997 | Wakerly |
| 5,614,861 A | 3/1997 | Harada |
| 5,623,500 A * | 4/1997 | Whetsel, Jr. ............... 714/724 |
| 5,625,316 A | 4/1997 | Chambers et al. |
| 5,625,583 A | 4/1997 | Hyatt |
| 5,629,857 A | 5/1997 | Brennan |
| 5,629,891 A | 5/1997 | LeMoncheck et al. |
| 5,630,052 A | 5/1997 | Shah |
| 5,630,057 A | 5/1997 | Hait |
| 5,630,102 A | 5/1997 | Johnson et al. |
| 5,631,577 A | 5/1997 | Freidin et al. |
| 5,633,766 A | 5/1997 | Hase et al. |
| 5,642,295 A | 6/1997 | Smayling |
| 5,646,544 A | 7/1997 | Iadanza |
| 5,646,901 A | 7/1997 | Sharpe-Geisler et al. |
| 5,648,642 A | 7/1997 | Miller et al. |
| 5,651,035 A | 7/1997 | Tozun |
| 5,652,893 A | 7/1997 | Ben-Meir et al. |
| 5,661,433 A | 8/1997 | LaRosa et al. |
| 5,663,900 A | 9/1997 | Bhandari et al. |
| 5,663,965 A | 9/1997 | Seymour |
| 5,664,199 A | 9/1997 | Kuwahara |
| 5,666,480 A | 9/1997 | Leung et al. |
| 5,670,915 A | 9/1997 | Cooper et al. |
| 5,673,198 A | 9/1997 | Lawman et al. |
| 5,675,825 A | 10/1997 | Dreyer et al. |
| 5,677,691 A | 10/1997 | Hosticka et al. |
| 5,680,070 A | 10/1997 | Anderson et al. |
| 5,682,032 A | 10/1997 | Philipp |
| 5,684,434 A | 11/1997 | Mann et al. |
| 5,684,721 A * | 11/1997 | Swoboda et al. ............... 703/23 |
| 5,684,952 A | 11/1997 | Stein |
| 5,686,844 A | 11/1997 | Hull et al. |
| 5,687,325 A | 11/1997 | Chang |
| 5,689,195 A | 11/1997 | Cliff et al. |
| 5,689,196 A | 11/1997 | Schutte |
| 5,691,664 A | 11/1997 | Anderson et al. |
| 5,691,898 A | 11/1997 | Rosenberg et al. |
| 5,694,063 A | 12/1997 | Burlison et al. |
| 5,696,952 A | 12/1997 | Pontarelli |
| 5,699,024 A | 12/1997 | Manlove et al. |
| 5,703,871 A | 12/1997 | Pope et al. |
| 5,706,453 A | 1/1998 | Cheng et al. |
| 5,708,589 A | 1/1998 | Beauvais |
| 5,708,798 A | 1/1998 | Lynch et al. |
| 5,710,906 A | 1/1998 | Ghosh et al. |
| 5,712,969 A | 1/1998 | Zimmermann et al. |
| 5,721,931 A | 2/1998 | Gephardt et al. |
| 5,724,009 A | 3/1998 | Collins et al. |
| 5,727,170 A | 3/1998 | Mitchell et al. |
| 5,728,933 A | 3/1998 | Schultz et al. |
| 5,729,704 A | 3/1998 | Stone et al. |
| 5,730,165 A | 3/1998 | Philipp |
| 5,732,277 A | 3/1998 | Kodosky et al. |
| 5,734,272 A | 3/1998 | Belot et al. |
| 5,734,334 A | 3/1998 | Hsieh et al. |
| 5,737,557 A | 4/1998 | Sullivan |
| 5,737,760 A | 4/1998 | Grimmer et al. |
| 5,745,011 A | 4/1998 | Scott |
| 5,748,048 A | 5/1998 | Moyal |
| 5,748,875 A | 5/1998 | Tzori |
| 5,752,013 A | 5/1998 | Christensen et al. |
| 5,754,552 A | 5/1998 | Allmond et al. |
| 5,754,826 A | 5/1998 | Gamal et al. |
| 5,757,368 A | 5/1998 | Gerpheide et al. |
| 5,758,058 A | 5/1998 | Milburn |
| 5,761,128 A | 6/1998 | Watanabe |
| 5,763,909 A | 6/1998 | Mead et al. |
| 5,764,714 A | 6/1998 | Stansell et al. |
| 5,767,457 A | 6/1998 | Gerpheide et al. |
| 5,774,704 A | 6/1998 | Williams |
| 5,777,399 A | 7/1998 | Shibuya |
| 5,781,030 A | 7/1998 | Agrawal et al. |
| 5,781,747 A | 7/1998 | Smith et al. |
| 5,784,545 A | 7/1998 | Anderson et al. |
| 5,790,957 A | 8/1998 | Heidari |
| 5,796,183 A | 8/1998 | Hourmand |
| 5,799,176 A | 8/1998 | Kapusta et al. |
| 5,801,958 A | 9/1998 | Dangelo et al. |
| 5,802,073 A | 9/1998 | Platt |
| 5,802,290 A | 9/1998 | Casselman |
| 5,805,792 A | 9/1998 | Swoboda et al. |

| | | | | | | |
|---|---|---|---|---|---|---|
| 5,805,897 A | 9/1998 | Glowny | | 5,943,052 A | 8/1999 | Allen et al. |
| 5,808,883 A | 9/1998 | Hawkes | | 5,945,878 A | 8/1999 | Westwick et al. |
| 5,811,987 A | 9/1998 | Ashmore, Jr. et al. | | 5,949,632 A | 9/1999 | Barreras, Sr. et al. |
| 5,812,698 A | 9/1998 | Platt et al. | | 5,951,704 A * | 9/1999 | Sauer et al. .................. 714/736 |
| 5,818,254 A | 10/1998 | Agrawal et al. | | 5,952,888 A | 9/1999 | Scott |
| 5,818,444 A | 10/1998 | Alimpich et al. | | 5,956,279 A | 9/1999 | Mo et al. |
| 5,818,736 A | 10/1998 | Leibold | | 5,959,871 A | 9/1999 | Pierzchala et al. |
| 5,819,028 A | 10/1998 | Manghirmalani et al. | | 5,963,075 A | 10/1999 | Hiiragizawa |
| 5,822,387 A | 10/1998 | Mar | | 5,963,105 A | 10/1999 | Nguyen |
| 5,822,531 A | 10/1998 | Gorczyca et al. | | 5,963,503 A | 10/1999 | Lee |
| 5,828,693 A | 10/1998 | Mays et al. | | 5,964,893 A | 10/1999 | Circello et al. |
| 5,829,054 A * | 10/1998 | Ehlig et al. .................. 711/202 | | 5,966,027 A | 10/1999 | Kapusta et al. |
| 5,838,583 A | 11/1998 | Varadarajan et al. | | 5,966,532 A | 10/1999 | McDonald et al. |
| 5,841,078 A | 11/1998 | Miller et al. | | 5,968,135 A | 10/1999 | Teramoto et al. |
| 5,841,996 A | 11/1998 | Nolan et al. | | 5,969,513 A | 10/1999 | Clark |
| 5,844,256 A | 12/1998 | Mead et al. | | 5,969,632 A | 10/1999 | Diamant et al. |
| 5,844,404 A | 12/1998 | Caser et al. | | 5,973,368 A | 10/1999 | Pearce et al. |
| 5,848,285 A | 12/1998 | Kapusta et al. | | 5,974,235 A | 10/1999 | Nunally et al. |
| 5,850,156 A | 12/1998 | Wittman | | 5,977,791 A | 11/1999 | Veenstra |
| 5,852,733 A | 12/1998 | Chien et al. | | 5,978,584 A | 11/1999 | Nishibata et al. |
| 5,854,625 A | 12/1998 | Frisch et al. | | 5,978,937 A | 11/1999 | Miyamori et al. |
| 5,857,109 A | 1/1999 | Taylor | | 5,982,105 A | 11/1999 | Masters |
| 5,861,583 A | 1/1999 | Schediwy et al. | | 5,982,229 A | 11/1999 | Wong et al. |
| 5,861,875 A | 1/1999 | Gerpheide | | 5,982,241 A | 11/1999 | Nguyen et al. |
| 5,864,242 A | 1/1999 | Allen et al. | | 5,983,277 A | 11/1999 | Heile et al. |
| 5,864,392 A | 1/1999 | Winklhofer et al. | | 5,986,479 A | 11/1999 | Mohan |
| 5,867,046 A | 2/1999 | Sugasawa | | 5,987,246 A | 11/1999 | Thomsen et al. |
| 5,867,399 A | 2/1999 | Rostoker et al. | | 5,988,902 A | 11/1999 | Holehan |
| 5,869,979 A | 2/1999 | Bocchino | | 5,994,939 A | 11/1999 | Johnson et al. |
| 5,870,004 A | 2/1999 | Lu | | 5,996,032 A | 11/1999 | Baker |
| 5,870,309 A | 2/1999 | Lawman | | 5,999,725 A | 12/1999 | Barbier et al. |
| 5,870,345 A | 2/1999 | Stecker | | 6,002,268 A | 12/1999 | Sasaki et al. |
| 5,872,464 A | 2/1999 | Gradinariu | | 6,002,398 A | 12/1999 | Wilson |
| 5,874,958 A | 2/1999 | Ludolph | | 6,003,054 A | 12/1999 | Oshima et al. |
| 5,875,293 A | 2/1999 | Bell et al. | | 6,003,107 A | 12/1999 | Ranson et al. |
| 5,877,656 A | 3/1999 | Mann et al. | | 6,003,133 A | 12/1999 | Moughanni et al. |
| 5,878,425 A | 3/1999 | Redpath | | 6,005,814 A | 12/1999 | Mulholland et al. |
| 5,880,411 A | 3/1999 | Gillespie et al. | | 6,005,904 A | 12/1999 | Knapp et al. |
| 5,880,598 A | 3/1999 | Duong | | 6,008,685 A | 12/1999 | Kunst |
| 5,883,623 A | 3/1999 | Cseri | | 6,008,703 A | 12/1999 | Perrott et al. |
| 5,886,582 A | 3/1999 | Stansell | | 6,009,270 A | 12/1999 | Mann |
| 5,887,189 A | 3/1999 | Birns et al. | | 6,009,496 A | 12/1999 | Tsai |
| 5,889,236 A | 3/1999 | Gillespie et al. | | 6,011,407 A | 1/2000 | New |
| 5,889,723 A | 3/1999 | Pascucci | | 6,012,835 A | 1/2000 | Thompson et al. |
| 5,889,936 A | 3/1999 | Chan | | 6,014,135 A | 1/2000 | Fernandes |
| 5,889,988 A | 3/1999 | Held | | 6,014,509 A | 1/2000 | Furtek et al. |
| 5,894,226 A | 4/1999 | Koyama | | 6,014,723 A | 1/2000 | Tremblay et al. |
| 5,894,243 A | 4/1999 | Hwang | | 6,016,554 A | 1/2000 | Skrovan et al. |
| 5,894,565 A | 4/1999 | Furtek et al. | | 6,016,563 A | 1/2000 | Fleisher |
| 5,895,494 A | 4/1999 | Scalzi et al. | | 6,018,559 A | 1/2000 | Azegami et al. |
| 5,896,068 A | 4/1999 | Moyal | | 6,023,422 A | 2/2000 | Allen et al. |
| 5,896,330 A | 4/1999 | Gibson | | 6,023,565 A | 2/2000 | Lawman et al. |
| 5,898,345 A | 4/1999 | Namura et al. | | 6,026,134 A | 2/2000 | Duffy et al. |
| 5,900,780 A | 5/1999 | Hirose et al. | | 6,026,501 A | 2/2000 | Hohl et al. |
| 5,901,062 A | 5/1999 | Burch et al. | | 6,028,271 A | 2/2000 | Gillespie et al. |
| 5,903,718 A | 5/1999 | Marik | | 6,028,959 A | 2/2000 | Wang et al. |
| 5,905,398 A | 5/1999 | Todsen et al. | | 6,031,365 A | 2/2000 | Sharpe-Geisler |
| 5,909,544 A | 6/1999 | Anderson, II et al. | | 6,032,268 A | 2/2000 | Swoboda et al. |
| 5,911,059 A * | 6/1999 | Profit, Jr. .................. 703/23 | | 6,034,538 A | 3/2000 | Abramovici |
| 5,914,465 A | 6/1999 | Allen et al. | | 6,035,320 A | 3/2000 | Kiriaki et al. |
| 5,914,633 A | 6/1999 | Comino et al. | | 6,037,807 A | 3/2000 | Wu et al. |
| 5,914,708 A | 6/1999 | LaGrange et al. | | 6,038,551 A | 3/2000 | Barlow et al. |
| 5,917,356 A | 6/1999 | Casal et al. | | 6,041,406 A | 3/2000 | Mann |
| 5,920,310 A | 7/1999 | Faggin et al. | | 6,043,695 A | 3/2000 | O'Sullivan |
| 5,923,264 A | 7/1999 | Lavelle et al. | | 6,043,719 A | 3/2000 | Lin et al. |
| 5,926,566 A | 7/1999 | Wang et al. | | 6,049,223 A | 4/2000 | Lytle et al. |
| 5,929,710 A | 7/1999 | Bien | | 6,049,225 A | 4/2000 | Huang et al. |
| 5,930,148 A | 7/1999 | Bjorksten et al. | | 6,051,772 A | 4/2000 | Cameron et al. |
| 5,930,150 A | 7/1999 | Cohen et al. | | 6,052,035 A | 4/2000 | Nolan et al. |
| 5,931,959 A | 8/1999 | Kwiat | | 6,052,524 A | 4/2000 | Pauna |
| 5,933,023 A | 8/1999 | Young | | 6,055,584 A | 4/2000 | Bridges et al. |
| 5,933,356 A | 8/1999 | Rostoker et al. | | 6,057,705 A | 5/2000 | Wojewoda et al. |
| 5,933,816 A | 8/1999 | Zeanah et al. | | 6,058,263 A | 5/2000 | Voth |
| 5,935,233 A | 8/1999 | Jeddeloh | | 6,058,452 A | 5/2000 | Rangasayee et al. |
| 5,935,266 A | 8/1999 | Thurnhofer et al. | | 6,061,511 A | 5/2000 | Marantz et al. |
| 5,939,904 A | 8/1999 | Fetterman et al. | | 6,066,961 A | 5/2000 | Lee et al. |
| 5,939,949 A | 8/1999 | Olgaard et al. | | 6,070,003 A | 5/2000 | Gove et al. |
| 5,941,991 A | 8/1999 | Kageshima | | 6,072,803 A | 6/2000 | Allmond et al. |
| 5,942,733 A | 8/1999 | Allen et al. | | 6,075,941 A | 6/2000 | Itoh et al. |

| | | |
|---|---|---|
| 6,079,985 A | 6/2000 | Wohl et al. |
| 6,081,140 A | 6/2000 | King |
| 6,094,730 A | 7/2000 | Lopez et al. |
| 6,097,211 A | 8/2000 | Couts-Martin et al. |
| 6,097,432 A | 8/2000 | Mead et al. |
| 6,101,457 A | 8/2000 | Barch et al. |
| 6,101,617 A | 8/2000 | Burckhartt et al. |
| 6,104,217 A | 8/2000 | Magana |
| 6,104,325 A | 8/2000 | Liaw et al. |
| 6,107,769 A | 8/2000 | Saylor et al. |
| 6,107,826 A | 8/2000 | Young et al. |
| 6,107,882 A | 8/2000 | Gabara et al. |
| 6,110,223 A | 8/2000 | Southgate et al. |
| 6,111,431 A | 8/2000 | Estrada |
| 6,112,264 A | 8/2000 | Beasley et al. |
| 6,121,791 A | 9/2000 | Abbott |
| 6,121,805 A | 9/2000 | Thamsirianunt et al. |
| 6,121,965 A | 9/2000 | Kenney et al. |
| 6,125,416 A | 9/2000 | Warren |
| 6,130,548 A | 10/2000 | Koifman |
| 6,130,551 A | 10/2000 | Agrawal et al. |
| 6,130,552 A | 10/2000 | Jefferson et al. |
| 6,133,773 A | 10/2000 | Garlepp et al. |
| 6,134,181 A | 10/2000 | Landry |
| 6,134,516 A | 10/2000 | Wang et al. |
| 6,137,308 A | 10/2000 | Nayak |
| 6,140,853 A | 10/2000 | Lo |
| 6,141,376 A | 10/2000 | Shaw |
| 6,141,764 A | 10/2000 | Ezell |
| 6,144,327 A | 11/2000 | Distinti et al. |
| 6,148,104 A | 11/2000 | Wang et al. |
| 6,148,441 A | 11/2000 | Woodward |
| 6,149,299 A | 11/2000 | Aslan et al. |
| 6,150,866 A | 11/2000 | Eto et al. |
| 6,154,064 A | 11/2000 | Proebsting |
| 6,157,024 A | 12/2000 | Chapdelaine et al. |
| 6,157,270 A | 12/2000 | Tso |
| 6,161,199 A | 12/2000 | Szeto et al. |
| 6,166,367 A | 12/2000 | Cho |
| 6,166,960 A | 12/2000 | Marneweck et al. |
| 6,167,077 A | 12/2000 | Ducaroir |
| 6,167,364 A | 12/2000 | Stellenberg et al. |
| 6,167,559 A | 12/2000 | Furtek et al. |
| 6,169,383 B1 | 1/2001 | Sabin et al. |
| 6,172,428 B1 | 1/2001 | Jordan |
| 6,172,571 B1 | 1/2001 | Moyal et al. |
| 6,173,419 B1 | 1/2001 | Barnett |
| 6,175,914 B1 | 1/2001 | Mann |
| 6,175,949 B1 | 1/2001 | Gristede et al. |
| 6,181,163 B1 | 1/2001 | Agrawal et al. |
| 6,183,131 B1 | 2/2001 | Holloway et al. |
| 6,185,127 B1 | 2/2001 | Myers et al. |
| 6,185,450 B1 | 2/2001 | Seguine et al. |
| 6,185,522 B1 | 2/2001 | Bakker |
| 6,185,703 B1 | 2/2001 | Guddat et al. |
| 6,185,732 B1 | 2/2001 | Mann et al. |
| 6,188,228 B1 | 2/2001 | Philipp |
| 6,188,241 B1 | 2/2001 | Gauthier et al. |
| 6,188,381 B1 | 2/2001 | van der Wal et al. |
| 6,188,391 B1 | 2/2001 | Seely et al. |
| 6,188,975 B1 | 2/2001 | Gay |
| 6,191,603 B1 | 2/2001 | Muradali et al. |
| 6,191,660 B1 | 2/2001 | Mar et al. |
| 6,191,998 B1 | 2/2001 | Reddy et al. |
| 6,192,431 B1 | 2/2001 | Dabral et al. |
| 6,198,303 B1 | 3/2001 | Rangasayee |
| 6,201,407 B1 | 3/2001 | Kapusta et al. |
| 6,201,829 B1 | 3/2001 | Schneider |
| 6,202,044 B1 | 3/2001 | Tzori |
| 6,204,687 B1 | 3/2001 | Schultz et al. |
| 6,205,574 B1 | 3/2001 | Dellinger et al. |
| 6,208,572 B1 | 3/2001 | Adams et al. |
| 6,211,708 B1 | 4/2001 | Klemmer |
| 6,211,715 B1 | 4/2001 | Terauchi |
| 6,211,741 B1 | 4/2001 | Dalmia |
| 6,215,352 B1 | 4/2001 | Sudo |
| 6,216,254 B1 | 4/2001 | Pesce et al. |
| 6,219,729 B1 | 4/2001 | Keats et al. |
| 6,222,528 B1 | 4/2001 | Gerpheide et al. |
| 6,223,144 B1 | 4/2001 | Barnett et al. |
| 6,223,147 B1 | 4/2001 | Bowers |
| 6,223,272 B1 | 4/2001 | Coehlo et al. |
| RE37,195 E | 5/2001 | Kean |
| 6,225,866 B1 | 5/2001 | Kubota et al. |
| 6,236,242 B1 | 5/2001 | Hedberg |
| 6,236,275 B1 | 5/2001 | Dent |
| 6,236,278 B1 | 5/2001 | Olgaard |
| 6,236,593 B1 | 5/2001 | Hong et al. |
| 6,239,389 B1 | 5/2001 | Allen et al. |
| 6,239,798 B1 | 5/2001 | Ludolph et al. |
| 6,240,375 B1 | 5/2001 | Sonoda |
| 6,246,258 B1 | 6/2001 | Lesea |
| 6,246,410 B1 | 6/2001 | Bergeron et al. |
| 6,249,167 B1 | 6/2001 | Oguchi et al. |
| 6,249,447 B1 | 6/2001 | Boylan et al. |
| 6,253,250 B1 | 6/2001 | Evans et al. |
| 6,253,754 B1 | 7/2001 | Roohparvar |
| 6,256,754 B1 | 7/2001 | Roohparvar |
| 6,262,717 B1 | 7/2001 | Donohue et al. |
| 6,263,302 B1 | 7/2001 | Hellestrand et al. |
| 6,263,339 B1 | 7/2001 | Hirsch |
| 6,263,484 B1 | 7/2001 | Yang |
| 6,271,679 B1 | 8/2001 | McClintock et al. |
| 6,272,646 B1 | 8/2001 | Rangasayee |
| 6,275,117 B1 | 8/2001 | Abugharbieh et al. |
| 6,278,568 B1 | 8/2001 | Cloke et al. |
| 6,280,391 B1 | 8/2001 | Olson et al. |
| 6,281,753 B1 | 8/2001 | Corsi et al. |
| 6,282,547 B1 | 8/2001 | Hirsch |
| 6,282,551 B1 | 8/2001 | Anderson et al. |
| 6,286,127 B1 | 9/2001 | King et al. |
| 6,288,707 B1 | 9/2001 | Philipp |
| 6,289,300 B1 | 9/2001 | Brannick et al. |
| 6,289,478 B1 | 9/2001 | Kitagaki |
| 6,289,489 B1 | 9/2001 | Bold et al. |
| 6,292,028 B1 | 9/2001 | Tomita |
| 6,294,932 B1 | 9/2001 | Watarai |
| 6,294,962 B1 | 9/2001 | Mar |
| 6,298,320 B1 | 10/2001 | Buckmaster et al. |
| 6,304,014 B1 | 10/2001 | England et al. |
| 6,304,101 B1 | 10/2001 | Nishihara |
| 6,304,790 B1 | 10/2001 | Nakamura et al. |
| 6,307,413 B1 | 10/2001 | Dalmia et al. |
| 6,310,521 B1 | 10/2001 | Dalmia |
| 6,310,611 B1 | 10/2001 | Caldwell |
| 6,311,149 B1 | 10/2001 | Ryan et al. |
| 6,314,530 B1 | 11/2001 | Mann |
| 6,320,184 B1 | 11/2001 | Winklhofer et al. |
| 6,320,282 B1 | 11/2001 | Caldwell |
| 6,321,369 B1 | 11/2001 | Heile et al. |
| 6,323,846 B1 | 11/2001 | Westerman et al. |
| 6,324,628 B1 | 11/2001 | Chan |
| 6,326,859 B1 | 12/2001 | Goldman et al. |
| 6,332,137 B1 | 12/2001 | Hori et al. |
| 6,332,201 B1 | 12/2001 | Chin et al. |
| 6,337,579 B1 | 1/2002 | Mochida |
| 6,338,109 B1 | 1/2002 | Snyder et al. |
| 6,339,815 B1 | 1/2002 | Feng et al. |
| 6,342,907 B1 | 1/2002 | Petty et al. |
| 6,345,383 B1 | 2/2002 | Ueki |
| 6,347,395 B1 | 2/2002 | Payne et al. |
| 6,351,789 B1 | 2/2002 | Green |
| 6,353,452 B1 | 3/2002 | Hamada et al. |
| 6,355,980 B1 | 3/2002 | Callahan |
| 6,356,637 B1 * | 3/2002 | Garnett .................. 380/265 |
| 6,356,862 B2 | 3/2002 | Bailey |
| 6,356,958 B1 | 3/2002 | Lin |
| 6,356,960 B1 | 3/2002 | Jones et al. |
| 6,359,950 B2 | 3/2002 | Gossmann et al. |
| 6,362,697 B1 | 3/2002 | Pulvirenti |
| 6,366,174 B1 | 4/2002 | Berry et al. |
| 6,366,300 B1 | 4/2002 | Ohara et al. |
| 6,366,874 B1 | 4/2002 | Lee et al. |
| 6,366,878 B1 | 4/2002 | Grunert |
| 6,369,660 B1 | 4/2002 | Wei |
| 6,371,878 B1 | 4/2002 | Bowen |
| 6,373,954 B1 | 4/2002 | Malcolm et al. |
| 6,374,370 B1 | 4/2002 | Bockhaus et al. |

| Patent No. | Date | Name |
|---|---|---|
| 6,377,009 B1 | 4/2002 | Philipp |
| 6,377,575 B1 | 4/2002 | Mullaney et al. |
| 6,377,646 B1 | 4/2002 | Sha |
| 6,377,912 B1 * | 4/2002 | Sample et al. ................. 703/28 |
| 6,380,811 B1 | 4/2002 | Zarubinsky et al. |
| 6,380,929 B1 | 4/2002 | Platt |
| 6,380,931 B1 | 4/2002 | Gillespie et al. |
| 6,384,947 B1 | 5/2002 | Ackerman et al. |
| 6,385,742 B1 | 5/2002 | Kirsch et al. |
| 6,388,109 B1 | 5/2002 | Schwarz et al. |
| 6,388,464 B1 | 5/2002 | Lacey et al. |
| 6,396,302 B2 | 5/2002 | New et al. |
| 6,396,357 B1 | 5/2002 | Sun et al. |
| 6,396,657 B1 | 5/2002 | Sun et al. |
| 6,397,232 B1 | 5/2002 | Cheng-Hung et al. |
| 6,401,230 B1 | 6/2002 | Ahanessians et al. |
| 6,404,204 B1 | 6/2002 | Farruggia et al. |
| 6,404,445 B1 | 6/2002 | Galea et al. |
| 6,407,953 B1 | 6/2002 | Cleeves |
| 6,408,432 B1 | 6/2002 | Herrmann et al. |
| 6,411,665 B1 | 6/2002 | Chan et al. |
| 6,411,974 B1 | 6/2002 | Graham et al. |
| 6,414,671 B1 | 7/2002 | Gillespie et al. |
| 6,421,698 B1 | 7/2002 | Hong |
| 6,421,817 B1 | 7/2002 | Mohan et al. |
| 6,425,109 B1 | 7/2002 | Choukalos et al. |
| 6,429,882 B1 | 8/2002 | Abdelnur et al. |
| 6,430,305 B1 | 8/2002 | Decker |
| 6,433,645 B1 | 8/2002 | Mann et al. |
| 6,434,187 B1 | 8/2002 | Beard |
| 6,437,805 B1 | 8/2002 | Sojoodi et al. |
| 6,438,565 B1 | 8/2002 | Ammirato et al. |
| 6,438,735 B1 | 8/2002 | McElvain et al. |
| 6,438,738 B1 | 8/2002 | Elayda |
| 6,441,073 B1 | 8/2002 | Tanaka et al. |
| 6,445,211 B1 | 9/2002 | Saripella |
| 6,449,628 B1 | 9/2002 | Wasson |
| 6,449,755 B1 | 9/2002 | Beausang et al. |
| 6,449,761 B1 | 9/2002 | Greidinger et al. |
| 6,452,437 B1 | 9/2002 | Takeuchi et al. |
| 6,452,514 B1 | 9/2002 | Philipp |
| 6,453,175 B2 | 9/2002 | Mizell et al. |
| 6,453,461 B1 | 9/2002 | Chaiken |
| 6,456,304 B1 | 9/2002 | Angiulo et al. |
| 6,457,355 B1 | 10/2002 | Philipp |
| 6,457,479 B1 | 10/2002 | Zhuang et al. |
| 6,460,172 B1 | 10/2002 | Insenser Farre et al. |
| 6,463,488 B1 | 10/2002 | San Juan |
| 6,466,036 B1 | 10/2002 | Philipp |
| 6,466,078 B1 | 10/2002 | Stiff |
| 6,466,898 B1 | 10/2002 | Chan |
| 6,473,069 B1 | 10/2002 | Gerpheide |
| 6,473,825 B1 | 10/2002 | Worley et al. |
| 6,477,691 B1 | 11/2002 | Bergamashi/Rab et al. |
| 6,480,921 B1 | 11/2002 | Mansoorian et al. |
| 6,480,954 B2 * | 11/2002 | Trimberger et al. ............... 713/1 |
| 6,483,343 B1 | 11/2002 | Faith et al. |
| 6,487,700 B1 | 11/2002 | Fukushima |
| 6,489,899 B1 | 12/2002 | Ely et al. |
| 6,490,213 B1 | 12/2002 | Mu et al. |
| 6,492,834 B1 | 12/2002 | Lytle et al. |
| 6,496,969 B2 | 12/2002 | Feng et al. |
| 6,496,971 B1 | 12/2002 | Lesea et al. |
| 6,498,720 B2 | 12/2002 | Glad |
| 6,499,134 B1 | 12/2002 | Buffet et al. |
| 6,499,359 B1 | 12/2002 | Washeleski et al. |
| 6,504,403 B2 | 1/2003 | Bangs et al. |
| 6,507,214 B1 | 1/2003 | Snyder |
| 6,507,215 B1 | 1/2003 | Piasecki et al. |
| 6,507,857 B1 | 1/2003 | Yalcinalp |
| 6,509,758 B2 | 1/2003 | Piasecki et al. |
| 6,512,395 B1 | 1/2003 | Lacey et al. |
| 6,516,428 B2 | 2/2003 | Wenzel et al. |
| 6,522,128 B1 | 2/2003 | Ely et al. |
| 6,523,416 B2 | 2/2003 | Takagi et al. |
| 6,525,593 B1 | 2/2003 | Mar |
| 6,526,556 B1 | 2/2003 | Stoica et al. |
| 6,529,791 B1 | 3/2003 | Takagi |
| 6,530,065 B1 | 3/2003 | McDonald et al. |
| 6,534,970 B1 | 3/2003 | Ely et al. |
| 6,535,061 B2 | 3/2003 | Darmawaskita et al. |
| 6,535,200 B2 | 3/2003 | Philipp |
| 6,535,946 B1 | 3/2003 | Bryant et al. |
| 6,536,028 B1 | 3/2003 | Katsioulas et al. |
| 6,539,534 B1 | 3/2003 | Bennett |
| 6,542,025 B1 | 4/2003 | Kutz et al. |
| 6,542,844 B1 | 4/2003 | Hanna |
| 6,542,845 B1 | 4/2003 | Grucci et al. |
| 6,546,297 B1 | 4/2003 | Gaston et al. |
| 6,552,933 B2 | 4/2003 | Roohparvar |
| 6,553,057 B1 | 4/2003 | Sha |
| 6,554,469 B1 | 4/2003 | Thomson et al. |
| 6,556,044 B2 | 4/2003 | Langhammer et al. |
| 6,557,164 B1 | 4/2003 | Faustini |
| 6,559,685 B2 | 5/2003 | Green |
| 6,560,306 B1 | 5/2003 | Duffy |
| 6,560,699 B1 | 5/2003 | Konkle |
| 6,563,391 B1 | 5/2003 | Mar |
| 6,564,179 B1 | 5/2003 | Belhaj |
| 6,566,961 B2 | 5/2003 | Dasgupta et al. |
| 6,567,426 B1 | 5/2003 | van Hook et al. |
| 6,567,932 B2 | 5/2003 | Edwards et al. |
| 6,567,933 B1 * | 5/2003 | Swoboda et al. ................. 714/31 |
| 6,570,557 B1 | 5/2003 | Westerman et al. |
| 6,571,331 B2 | 5/2003 | Henry et al. |
| 6,571,373 B1 | 5/2003 | Devins et al. |
| 6,574,590 B1 | 6/2003 | Kershaw et al. |
| 6,574,739 B1 | 6/2003 | Kung et al. |
| 6,575,373 B1 | 6/2003 | Nakano |
| 6,577,258 B2 | 6/2003 | Ruha et al. |
| 6,578,174 B2 | 6/2003 | Zizzo |
| 6,580,329 B2 | 6/2003 | Sander |
| 6,581,191 B1 | 6/2003 | Schubert et al. |
| 6,587,093 B1 | 7/2003 | Shaw et al. |
| 6,587,995 B1 | 7/2003 | Duboc et al. |
| 6,588,004 B1 | 7/2003 | Southgate et al. |
| 6,590,422 B1 | 7/2003 | Dillon |
| 6,590,517 B1 | 7/2003 | Swanson |
| 6,590,589 B1 | 7/2003 | Sluiman et al. |
| 6,591,369 B1 | 7/2003 | Edwards et al. |
| 6,592,626 B1 | 7/2003 | Bauchot et al. |
| 6,594,799 B1 | 7/2003 | Robertson et al. |
| 6,597,212 B1 | 7/2003 | Wang et al. |
| 6,597,824 B2 | 7/2003 | Newberg et al. |
| 6,598,178 B1 | 7/2003 | Yee et al. |
| 6,600,346 B1 | 7/2003 | Macaluso |
| 6,600,351 B2 | 7/2003 | Bisanti et al. |
| 6,600,575 B1 | 7/2003 | Kohara |
| 6,601,189 B1 | 7/2003 | Edwards et al. |
| 6,601,236 B1 | 7/2003 | Curtis |
| 6,603,330 B1 | 8/2003 | Snyder |
| 6,603,348 B1 | 8/2003 | Preuss et al. |
| 6,604,179 B2 | 8/2003 | Volk et al. |
| 6,606,731 B1 | 8/2003 | Baum et al. |
| 6,608,472 B1 | 8/2003 | Kutz et al. |
| 6,610,936 B2 | 8/2003 | Gillespie et al. |
| 6,611,220 B1 | 8/2003 | Snyder |
| 6,611,276 B1 | 8/2003 | Muratori et al. |
| 6,611,856 B1 | 8/2003 | Liao et al. |
| 6,611,952 B1 | 8/2003 | Prakash et al. |
| 6,613,098 B1 | 9/2003 | Sorge et al. |
| 6,614,260 B1 | 9/2003 | Welch et al. |
| 6,614,320 B1 | 9/2003 | Sullam et al. |
| 6,614,374 B1 | 9/2003 | Gustavsson et al. |
| 6,614,458 B1 | 9/2003 | Lambert et al. |
| 6,615,167 B1 | 9/2003 | Devins et al. |
| 6,617,888 B2 | 9/2003 | Volk |
| 6,618,854 B1 | 9/2003 | Mann |
| 6,621,356 B2 | 9/2003 | Gotz et al. |
| 6,624,640 B2 | 9/2003 | Lund et al. |
| 6,625,765 B1 | 9/2003 | Krishnan |
| 6,628,163 B2 | 9/2003 | Dathe et al. |
| 6,628,311 B1 | 9/2003 | Fang |
| 6,631,508 B1 | 10/2003 | Williams |
| 6,634,008 B1 | 10/2003 | Dole |
| 6,634,009 B1 | 10/2003 | Molson et al. |
| 6,636,096 B2 | 10/2003 | Schaffer et al. |
| 6,636,169 B1 | 10/2003 | Distinti et al. |

| Patent | Kind | Date | Inventor | Ref |
|---|---|---|---|---|
| 6,637,015 | B1 | 10/2003 | Ogami et al. | |
| 6,639,586 | B2 | 10/2003 | Gerpheide | |
| 6,642,857 | B1 | 11/2003 | Schediwy et al. | |
| 6,643,151 | B1 | 11/2003 | Nebrigic et al. | |
| 6,643,810 | B2 | 11/2003 | Whetsel | |
| 6,649,924 | B1 | 11/2003 | Philipp et al. | |
| 6,650,581 | B2 | 11/2003 | Hong et al. | |
| 6,651,225 | B1 * | 11/2003 | Lin et al. | 716/4 |
| 6,654,934 | B1 * | 11/2003 | Nemecek et al. | 716/4 |
| 6,658,498 | B1 | 12/2003 | Carney et al. | |
| 6,658,633 | B1 | 12/2003 | Devins et al. | |
| 6,661,288 | B2 | 12/2003 | Morgan et al. | |
| 6,661,410 | B2 | 12/2003 | Casebolt et al. | |
| 6,661,724 | B1 | 12/2003 | Snyder et al. | |
| 6,664,978 | B1 | 12/2003 | Kekic et al. | |
| 6,664,991 | B1 | 12/2003 | Chew et al. | |
| 6,667,642 | B1 | 12/2003 | Moyal | |
| 6,667,740 | B2 | 12/2003 | Ely et al. | |
| 6,670,852 | B1 | 12/2003 | Hauck | |
| 6,671,869 | B2 | 12/2003 | Davidson et al. | |
| 6,673,308 | B2 | 1/2004 | Hino et al. | |
| 6,677,814 | B2 | 1/2004 | Low et al. | |
| 6,677,932 | B1 | 1/2004 | Westerman | |
| 6,678,645 | B1 | 1/2004 | Rajsuman et al. | |
| 6,678,877 | B1 | 1/2004 | Perry et al. | |
| 6,680,632 | B1 | 1/2004 | Meyers et al. | |
| 6,680,731 | B2 | 1/2004 | Gerpheide et al. | |
| 6,681,280 | B1 | 1/2004 | Miyake et al. | |
| 6,681,359 | B1 | 1/2004 | Au et al. | |
| 6,683,462 | B2 | 1/2004 | Shimizu | |
| 6,683,930 | B1 | 1/2004 | Dalmia | |
| 6,686,787 | B2 | 2/2004 | Ling | |
| 6,686,860 | B2 | 2/2004 | Gulati et al. | |
| 6,690,224 | B1 | 2/2004 | Moore | |
| 6,691,193 | B1 | 2/2004 | Wang et al. | |
| 6,691,301 | B2 | 2/2004 | Bowen | |
| 6,697,754 | B1 | 2/2004 | Alexander | |
| 6,701,340 | B1 | 3/2004 | Gorecki | |
| 6,701,487 | B1 | 3/2004 | Ogami et al. | |
| 6,701,508 | B1 | 3/2004 | Bartz et al. | |
| 6,703,961 | B2 | 3/2004 | Mueck et al. | |
| 6,704,381 | B1 | 3/2004 | Moyal et al. | |
| 6,704,879 | B1 | 3/2004 | Parrish | |
| 6,704,889 | B2 | 3/2004 | Herrmann et al. | |
| 6,704,893 | B1 | 3/2004 | Bauwens et al. | |
| 6,705,511 | B1 | 3/2004 | Dames et al. | |
| 6,711,226 | B1 | 3/2004 | Williams et al. | |
| 6,711,731 | B2 | 3/2004 | Weiss | |
| 6,713,897 | B2 | 3/2004 | Caldwell | |
| 6,714,066 | B2 | 3/2004 | Gorecki et al. | |
| 6,714,817 | B2 | 3/2004 | Daynes et al. | |
| 6,715,132 | B1 | 3/2004 | Bartz et al. | |
| 6,717,474 | B2 | 4/2004 | Chen et al. | |
| 6,718,294 | B1 | 4/2004 | Bortfeld | |
| 6,718,520 | B1 | 4/2004 | Lautzenheiser et al. | |
| 6,718,533 | B1 * | 4/2004 | Schneider et al. | 717/100 |
| 6,724,220 | B1 | 4/2004 | Snyder et al. | |
| 6,725,441 | B1 | 4/2004 | Keller et al. | |
| 6,728,900 | B1 | 4/2004 | Meli | |
| 6,728,902 | B2 | 4/2004 | Kaiser et al. | |
| 6,730,863 | B1 | 5/2004 | Gerpheide | |
| 6,731,552 | B2 | 5/2004 | Perner | |
| 6,732,068 | B2 | 5/2004 | Sample et al. | |
| 6,732,347 | B1 | 5/2004 | Bixler et al. | |
| 6,738,858 | B1 | 5/2004 | Fernald et al. | |
| 6,744,323 | B1 | 6/2004 | Moyal et al. | |
| 6,745,369 | B1 | 6/2004 | May et al. | |
| 6,748,569 | B1 | 6/2004 | Brooke et al. | |
| 6,750,852 | B2 | 6/2004 | Gillespie | |
| 6,750,876 | B1 | 6/2004 | Atsatt et al. | |
| 6,750,889 | B1 | 6/2004 | Livingston et al. | |
| 6,754,101 | B2 | 6/2004 | Terzioglu et al. | |
| 6,754,723 | B2 | 6/2004 | Kato | |
| 6,754,765 | B1 | 6/2004 | Chang et al. | |
| 6,754,849 | B2 | 6/2004 | Tamura | |
| 6,757,882 | B2 | 6/2004 | Chen et al. | |
| 6,765,407 | B1 | 7/2004 | Snyder | |
| 6,768,337 | B2 | 7/2004 | Kohno et al. | |
| 6,768,352 | B1 | 7/2004 | Maher et al. | |
| 6,769,622 | B1 | 8/2004 | Tournemille et al. | |
| 6,771,552 | B2 | 8/2004 | Fujisawa | |
| 6,774,644 | B2 | 8/2004 | Eberlein | |
| 6,781,456 | B2 | 8/2004 | Pradhan | |
| 6,782,068 | B1 | 8/2004 | Wilson et al. | |
| 6,784,821 | B1 | 8/2004 | Lee | |
| 6,785,881 | B1 | 8/2004 | Bartz et al. | |
| 6,788,116 | B1 | 9/2004 | Cook et al. | |
| 6,788,221 | B1 | 9/2004 | Ely et al. | |
| 6,788,521 | B2 | 9/2004 | Nishi | |
| 6,791,377 | B2 | 9/2004 | Ilchmann et al. | |
| 6,792,584 | B1 | 9/2004 | Eneboe et al. | |
| 6,798,218 | B2 | 9/2004 | Kasperkovitz | |
| 6,798,299 | B1 | 9/2004 | Mar et al. | |
| 6,799,198 | B1 | 9/2004 | Huboi et al. | |
| 6,806,771 | B1 | 10/2004 | Hildebrant et al. | |
| 6,806,782 | B2 | 10/2004 | Motoyoshi et al. | |
| 6,807,254 | B1 * | 10/2004 | Guedalia et al. | 379/88.1 |
| 6,809,275 | B1 | 10/2004 | Cheng et al. | |
| 6,809,566 | B1 | 10/2004 | Xin-LeBlanc | |
| 6,810,442 | B1 | 10/2004 | Lin et al. | |
| 6,815,979 | B2 | 11/2004 | Ooshita | |
| 6,816,544 | B1 | 11/2004 | Bailey et al. | |
| 6,817,005 | B2 | 11/2004 | Mason et al. | |
| 6,819,142 | B2 | 11/2004 | Viehmann et al. | |
| 6,823,282 | B1 | 11/2004 | Snyder | |
| 6,823,497 | B2 | 11/2004 | Schubert et al. | |
| 6,825,689 | B1 | 11/2004 | Snyder | |
| 6,825,869 | B2 | 11/2004 | Bang | |
| 6,828,824 | B2 | 12/2004 | Betz et al. | |
| 6,829,727 | B1 | 12/2004 | Pawloski | |
| 6,834,365 | B2 * | 12/2004 | Bardsley et al. | 714/45 |
| 6,834,384 | B2 | 12/2004 | Fiorella, II et al. | |
| 6,836,169 | B2 | 12/2004 | Richmond et al. | |
| 6,839,774 | B1 | 1/2005 | Ahn et al. | |
| 6,842,710 | B1 | 1/2005 | Gehring et al. | |
| 6,847,203 | B1 | 1/2005 | Conti et al. | |
| 6,850,117 | B2 | 2/2005 | Weber et al. | |
| 6,850,554 | B1 | 2/2005 | Sha | |
| 6,853,598 | B2 | 2/2005 | Chevallier | |
| 6,854,067 | B1 | 2/2005 | Kutz et al. | |
| 6,856,433 | B2 | 2/2005 | Hatano et al. | |
| 6,859,884 | B1 | 2/2005 | Sullam | |
| 6,862,240 | B2 | 3/2005 | Burgan | |
| 6,864,710 | B1 | 3/2005 | Lacey et al. | |
| 6,865,429 | B1 * | 3/2005 | Schneider et al. | 700/86 |
| 6,865,504 | B2 | 3/2005 | Larson et al. | |
| 6,868,500 | B1 | 3/2005 | Kutz et al. | |
| 6,871,253 | B2 | 3/2005 | Greeff et al. | |
| 6,871,331 | B1 | 3/2005 | Bloom et al. | |
| 6,873,203 | B1 | 3/2005 | Latham, II et al. | |
| 6,873,210 | B2 | 3/2005 | Mulder et al. | |
| 6,876,941 | B2 | 4/2005 | Nightingale | |
| 6,880,086 | B2 | 4/2005 | Kidder et al. | |
| 6,888,453 | B2 | 5/2005 | Lutz et al. | |
| 6,888,538 | B2 | 5/2005 | Ely et al. | |
| 6,892,310 | B1 | 5/2005 | Kutz et al. | |
| 6,892,322 | B1 | 5/2005 | Snyder | |
| 6,893,724 | B2 | 5/2005 | Lin et al. | |
| 6,894,928 | B2 | 5/2005 | Owen | |
| 6,897,390 | B2 | 5/2005 | Caldwell et al. | |
| 6,898,703 | B1 | 5/2005 | Ogami et al. | |
| 6,900,663 | B1 | 5/2005 | Roper et al. | |
| 6,901,014 | B2 | 5/2005 | Son et al. | |
| 6,901,563 | B1 | 5/2005 | Ogami et al. | |
| 6,903,402 | B2 | 6/2005 | Miyazawa | |
| 6,903,613 | B1 | 6/2005 | Mitchell et al. | |
| 6,904,570 | B2 | 6/2005 | Foote et al. | |
| 6,910,126 | B1 | 6/2005 | Mar et al. | |
| 6,911,857 | B1 | 6/2005 | Stiff | |
| 6,917,661 | B1 | 7/2005 | Scott et al. | |
| 6,920,416 | B1 * | 7/2005 | Swoboda et al. | 703/13 |
| 6,922,821 | B1 | 7/2005 | Nemecek | |
| 6,924,668 | B2 | 8/2005 | Muller et al. | |
| 6,934,674 | B1 | 8/2005 | Douezy et al. | |
| 6,937,075 | B2 | 8/2005 | Lim et al. | |
| 6,940,356 | B2 | 9/2005 | McDonald et al. | |
| 6,941,336 | B1 | 9/2005 | Mar | |
| 6,941,538 | B2 | 9/2005 | Hwang et al. | |

| Patent No. | Date | Inventor | Ref |
|---|---|---|---|
| 6,944,018 B2 | 9/2005 | Caldwell | |
| 6,949,811 B2 | 9/2005 | Miyazawa | |
| 6,949,984 B2 | 9/2005 | Siniscalchi | |
| 6,950,954 B1 | 9/2005 | Sullam et al. | |
| 6,950,990 B2 | 9/2005 | Rajarajan et al. | |
| 6,952,778 B1 | 10/2005 | Snyder | |
| 6,954,511 B2 | 10/2005 | Tachimori | |
| 6,954,904 B2 | 10/2005 | White | |
| 6,956,419 B1 | 10/2005 | Mann et al. | |
| 6,957,180 B1 | 10/2005 | Nemecek | |
| 6,957,242 B1 | 10/2005 | Snyder | |
| 6,957,257 B1 * | 10/2005 | Buffalo et al. | 709/224 |
| 6,961,686 B2 | 11/2005 | Kodosky et al. | |
| 6,963,233 B2 | 11/2005 | Puccio et al. | |
| 6,963,908 B1 | 11/2005 | Lynch et al. | |
| 6,966,039 B1 | 11/2005 | Bartz et al. | |
| 6,967,511 B1 | 11/2005 | Sullam | |
| 6,967,960 B1 | 11/2005 | Bross et al. | |
| 6,968,346 B2 | 11/2005 | Hekmatpour | |
| 6,969,978 B2 | 11/2005 | Dening | |
| 6,970,844 B1 | 11/2005 | Bierenbaum | |
| 6,971,004 B1 | 11/2005 | Pleis et al. | |
| 6,973,400 B2 | 12/2005 | Cahill-O'Brien et al. | |
| 6,975,123 B1 | 12/2005 | Malang et al. | |
| 6,980,060 B2 | 12/2005 | Boerstler et al. | |
| 6,981,090 B1 | 12/2005 | Kutz et al. | |
| 6,988,192 B2 | 1/2006 | Snider | |
| 6,996,799 B1 | 2/2006 | Cismas et al. | |
| 7,005,933 B1 | 2/2006 | Shutt | |
| 7,009,444 B1 | 3/2006 | Scott | |
| 7,010,773 B1 | 3/2006 | Bartz et al. | |
| 7,015,735 B2 | 3/2006 | Kimura et al. | |
| 7,017,145 B2 | 3/2006 | Taylor | |
| 7,017,409 B2 | 3/2006 | Zielinski et al. | |
| 7,020,854 B2 | 3/2006 | Killian et al. | |
| 7,023,215 B2 | 4/2006 | Steenwyk | |
| 7,023,257 B1 | 4/2006 | Sullam | |
| 7,024,636 B2 | 4/2006 | Weed | |
| 7,024,654 B2 | 4/2006 | Bersch et al. | |
| 7,026,861 B2 | 4/2006 | Steenwyk | |
| 7,030,513 B2 | 4/2006 | Caldwell | |
| 7,030,656 B2 | 4/2006 | Lo et al. | |
| 7,030,688 B2 | 4/2006 | Dosho et al. | |
| 7,030,782 B2 | 4/2006 | Ely et al. | |
| 7,034,603 B2 | 4/2006 | Brady et al. | |
| 7,035,886 B1 * | 4/2006 | Nemecek et al. | 708/200 |
| 7,042,301 B2 | 5/2006 | Sutardja | |
| 7,047,166 B2 | 5/2006 | Dancea | |
| 7,055,035 B2 | 5/2006 | Allison et al. | |
| 7,058,921 B1 | 6/2006 | Hwang et al. | |
| 7,069,231 B1 * | 6/2006 | Cinarkaya et al. | 705/10 |
| 7,073,158 B2 | 7/2006 | McCubbrey | |
| 7,076,420 B1 | 7/2006 | Snyder et al. | |
| 7,079,166 B1 | 7/2006 | Hong | |
| 7,086,014 B1 | 8/2006 | Bartz et al. | |
| 7,088,166 B1 | 8/2006 | Reinschmidt et al. | |
| 7,089,175 B1 | 8/2006 | Nemecek et al. | |
| 7,091,713 B2 | 8/2006 | Erdelyi et al. | |
| 7,092,980 B1 | 8/2006 | Mar et al. | |
| 7,098,414 B2 | 8/2006 | Caldwell | |
| 7,099,818 B1 | 8/2006 | Nemecek | |
| 7,100,133 B1 | 8/2006 | Melyappan et al. | |
| 7,103,108 B1 | 9/2006 | Beard | |
| 7,109,978 B2 | 9/2006 | Gillespie et al. | |
| 7,117,485 B2 | 10/2006 | Wilkinson et al. | |
| 7,119,550 B2 | 10/2006 | Kitano et al. | |
| 7,119,602 B2 | 10/2006 | Davis | |
| 7,124,376 B2 | 10/2006 | Zaidi et al. | |
| 7,127,630 B1 | 10/2006 | Snyder | |
| 7,129,793 B2 | 10/2006 | Gramegna | |
| 7,129,873 B2 | 10/2006 | Kawamura | |
| 7,132,835 B1 | 11/2006 | Arcus | |
| 7,133,140 B2 | 11/2006 | Lukacs et al. | |
| 7,133,793 B2 | 11/2006 | Ely et al. | |
| 7,138,841 B1 | 11/2006 | Li | |
| 7,138,868 B2 | 11/2006 | Sanchez et al. | |
| 7,139,530 B2 | 11/2006 | Kusbel | |
| 7,141,968 B2 | 11/2006 | Hibbs et al. | |
| 7,141,987 B2 | 11/2006 | Hibbs et al. | |
| 7,149,316 B1 | 12/2006 | Kutz et al. | |
| 7,150,002 B1 * | 12/2006 | Anderson et al. | 717/107 |
| 7,151,528 B2 | 12/2006 | Taylor et al. | |
| 7,152,027 B2 | 12/2006 | Adreade et al. | |
| 7,154,294 B2 | 12/2006 | Liu et al. | |
| 7,161,936 B1 | 1/2007 | Barrass et al. | |
| 7,162,410 B1 | 1/2007 | Nemecek et al. | |
| 7,171,455 B1 | 1/2007 | Gupta et al. | |
| 7,176,701 B2 | 2/2007 | Wachi et al. | |
| 7,178,096 B2 | 2/2007 | Rangan et al. | |
| 7,180,342 B1 | 2/2007 | Shutt et al. | |
| 7,185,162 B1 | 2/2007 | Snyder | |
| 7,185,321 B1 | 2/2007 | Roe et al. | |
| 7,188,063 B1 | 3/2007 | Snyder | |
| 7,193,901 B2 | 3/2007 | Ruby et al. | |
| 7,199,783 B2 | 4/2007 | Wenstrand et al. | |
| 7,200,507 B2 | 4/2007 | Chen et al. | |
| 7,206,733 B1 | 4/2007 | Nemecek | |
| 7,212,189 B2 | 5/2007 | Shaw et al | |
| 7,221,187 B1 | 5/2007 | Snyder et al. | |
| 7,227,389 B2 | 6/2007 | Gong et al. | |
| 7,231,339 B1 * | 6/2007 | Nemecek et al. | 703/28 |
| 7,236,921 B1 | 6/2007 | Nemecek et al. | |
| 7,250,825 B2 | 7/2007 | Wilson et al. | |
| 7,256,588 B2 | 8/2007 | Howard et al. | |
| 7,265,633 B1 | 9/2007 | Stiff | |
| 7,266,768 B2 | 9/2007 | Ferlitsch et al. | |
| 7,281,846 B2 | 10/2007 | McLeod | |
| 7,282,905 B2 | 10/2007 | Chen et al. | |
| 7,283,151 B2 | 10/2007 | Nihei et al. | |
| 7,283,410 B2 | 10/2007 | Hsu et al. | |
| 7,287,112 B1 | 10/2007 | Pleis et al. | |
| 7,288,977 B2 | 10/2007 | Stanley | |
| 7,290,244 B2 | 10/2007 | Peck et al. | |
| 7,295,049 B1 | 11/2007 | Moyal et al. | |
| 7,298,124 B2 | 11/2007 | Kan et al. | |
| 7,301,835 B2 | 11/2007 | Joshi et al. | |
| 7,305,510 B2 | 12/2007 | Miller | |
| 7,307,485 B1 | 12/2007 | Snyder et al. | |
| 7,308,608 B1 | 12/2007 | Pleis et al. | |
| 7,312,616 B2 | 12/2007 | Snyder | |
| 7,323,879 B2 | 1/2008 | Kuo et al. | |
| 7,324,380 B2 | 1/2008 | Negut et al. | |
| 7,332,976 B1 | 2/2008 | Brennan | |
| 7,342,405 B2 | 3/2008 | Eldridge et al. | |
| 7,358,714 B2 | 4/2008 | Watanabe et al. | |
| 7,360,117 B1 * | 4/2008 | Boike et al. | 714/34 |
| 7,367,017 B2 | 4/2008 | Maddocks et al. | |
| 7,373,437 B2 | 5/2008 | Seigneret et al. | |
| 7,373,567 B2 * | 5/2008 | Cohn et al. | 714/725 |
| 7,376,001 B2 | 5/2008 | Joshi et al. | |
| 7,376,904 B2 | 5/2008 | Cifra et al. | |
| 7,379,860 B1 * | 5/2008 | Bartz et al. | 703/28 |
| 7,386,740 B2 | 6/2008 | Kutz et al. | |
| 7,392,011 B1 | 6/2008 | Jacomb-Hood | |
| 7,400,183 B1 | 7/2008 | Sivadasan et al. | |
| 7,406,673 B1 * | 7/2008 | Patterson et al. | 716/16 |
| 7,406,674 B1 | 7/2008 | Ogami et al. | |
| 7,421,251 B2 | 9/2008 | Westwick et al. | |
| 7,461,274 B2 | 12/2008 | Merkin | |
| 7,466,307 B2 | 12/2008 | Trent, Jr. et al. | |
| 7,487,502 B2 * | 2/2009 | Wang et al. | 718/102 |
| 7,512,850 B2 * | 3/2009 | Redgrave et al. | 714/725 |
| 7,542,533 B2 | 6/2009 | Jasa et al. | |
| 7,554,847 B2 | 6/2009 | Lee | |
| 7,595,655 B2 * | 9/2009 | Hutchings et al. | 326/16 |
| 7,616,509 B2 | 11/2009 | Qureshi et al. | |
| 7,652,498 B2 * | 1/2010 | Hutchings et al. | 326/38 |
| 7,809,545 B2 | 10/2010 | Ciolfi et al. | |
| 2001/0002129 A1 | 5/2001 | Zimmerman et al. | |
| 2001/0010083 A1 | 7/2001 | Satoh | |
| 2001/0038392 A1 | 11/2001 | Humpleman et al. | |
| 2001/0043081 A1 | 11/2001 | Rees | |
| 2001/0044927 A1 | 11/2001 | Karniewicz | |
| 2001/0045861 A1 | 11/2001 | Bloodworth et al. | |
| 2001/0047509 A1 | 11/2001 | Mason et al. | |
| 2002/0010716 A1 | 1/2002 | McCartney et al. | |
| 2002/0016706 A1 | 2/2002 | Cooke et al. | |
| 2002/0023110 A1 | 2/2002 | Fortin et al. | |

| | | | |
|---|---|---|---|
| 2002/0023203 A1* | 2/2002 | Cofler et al. ............... 712/227 |
| 2002/0026502 A1* | 2/2002 | Phillips et al. ............... 709/219 |
| 2002/0042696 A1 | 4/2002 | Garcia et al. |
| 2002/0052729 A1* | 5/2002 | Kyung et al. ............... 703/28 |
| 2002/0059543 A1 | 5/2002 | Cheng et al. |
| 2002/0063688 A1 | 5/2002 | Shaw et al. |
| 2002/0065646 A1 | 5/2002 | Waldie et al. |
| 2002/0068989 A1 | 6/2002 | Ebisawa et al. |
| 2002/0073119 A1 | 6/2002 | Richard |
| 2002/0073380 A1 | 6/2002 | Cooke et al. |
| 2002/0080186 A1 | 6/2002 | Frederiksen |
| 2002/0085020 A1 | 7/2002 | Carroll, Jr. |
| 2002/0099863 A1 | 7/2002 | Comeau et al. |
| 2002/0109722 A1 | 8/2002 | Rogers et al. |
| 2002/0116168 A1 | 8/2002 | Kim |
| 2002/0121679 A1 | 9/2002 | Bazarjani et al. |
| 2002/0122060 A1 | 9/2002 | Markel |
| 2002/0129334 A1 | 9/2002 | Dane et al. |
| 2002/0133325 A1* | 9/2002 | Hoare et al. ............... 703/17 |
| 2002/0133771 A1 | 9/2002 | Barnett |
| 2002/0133794 A1 | 9/2002 | Kanapathippillai et al. |
| 2002/0138516 A1 | 9/2002 | Igra |
| 2002/0144099 A1 | 10/2002 | Muro, Jr. et al. |
| 2002/0145433 A1 | 10/2002 | Morrise et al. |
| 2002/0152234 A1 | 10/2002 | Estrada et al. |
| 2002/0152449 A1 | 10/2002 | Lin |
| 2002/0156885 A1 | 10/2002 | Thakkar |
| 2002/0156998 A1 | 10/2002 | Casselman |
| 2002/0161802 A1 | 10/2002 | Gabrick et al. |
| 2002/0166100 A1 | 11/2002 | Meding |
| 2002/0174134 A1 | 11/2002 | Goykhman |
| 2002/0174411 A1 | 11/2002 | Feng et al. |
| 2002/0191029 A1 | 12/2002 | Gillespie et al. |
| 2003/0011639 A1 | 1/2003 | Webb |
| 2003/0014447 A1 | 1/2003 | White |
| 2003/0025734 A1 | 2/2003 | Boose et al. |
| 2003/0033588 A1 | 2/2003 | Alexander |
| 2003/0041235 A1 | 2/2003 | Meyer |
| 2003/0056071 A1 | 3/2003 | Triece et al. |
| 2003/0058469 A1 | 3/2003 | Buis et al. |
| 2003/0061572 A1 | 3/2003 | McClannahan et al. |
| 2003/0062889 A1 | 4/2003 | Ely et al. |
| 2003/0066057 A1 | 4/2003 | RuDusky |
| 2003/0080755 A1 | 5/2003 | Kobayashi |
| 2003/0086300 A1 | 5/2003 | Noyes et al. |
| 2003/0097640 A1 | 5/2003 | Abrams et al. |
| 2003/0105620 A1 | 6/2003 | Bowen |
| 2003/0126947 A1 | 7/2003 | Margaria |
| 2003/0135842 A1 | 7/2003 | Frey et al. |
| 2003/0149961 A1 | 8/2003 | Kawai et al. |
| 2003/0229482 A1 | 12/2003 | Cook et al. |
| 2004/0018711 A1 | 1/2004 | Madurawe |
| 2004/0054821 A1 | 3/2004 | Warren et al. |
| 2004/0153802 A1 | 8/2004 | Kudo et al. |
| 2004/0193957 A1* | 9/2004 | Swoboda et al. ............... 714/30 |
| 2004/0205553 A1 | 10/2004 | Hall et al. |
| 2004/0205617 A1 | 10/2004 | Light |
| 2004/0205695 A1 | 10/2004 | Fletcher |
| 2005/0024341 A1 | 2/2005 | Gillespie et al. |
| 2005/0066152 A1 | 3/2005 | Garey |
| 2005/0097547 A1* | 5/2005 | Ramachandran et al. .... 717/177 |
| 2005/0132376 A1* | 6/2005 | Rodgers et al. ............... 718/100 |
| 2005/0143968 A9 | 6/2005 | Odom et al. |
| 2005/0240917 A1 | 10/2005 | Wu |
| 2005/0248534 A1 | 11/2005 | Kehlstadt |
| 2005/0280453 A1 | 12/2005 | Hsieh |
| 2006/0015862 A1 | 1/2006 | Odom et al. |
| 2006/0031768 A1 | 2/2006 | Shah et al. |
| 2006/0032680 A1 | 2/2006 | Elias et al. |
| 2006/0097991 A1 | 5/2006 | Hotelling et al. |
| 2006/0273804 A1 | 12/2006 | Delorme et al. |
| 2007/0139074 A1 | 6/2007 | Reblewski |
| 2007/0258458 A1 | 11/2007 | Kapoor |
| 2008/0086668 A1 | 4/2008 | Jefferson et al. |
| 2008/0095213 A1 | 4/2008 | Lin et al. |
| 2008/0186052 A1 | 8/2008 | Needham et al. |
| 2008/0222453 A1* | 9/2008 | Bartz et al. ............... 714/28 |
| 2008/0243463 A1* | 10/2008 | Lovas et al. ............... 703/17 |
| 2008/0259998 A1 | 10/2008 | Venkataraman et al. |
| 2008/0294806 A1 | 11/2008 | Swindle et al. |
| 2009/0066427 A1 | 3/2009 | Brennan |
| 2009/0322305 A1 | 12/2009 | De Cremoux |

FOREIGN PATENT DOCUMENTS

| | | |
|---|---|---|
| EP | 0308583A2 A1 | 3/1989 |
| EP | 368398 A1 | 5/1990 |
| EP | 0450863A2 A1 | 10/1991 |
| EP | 0499383A2 A1 | 8/1992 |
| EP | 0639816A2 A1 | 2/1995 |
| EP | 1170671A1 A1 | 1/2002 |
| EP | 1205848 A1 | 5/2002 |
| EP | 1191423A2 A1 | 2/2003 |
| JP | 404083405 A1 | 3/1992 |
| JP | 405055842 A1 | 3/1993 |
| JP | 06021732 A1 | 1/1994 |
| JP | 404095408 A1 | 3/2002 |
| WO | 9532478 A1 | 11/1995 |
| WO | PCT/US96/17305 A1 | 6/1996 |
| WO | PCT/US98/34376 A1 | 8/1998 |
| WO | PCT/US99/09712 A1 | 2/1999 |

OTHER PUBLICATIONS

USPTO Non-Final Rejection for U.S. Appl. No. 10/238,966 dated Jun. 30, 2008; 12 pages.

USPTO Non-Final Rejection for U.S. Appl. No. 10/238,966 dated Dec. 26, 2007; 12 pages.

USPTO Final Rejection for U.S. Appl. No. 10/238,966 dated Sep. 27, 2007; 9 pages.

USPTO Non-Final Rejection for U.S. Appl. No. 10/238,966 dated Apr. 19, 2007; 7 pages.

USPTO Non-Final Rejection for U.S. Appl. No. 10/238,966 dated Oct. 20, 2006; 8 pages.

USPTO Non-Final Rejection for U.S. Appl. No. 10/238,966 dated Apr. 6, 2006; 8 pages.

USPTO Notice of Allowance for U.S. Appl. No. 10/033,027 dated Mar. 31, 2009; 7 pages.

USPTO Non-Final Rejection for U.S. Appl. No. 10/033,027 dated Dec. 18, 2008; 5 pages.

USPTO Final Rejection for U.S. Appl. No. 10/033,027 dated Jun. 8, 2007; 8 pages.

USPTO Non-Final Rejection for U.S. Appl. No. 10/033,027 dated Dec. 21, 2006; 31 pages.

USPTO Final Rejection for U.S. Appl. No. 10/033,027 dated Aug. 9, 2006; 6 pages.

USPTO Non-Final Rejection for U.S. Appl. No. 10/033,027 dated Apr. 26, 2006; 26 pages.

USPTO Final Rejection for U.S. Appl. No. 10/033,027 dated Oct. 31, 2005; 24 pages.

USPTO Non-Final Rejection for U.S. Appl. No. 10/033,027 dated Apr. 20, 2005; 20 pages.

USPTO Non-Final Rejection for U.S. Appl. No. 10/033,027 dated Oct. 18, 2004; 17 pages.

USPTO Non-Final Rejection for U.S. Appl. No. 10/001,478 dated Oct. 20, 2008; 18 pages.

USPTO Final Rejection for U.S. Appl. No. 10/001,478 dated Jun. 4, 2008; 18 pages.

USPTO Non-Final Rejection for U.S. Appl. No. 10/001,478 dated Jan. 30, 2008; 19 pages.

USPTO Final Rejection for U.S. Appl. No. 10/001,478 dated Sep. 17, 2007; 15 pages.

USPTO Non-Final Rejection for U.S. Appl. No. 10/001,478 dated Apr. 2, 2007; 17 pages.

USPTO Final Rejection for U.S. Appl. No. 10/001,478 dated Sep. 5, 2006; 19 pages.

USPTO Non-Final Rejection for U.S. Appl. No. 10/001,478 dated Mar. 15, 2006; 19 pages.

USPTO Final Rejection for U.S. Appl. No. 10/001,478 dated Oct. 24, 2005; 15 pages.

USPTO Non-Final Rejection for U.S. Appl. No. 10/001,478 dated May 16, 2005; 13 pages.

USPTO Notice of Allowance for U.S. Appl. No. 10/002,217 dated Jan. 28, 2009; 4 pages.

USPTO Notice of Allowance for U.S. Appl. No. 10/002,217 dated Oct. 14, 2008; 6 pages.
USPTO Notice of Allowance for U.S. Appl. No. 10/002,217 dated Jun. 6, 2008; 7 pages.
USPTO Final Rejection for U.S. Appl. No. 10/002,217 dated Feb. 6, 2008; 10 pages.
USPTO Non-Final Rejection for U.S. Appl. No. 10/002,217 dated Aug. 3, 2007; 10 pages.
USPTO Final Rejection for U.S. Appl. No. 10/002,217 dated Mar. 7, 2007; 12 pages.
USPTO Non-Final Rejection for U.S. Appl. No. 10/002,217 dated Oct. 2, 2006; 21 pages.
USPTO Non-Final Rejection for U.S. Appl. No. 10/002,217 dated Apr. 3, 2006; 12 pages.
USPTO Final Rejection for U.S. Appl. No. 10/002,217 dated Nov. 17, 2005; 17 pages.
USPTO Non-Final Rejection for U.S. Appl. No. 10/002,217 dated May 19, 2005; 15 pages.
USPTO Advisory Action for U.S. Appl. No. 10/001,477 dated Oct. 10, 2008; 3 pages.
"An Analog PPL-Based Clock and Data Recovery Circuit with High Input Jitter Tolerance;" Sun, Reprinted from IEEE Journal of Solid-State Circuits, 1989; 4 pages.
"WP 3.5: An Integrated Time Reference;" Blauschild, Digest of Technical Papers, 1994; 4 pages.
"Micropower CMOS Temperature Sensor with Digital Output;" Bakker et al., IEEE Journal of Solid-State Circuits, 1996; 3 pages.
U.S. Appl. No. 09/964,991: "A Novel Band-Gap Circuit for Providing an Accurate Reference Voltage Compensated for Process State, Process Variations and Temperature," Kutz at al., filed on Sep. 26, 2001; 25 pages.
U.S. Appl. No. 09/842,966: "Precision Crystal Oscillator Circuit Used in Microcontroller," Monte Mar, filed on Apr. 25, 2001; 28 pages.
USPTO Non-Final Rejection for U.S. Appl. No. 09/975,115 dated Oct. 9, 2008; 34 pages.
USPTO Final Rejection for U.S. Appl. No. 09/975,115 dated May 12, 2008; 33 pages.
USPTO Non-Final Rejection for U.S. Appl. No. 09/975,115 dated Jan. 7, 2008; 30 pages.
USPTO Non-Final Rejection for U.S. Appl. No. 09/975,115 dated Jul. 31, 2007; 28 pages.
USPTO Final Rejection for U.S. Appl. No. 09/975,115 dated Feb. 21, 2007; 25 pages.
USPTO Non-Final Rejection for U.S. Appl. No. 09/975,115 dated Oct. 31, 2006; 19 pages.
USPTO Final Rejection for U.S. Appl. No. 09/975,115 dated Jun. 23, 2006; 20 pages.
USPTO Non-Final Rejection for U.S. Appl. No. 09/975,115 dated Jan. 11, 2006; 15 pages.
USPTO Non-Final Rejection for U.S. Appl. No. 09/975,115 dated Jul. 27, 2005; 11 pages.
USPTO Non-Final Rejection for U.S. Appl. No. 09/975,115 dated Feb. 11, 2005; 86 pages.
USPTO Final Rejection for U.S. Appl. No. 09/975,338 dated Jan. 31, 2008; 21 pages.
USPTO Non-Final Rejection for U.S. Appl. No. 09/975,338 dated Aug. 14, 2007; 19 pages.
USPTO Final Rejection for U.S. Appl. No. 09/975,338 dated Feb. 27, 2007; 23 pages.
USPTO Non-Final Rejection for U.S. Appl. No. 09/975,338 dated Sep. 6, 2006; 11 pages.
USPTO Advisory Action for U.S. Appl. No. 09/975,338 dated May 15, 2006; 4 pages.
USPTO Final Rejection for U.S. Appl. No. 09/975,338 dated Jan. 18, 2006; 12 pages.
USPTO Non-Final Rejection for U.S. Appl. No. 09/975,338 dated Apr. 5, 2005; 13 pages.
USPTO Final Rejection for U.S. Appl. No. 10/008,096 dated Feb. 10, 2005; 15 pages.
USPTO Final Rejection for U.S. Appl. No. 10/008,096 dated Jun. 16, 2008; 23 pages.
USPTO Final Rejection for U.S. Appl. No. 10/008,096 dated Sep. 4, 2007; 19 pages.
USPTO Final Rejection for U.S. Appl. No. 10/008,096 dated Oct. 13, 2006; 17 pages.
USPTO Final Rejection for U.S. Appl. No. 10/008,096 dated Nov. 25, 2005; 17 pages.
USPTO Non-Final Rejection for U.S. Appl. No. 10/008,096 dated Mar. 7, 2007; 19 pages.
USPTO Non-Final Rejection for U.S. Appl. No. 10/008,096 dated Apr. 17, 2006; 18 pages.
USPTO Non-Final Rejection for U.S. Appl. No. 10/008,096 dated Jun. 14, 2004; 24 pages.
USPTO Non-Final Rejection for U.S. Appl. No. 10/008,096 dated Jun. 24, 2005; 15 pages.
USPTO Non-Final Rejection for U.S. Appl. No. 10/008,096 dated Dec. 12, 2007; 14 pages.
USPTO Notice of Allowance for U.S. Appl. No. 10/008,096 dated Dec. 22, 2008; 24 pages.
USPTO Notice of Allowance for U.S. Appl. No. 09/975,105 dated Dec. 4, 2006; 4 pages.
USPTO Final Rejection for U.S. Appl. No. 09/975,105 dated Jul. 13, 2006; 7 pages.
USPTO Non-Final Rejection for U.S. Appl. No. 09/975,105 dated Jan. 19, 2006; 5 pages.
USPTO Non-Final Rejection for U.S. Appl. No. 09/975,105 dated Apr. 19, 2005; 9 pages.
U.S. Appl. No. 09/943,062: "Apparatus and Method for Programmable Power Management in a Programmable Analog Circuit Block," Monte Mar, filed on Aug. 29, 2001; 46 pages.
U.S. Appl. No. 10/238,966: "Method for Parameterizing a User Module," Perrin et al., filed on Sep. 9, 2002; 41 pages.
USPTO Notice of Allowance for U.S. Appl. No. 10/324,455 dated Feb. 12, 2004; 4 pages.
USPTO Non-Final Rejection for U.S. Appl. No. 10/324,455 dated Nov. 6, 2003; 4 pages.
USPTO Non-Final Rejection for U.S. Appl. No. 10/324,455 dated Aug. 21, 2003; 4 pages.
USPTO Notice of Allowance for U.S. Appl. No. 09/998,859 dated Mar. 14, 2005; 6 pages.
USPTO Non-Final Rejection for U.S. Appl. No. 09/998,859 dated Nov. 4, 2004; 6 pages.
USPTO Final Rejection for U.S. Appl. No. 09/998,859 dated Nov. 19, 2003; 5 pages.
USPTO Non-Final Rejection for U.S. Appl. No. 09/998,859 dated May 28, 2003; 6 pages.
USPTO Non-Final Rejection for U.S. Appl. No. 09/998,859 dated May 15, 2003; 6 pages.
USPTO Notice of Allowance for U.S. Appl. No. 09/998,834 dated May 19, 2005; 7 pages.
USPTO Non-Final Rejection for U.S. Appl. No. 09/998,834 dated Sep. 20, 2004; 11 pages.
USPTO Notice of Allowance for U.S. Appl. No. 10/113,065 dated Apr. 6, 2006; 8 pages.
USPTO Final Rejection for U.S. Appl. No. 10/113,065 dated Oct. 26, 2005; 17 pages.
USPTO Non-Final Rejection for U.S. Appl. No. 10/113,065 dated May 20, 2005; 14 pages.
U.S. Appl. No. 09/207,912: "Circuit(s), Architecture and Method(s) for Operating and/or Tuning a Ring Oscillator," Monte Mar, filed on Dec. 9, 1998; 23 pages.
USPTO Notice of Allowance for U.S. Appl. No. 10/001,477 dated May 8, 2009; 6 pages.
Goodenough, F. "Analog Counterparts of FPGAS Ease System Design" Electronic Design, Penton Publishing, Cleveland, OH, US vol. 42, No. 21, Oct. 14, 1994; 10 pages.
Harbaum, T. et ai. "Design of a Flexible Coprocessor Unit" Proceedings of the Euromicro Conference, XX XX, Sep. 1999; 10 pages.
USPTO U.S. Appl. No. 09/924,734: "Programmable Microcontroller (PSoC) Architecture (Mixed Analog/Digital)"; Snyder et al., filed on Aug. 7, 2001; 28 pages.
USPTO U.S. Appl. No. 09/909,045: "Digital Configurable Macro Architecture," Warren Snyder, filed on Jul. 18, 2001; 37 pages.

USPTO U.S. Appl. No. 09/909,109; "Configuring Digital Functions in a Digital Configurable Macro Architecture," Warren Snyder, filed on Jul. 18, 2001; 38 pages.
USPTO U.S. Appl. No. 09/909,047; "A Programmable Analog System Architecture," Monte Mar, filed on Jul. 18, 2001; 60 pages.
USPTO U.S. Appl. No. 09/930,021: "Programmable Methodology and Architecture for a Programmable Analog System"; Mar et al., filed on Aug. 14, 2001; 87 pages.
USPTO U.S. Appl. No. 09/969,311: "Method for Synchronizing and Resetting Clock Signals Supplied to Multiple Programmable Analog Blocks," Bert Sullam, filed on Oct. 1, 2001; 57 pages.
USPTO U.S. Appl. No. 09/875,599: "Method and Apparatus for Programming a Flash Memory," Warren Snyder, filed on Jun. 5, 2001; 23 pages.
USPTO U.S. Appl. No. 09/975,115: "In-System Chip Emulator Architecture," Snyder et al., filed on Oct. 10, 2001; 38 pages.
USPTO U.S. Appl. No. 09/953,423: "A Configurable Input/Output Interlace for a Microcontroller," Warren Snyder, filed on Sep. 14, 2001; 28 pages.
USPTO U.S. Appl. No. 09/893,050: "Multiple Use of Microcontroller Pad," Kutz et al., filed on Jun. 26, 2001; 21 pages.
USPTO U.S. Appl. No. 09/929,891: "Programming Architecture for a Programmable Analog System," Mar et al., filed on Aug. 14, 2001; 82 pages.
USPTO U.S. Appl. No. 09/969,313: "Architecture for Synchronizing and Resetting Clock Signals Supplied to Multiple Analog Programmable Analog Blocks," Bert Sullam, filed on Oct. 1, 2001; 50 pages.
USPTO Non-Final Rejection for U.S. Appl. No. 09/994,601 dated Nov. 14, 2006; 15 pages.
USPTO Final Rejection for U.S. Appl. No. 09/994,601 dated Mar. 8, 2006; 11 pages.
USPTO Non-Final Rejection for U.S. Appl. No. 09/994,601 dated Sep. 21, 2005; 12 pages.
USPTO Final Rejection for U.S. Appl. No. 09/994,601 dated Mar. 24, 2005; 10 pages.
Hintz et al., "Microcontrollers", 1992, McGraw-Hill; 11 pages.
Ganapathy et al., "Hardware Emulation for Functional Verification of K5", Jun. 1.998, 33rd Design Automation Conference Proceedings, Jun. 3-7, 1996; 4 pages.
The Provisional U.S. Appl. No. 60/243,708 "Advanced Programmable Microcontroller Device"; Snyder et al., filed on Oct. 26, 2000; 277 pages.
"Webster's Third New International Dictionary", 1996, G. & C. Merriam Company; 3 pages (including pp. 1328-1329).
USPTO Advisory Action for U.S. Appl. No. 09/998,848 dated Sep. 7, 2005; 3 pages.
USPTO U.S. Appl. No. 09/957,084: "A Crystal-Less Oscillator with Trimmable Analog Current Control for Increased Stability," Mar et al., filed on Sep. 19, 2001; 28 pages.
USPTO U.S. Appl. No. 10/011,214: "Method and Circuit for Synchronizing a Write Operation between an On-Chip Microprocessor and an On-Chip Programmable Analog Device Operating at Different Frequencies," Sullam et al., filed on Oct. 25, 2001; 49 pages.
USPTO U.S. Appl. No. 09/972,319: "Method for Applying Instructions to Microprocessor in Test Mode," Warren Snyder, filed on Oct. 5, 2001; 31 pages.
USPTO U.S. Appl. No. 09/972,003: "Test Architecture for Microcontroller Providing for a Serial Communication Interface," Warren Snyder, filed on Oct. 5, 2001; 32 pages.
USPTO U.S. Appl. No. 09/972,133: "Method for Entering Circuit Test Mode," Warren Snyder, filed on Oct. 5, 2001; 30 pages.
USPTO U.S. Appl. No. 09/973,535: "Architecture for Decimation Algorithm," Warren Snyder, filed on Oct. 9, 2001; 26 pages.
USPTO U.S. Appl. No. 09/977,111: "A Frequency Doubler Circuit with Trimmable Current Control," Shutt et al., filed on Oct. 11, 2001; 35 pages.
USPTO U.S. Appl. No. 10/272,231: "Digital Configurable Macro Architecture," Warren Snyder, filed on Oct. 15, 2002; 36 pages.
USPTO U.S. Appl. No. 11/125,554: "A Method for a Efficient Supply to a Microcontroller," Kutz et al., filed on May 9, 2005; 1 page.
USPTO U.S. Appl. No. 09/855,868: "Protecting Access to Microcontroller Memory Blocks," Warren Snyder, filed on May 14, 2001; 28 pages.
USPTO U.S. Appl. No. 09/887,923: "Novel Method and System for Interacting between a Processor and a Power on Reset to Dynamically Control Power States in a Microcontroller," Kutz et al., filed on Jun. 22, 2001; 44 pages.
USPTO U.S. Appl. No. 10/000,383: "System and Method of Providing a Programmable Clock Architecture for an Advanced Microcontroller," Sullam et al., filed on Oct. 24, 2001; 34 pages.
USPTO U.S. Appl. No. 10/001,477: "Breakpoint Control in an In-Circuit Emulation System," Roe et al., filed on Nov. 1, 2001; 43 pages.
USPTO U.S. Appl. No. 10/004,197: "In-Circuit Emulator with Gatekeeper Based Halt Control," Nemecek et al, filed on Nov. 14, 2001; 47 pages.
USPTO U.S. Appl. No. 10/004,039: "In-Circuit Emulator with Gatekeeper for Watchdog Timer," Nemecek et al., filed on Nov. 14, 2001; 46 pages.
USPTO U.S. Appl. No. 10/002,217: "Conditional Branching in an in-Circuit Emulation System," Craig Nemecek, filed on Nov. 1, 2001; 43 pages.
USPTO U.S. Appl. No. 10/001,568: "Combined In-Circuit Emulator and Programmer," Nemecek et al., filed on Nov. 1, 2001; 47 pages.
USPTO U.S. Appl. No. 10/001,478: "In-Circuit Emulator and Pod Synchronized Boot," Nemecek et al., filed on Nov. 1, 2001; 44 pages.
USPTO U.S. Appl. No. 09/887,955: "Novel Power on Reset Circuit for Microcontroller," Kutz et al., filed on Jun. 22, 2001; 42 pages.
USPTO U.S. Appl. No. 09/826,397: "Method and Circuit for Allowing a Microprocessor to Change its Operating Frequency on-the-Fly," Bert Sullarn, filed on Apr. 2, 2001; 24 pages.
USPTO U.S. Appl. No. 09/893,048: "A Microcontroller having an On-Chip High Gain Amplifier," Kutz et al filed on Jun. 26, 2001; 22 pages.
USPTO U.S. Appl. No. 09/912,768: "A Microcontroller having a Dual Mode Relax Oscillator that is Trimmable," James Shutt; filed on Jul. 24, 2001; 33 pages.
USPTO U.S. Appl. No. 09/922,419: "A Power Supply Pump Circuit for a Microcontroller," Kutz et al., filed on Aug. 3, 2001; 38 pages.
USPTO U.S. Appl. No. 09/922,579: "A Method for a Efficient Supply to a Microcontroller," Kutz et al., filed on Aug. 3, 2001; 37 pages.
USPTO U.S. Appl. No. 09/923,461: "Non-Interfering Multiply-Mac (Multiply Accumulate) Circuit," Warren Snyder, filed on Aug. 6, 2001; 25 pages.
USPTO U.S. Appl. No. 09/935,454: "Method and Apparatus for Local and Global Power Management in a Programmable Analog Circuit," Monte Mar, filed on Aug. 22, 2001; 51 pages.
Bursky, "FPGA Combines Multiple Interfaces and Logic," Electronic Design, vol. 48 No. 20, pp. 74-78 (Oct. 2, 2000); 5 pages.
Anonymous, "Warp Nine Engineering—The IEEE 1284 Experts-F/Port Product Sheet," undated web page found at http://www.fapo.com/fport.htm; printed on Apr. 12, 2005; 2 pages.
Anonymous, "F/Port:Fast Parallel Port for the PC Installation Manual" Release 7.1, circa 1997, available for download from http://www.fapo.com/fport.htm; 25 pages.
Nam et al.; "Fast Development of Source-Level Debugging System Using Hardware Emulation"; IEEE 2000; 4 pages.
Huang et al.; "Iceberg: An Embedded In-Cicuit Emulator Synthesizer for Microcontrollers"; ACM 1999; 6 pages.
Khan et al.; "FPGA Architectures for Asic Hardware Emulators"; IEEE 1993; 5 pages.
Oh et al.; Emulator Environment Based on an FPGA Prototyping Board; IEEE 21-23; Jun. 2000; 6 pages.
Hong et al.; "An FPGA-Based Hardware Emulator for Fast Fault Emulation"; IEEE 1997; 4 pages.
Ching et al.; "An In-Curcuit-Emulator for TMS320C25"; IEEE 1994; 6 pages.
Pastermak et al.; "In-Circuit-Emulation in ASIC Architecture Core Designs"; IEEE 1989; 4 pages.
Melear; "Using Background Modes for Testing, Debugging and Emulation of Microcontrollers"; IEEE 1997; 8 pages.
Walters, Stephen; "Computer-Aided Prototyping for ASIC-Based Systems", 1991, IEEE Design & Test of Computers; vol. 8, Issue 2; 8 pages.
Anonymous; "JEENI JTAG EmbeddedICE Ethernet Interface"; Aug. 1999; Embedded Performance, Inc.; 3 pages.

Sedory; "A Guide to Debug"; 2004; retrieved on May 20, 2005; 7 pages.

"Microsoft Files Summary Judgement Motions"; Feb. 1999; Microsoft PressPass; retrieved on May 20, 2005 from http://www.microsoft.com/presspass/press/1999/feb99/Feb99/Calderapr.asp; 3 pages.

Xerox; "Mesa Debugger Documentation"; Apr. 1979; Xerox Systems Development Department; Version 5.0; 33 pages.

Stallman et al.; "Debugging with GDB the GNU Source-Level Debugger"; Jan. 1994; retrieved on May 2, 2005 from http://www.cs.utah.edu; 4 pages.

Wikipedia.org; "Von Neumann architecture"; retrieved from http://en.wikipedia.org/wiki/Von_Neumann_architecture on Jan. 22, 2007; 4 pages.

Stan Augarten; "The Chip Collection—Introduction—Smithsonian Institute"; "State of the Art"; "The First 256-Bit Static RAM"; retrieved on Nov. 14, 2005 from http://smithsonianchips.si.edu/augarten/p24.htm; 2 pages.

"POD—Piece of Data, Plain Old Documentation, Plain Old Dos . . ."; retrieved on Nov. 14, 2005 from http://www.auditmypc.com/acronym/POD.asp; 2 pages.

USPTO Non-Final Rejection for U.S. Appl. No. 09/989,767 dated Oct. 6, 2004; 15 pages.

USPTO Final Rejection for U.S. Appl. No. 09/989,771 dated Feb. 27, 2007; 8 pages.

USPTO Final Rejection for U.S. Appl. No. 09/989,771 dated Mar. 28, 2006; 9 pages.

USPTO Final Rejection for U.S. Appl. No. 09/989,771 dated Apr. 6, 2005; 7 pages.

USPTO Final Rejection for U.S. Appl. No. 09/989,771 dated Dec. 10, 2008; 12 pages.

USPTO Final Rejection for U.S. Appl. No. 09/989,771 dated Dec. 27, 2007; 15 pages.

USPTO Non-Final Rejection for U.S. Appl. No. 09/989,771 dated May 28, 2008; 14 pages.

USPTO Non-Final Rejection for U.S. Appl. No. 09/989,771 dated Jul. 16, 2007; 14 pages.

USPTO Non-Final Rejection for U.S. Appl. No. 09/989,771 dated Aug. 23, 2006; 7 pages.

USPTO Non-Final Rejection for U.S. Appl. No. 09/989,771 dated Sep. 12, 2005; 7 pages.

USPTO Non-Final Rejection for U.S. Appl. No. 09/989,771 dated Sep. 22, 2004; 7 pages.

USPTO Final Rejection for U.S. Appl. No. 09/989,765 dated Apr. 3, 2007; 12 pages.

USPTO Final Rejection for U.S. Appl. No. 09/989,765 dated Apr. 4, 2008; 16 pages.

USPTO Final Rejection for U.S. Appl. No. 09/989,765 dated Apr. 17, 2006; 12 pages.

USPTO Non-Final Rejection for U.S. Appl. No. 09/989,765 dated Sep. 19, 2007; 14 pages.

USPTO Non-Final Rejection for U.S. Appl. No. 09/989,765 dated Sep. 26, 2008; 17 pages.

USPTO Non-Final Rejection for U.S. Appl. No. 09/989,765 dated Oct. 2, 2006; 13 pages.

USPTO Non-Final Rejection for U.S. Appl. No. 09/989,765 dated Oct. 5, 2005; 9 pages.

USPTO Final Rejection for U.S. Appl. No. 09/989,782 dated Jul. 9, 2008; 10 pages.

USPTO Final Rejection for U.S. Appl. No. 09/989,782 dated Jul. 24, 2007; 9 pages.

USPTO Final Rejection for U.S. Appl. No. 09/989,782 dated Sep. 21, 2006; 10 pages.

USPTO Final Rejection for U.S. Appl. No. 09/989,782 dated Nov. 3, 2005; 11 pages.

USPTO Non-Final Rejection for U.S. Appl. No. 09/989,782 dated Jan. 29, 2007; 9 pages.

USPTO Non-Final Rejection for U.S. Appl. No. 09/989,782 dated Mar. 28, 2006; 8 pages.

USPTO Non-Final Rejection for U.S. Appl. No. 09/989,782 dated Apr. 29, 2005; 11 pages.

USPTO Non-Final Rejection for U.S. Appl. No. 09/989,782 dated Oct. 6, 2004; 11 pages.

USPTO Non-Final Rejection for U.S. Appl. No. 09/989,782 dated Nov. 26, 2008; 10 pages.

USPTO Non-Final Rejection for U.S. Appl. No. 09/989,782 dated Dec. 14, 2007; 8 pages.

USPTO Final Rejection for U.S. Appl. No. 09/989,765 dated Mar. 31, 2009; 18 pages.

USPTO Final Rejection for U.S. Appl. No. 09/989,778 dated Mar. 16, 2009; 26 pages.

"Pod-Wikipedia, the free encyclopedia"; retrieved on Nov. 14, 2005 from http://en.wikipedia.org/wiki/Pod; 3 pages.

"pod-defintion by dict.die.net"; retrieved on Nov. 14, 2005 from http://dict.die.net/pod; 2 pages.

"In-Curcuit Emulators—descriptions of the major ICEs around"; retrieved on Nov. 14, 2005 from http://www.algonet.se/~staffann/developer/emulator.htm; 6 pages.

USPTO U.S. Appl. No. 09/975,104: "Capturing Test/Emulation and Enabling Real-Time Debugging Using FPGA for In-Circuit Emulation," Warren Snyder, filed on Oct. 10, 2001; 35 pages.

USPTO Non-Final Rejection for U.S. Appl. No. 09/989,767 dated Jul. 24, 2008; 21 pages.

Anonymous; "Using Debug"; 1999; Prentice-Hall Publishing; 20 pages.

Harrison et al.; "Xilinx FPGA Design in a Group Environment Using VHDS and Synthesis Tools"; Colloquium on Digital System Design Using Synthesis Techniques; Feb. 15, 1996; 4 pages.

Microsoft Press Computer User's Dictionary; 1998; 3 pages (including page 18).

Sreeram Duvvuru and Siamak Arya, "Evaluation of a Branch Target Address Cache," 1995; IEEE; 8 pages.

Andrew S. Tanenbaum with contributions from James R. Goodman, "Structured Computer Organization," 1999, Prentice Hall, Fourth Edition; 32 pages.

USPTO U.S. Appl. No. 09/975,338: "Method for Breaking Execution of a Test Code in DUT and Emulator Chip Essentially Simultaneously and Handling Complex Breakpoint Events," Nemecek et al., filed on Oct. 10, 2001; 34 pages.

USPTO U.S. Appl. No. 09/975,030: "Emulator Chip-Board Architecture for Interface," Snyder et al., filed on Oct. 10, 2001; 37 pages.

Wikipedia—Main Page, retrieved on Mar. 8, 2006 from http://en.wikipedia.org/wiki/Main_Page and http://en.wikipedia.org/wiki/Wikipedia:Introduction; 5 pages.

Wikipedia—Processor register, retrieved on Mar. 7, 2006 from http://en.wikipedia.org/wiki/Processor_register; 4 pages.

Jonathan B. Rosenburg, "How Debuggers Work" John Wiley & Sons, Inc. 1996; 259 pages.

Dahl, et al.; "Emulation of the Sparcte Microprocessor with the MIT Virtual Wires Emulation System"; 1994; IEEE; 9 pages.

Bauer et al.; "A Reconfigurable Logic Machine for Fast Event-Driven Simulation"; Jun. 1998; Design Automation Conference Proceedings; 8 pages.

USPTO U.S. Appl. No. 09/975,105: "Host to FPGA Interface in an In-Circuit Emulation System," Craig Nemecek, filed on Oct. 10, 2001; 44 pages.

USPTO Advisory Action for U.S. Appl. No. 09/994,601 dated May 23, 2006; 3 pages.

USPTO Non-Final Rejection for U.S. Appl. No. 09/994,601 dated Jul. 29, 2004; 10 pages.

USPTO Ex Parte Qualyle Action for U.S. Appl. No. 09/992,076 dated Jun. 18, 2007; 6 pages.

USPTO Non-Final Rejection for U.S. Appl. No. 09/989,767 dated Jul. 2, 2007; 22 pages.

USPTO Notice of Allowance for U.S. Appl. No. 09/992,076 dated Mar. 26, 2008; 23 pages.

USPTO Notice of Allowance for U.S. Appl. No. 09/992,076 dated Jul. 29, 2008; 6 pages.

UPSTO Advisory Action for U.S. Appl. No. 09/989,778 dated May 15, 2006; 4 pages.

USPTO Final Rejection for U.S. Appl. No. 09/989,778 dated Jan. 8, 2009; 25 pages.

USPTO Final Rejection for U.S. Appl. No. 09/989,778 dated Feb. 5, 2007; 17 pages.

USPTO Final Rejection for U.S. Appl. No. 09/989,778 dated Feb. 15, 2006; 9 pages.

USPTO Final Rejection for U.S. Appl. No. 09/989,778 dated Dec. 20, 2007; 14 pages.
USPTO Non-Final Rejection for U.S. Appl. No. 09/989,778 dated Mar. 29, 2005; 14 pages.
USPTO Non-Final Rejection for U.S. Appl. No. 09/989,778 dated Jul. 14, 2008; 24 pages.
USPTO Non-Final Rejection for U.S. Appl. No. 09/989,778 dated Jul. 19, 2007; 18 pages.
USPTO Non-Final Rejection for U.S. Appl. No. 09/989,778 dated Sep. 1, 2005; 10 pages
USPTO Non-Final Rejection for U.S. Appl. No. 09/989,778 dated Sep. 18, 2006; 11 pages.
USPTO Final Rejection for U.S. Appl. No. 09/998,848 dated Jun. 14, 2005; 17 pages.
USPTO Final Rejection for U.S. Appl. No. 09/998,848 dated Jul. 25, 2006; 16 pages.
USPTO Final Rejection for U.S. Appl. No. 09/998,848 dated Aug. 10, 2007; 14 pages.
USPTO Final Rejection for U.S. Appl. No. 09/998,848 dated Nov. 24, 2008; 15 pages.
USPTO Non-Final Rejection for U.S. Appl. No. 09/998,848 dated Jan. 26, 2006; 17 pages.
USPTO Non-Final Rejection for U.S. Appl. No. 09/998,848 dated Jan. 29, 2007; 13 pages.
USPTO Non-Final Rejection for U.S. Appl. No. 09/998,848 dated Feb. 2, 2008; 15 pages.
USPTO Non-Final Rejection for U.S. Appl. No. 09/998,848 dated Dec. 21, 2004; 14 pages.
USPTO Final Rejection for U.S. Appl. No. 09/989,767 dated Jan. 11, 2007; 12 pages.
USPTO Final Rejection for U.S. Appl. No. 09/989,767 dated Jan. 15, 2009; 21 pages.
USPTO Final Rejection for U.S. Appl. No. 09/989,767 dated Mar. 6, 2006; 15 pages.
USPTOFinal Rejection for U.S. Appl. No. 09/989,767 dated Apr. 6, 2005; 13 pages.
USPTO Final Rejection for U.S. Appl. No. 09/989,767 dated Dec. 27, 2007; 21 pages.
USPTO Non-Final Rejection for U.S. Appl. No. 09/989,767 dated Jul. 17, 2006; 12 pages.
USPTO Notice of Allowance for U.S. Appl. No. 09/992,076 dated Nov. 13, 2008; 15 pages.
USPTO Final Rejection for U.S. Appl. No. 09/994,601 dated May 18, 2007; 17 pages.
USPTO Notice of Allowance for 09/992,076 dated Nov. 29, 2007; 8 pages.
USPTO Final Rejection for U.S. Appl. No. 09/992,076 dated Jan. 30, 2007; 32 pages.
USPTO Non-Final Rejection for U.S. Appl. No. 09/992,076 dated Aug. 10, 2006; 19 pages.
USPTO Final Rejection for U.S. Appl. No. 09/992,076 dated Mar. 17, 2006; 16 pages.
USPTO Non-Final Rejection for U.S. Appl. No. 09/992,076 dated Nov. 21, 2005; 29 pages.
USPTO Non-Final Rejection for U.S. Appl. No. 09/992,076 dated Jun. 1, 2005; 20 pages.
USPTO Notice of Allowance for U.S. Appl. No. 09/994,600 dated Nov. 12, 2008; 35 pages.
USPTO Notice of Allowance for U.S. Appl. No. 09/994,600 dated May 14, 2008; 22 pages.
USPTO Final Rejection for U.S. Appl. No. 09/994,600 dated Oct. 17, 2007; 13 pages.
USPTO Non-Final Rejection for U.S. Appl. No. 09/994,600 dated May 15, 2007; 14 pages.
USPTO Final Rejection for U.S. Appl. No. 09/994,600 dated Dec. 8, 2006; 14 pages.
USPTO Non-Final Rejection for U.S. Appl. No. 09/994,600 dated Jul. 17, 2006; 14 pages.
USPTO Final Rejection for U.S. Appl. No. 09/994,600 dated Feb. 13, 2006; 13 pages.
USPTO Non-Final Rejection for U.S. Appl. No. 09/994,600 dated Aug. 23, 2005; 13 pages.
USPTO Final Rejection for U.S. Appl. No. 09/994,600 dated May 4, 2005; 16 pages.
USPTO Non-Final Rejection for U.S. Appl. No. 09/994,600 dated Oct. 21, 2004; 37 pages.
USPTO Notice of Allowance for U.S. Appl. No. 10/001,477 dated Nov. 10, 2008; 7 pages.
USPTO Final Rejection for U.S. Appl. No. 10/001,477 dated Jun. 30, 2008; 19 pages.
USPTO Non-Final Rejection for U.S. Appl. No. 10/001,477 dated Dec. 6, 2007; 17 pages.
USPTO Final Rejection for U.S. Appl. No. 10/001,477 dated Jul. 23, 2007; 19 pages.
USPTO Non-Final Rejection for U.S. Appl. No. 10/001,477 dated Jan. 22, 2007; 17 pages.
USPTO Final Rejection for U.S. Appl. No. 10/001,477 dated Aug. 24, 2006; 15 pages.
USPTO Non-Final Rejection for U.S. Appl. No. 10/001,477 dated Mar. 2, 2006; 17 pages.
USPTO Final Rejection for U.S. Appl. No. 10/001,477 dated Oct. 24, 2005; 18 pages.
USPTO Non-Final Rejection for U.S. Appl. No. 10/001,477 dated May 11, 2005; 31 pages.
Ito, Sergio Akira and Carro, Luigi; "A Comparison of Microcontrollers Targeted to FPGA-Based Embedded Applications", Sep. 2000, Proceedings of 13th Symposium on Integrated Circuits and Systems Design, Sep. 18-24, 2000; 6 pages.
Julio Faura et at; "A Novel Mixed Signal Programmable Device With On-Chip Microprocessor", 1997, IEEE 1997 Custom integrated Circuits Conference; 4 pages.
Monte Mar, Bert Sullam, Eric Blom; "An architecture for a configurable Mixed-signal device", 2003, IEEE Journal of Solid-State Circuits, vol. 3; 4 pages.
Robinson, Gordon D; "Why 1149.1 (JTAG) Really Works", May 1994, Conference Proceedings Electro/94 International, May 10-12, 1994, Combined Volumes; 6 pages.
USPTO Non-Final Rejection for U.S. Appl. No. 09/994,601 dated Oct. 4, 2007; 20 pages.
"PSoC designer: Integrated development environment, getting started 25-minute tutorial, version 1.0", Cypress Microsystems., Cypress Microsystems, Inc. CMS10006A, Jul. 3, 2001; 25 pages.
"PSoC technology complete changes 8-bit Mcu system design", Cypress Microsystems, Inc. retrieved from <http>:// www.archive.org/web/20010219005250/http://cypressmicro.com-/t . . .>, Feb. 19, 2001; 21 pages.
Specks et al., "A Mixed Digital-Analog 16B Microcontroller with 0.5MB Flash Memory, On-Chip Power Supply, Physical rework Interface, and 40V I/O for Automotive Single-Chip Mechatronics," IEEE, Feb. 9, 2000; 1 page.
Hsieh et al., "Modeling Micro-Controller Peripherals for High-Level Co-Simulation and Synthesis," IEEE, 1997; 4 pages.
USPTO Notice of Allowance for U.S. Appl. No. 09/989,777 dated Nov. 4, 2008; 3 pages.
USPTO Notice of Allowance for U.S. Appl. No. 09/989,777 dated Sep. 15, 2008; 28 pages.
USPTO Notice of Allowance for U.S. Appl. No. 09/989,777 dated Jul. 7, 2008; 23 pages.
USPTO Final Rejection for U.S. Appl. No. 09/989,777 dated Jan. 30, 2008; 14 pages.
USPTO Non-Final Rejection for U.S. Appl. No. 09/989,777 dated Sep. 11, 2007; 18 pages.
USPTO Final Rejection for U.S. Appl. No. 09/989,777 dated Mar. 13, 2007; 24 pages.
USPTO Non-Final Rejection for U.S. Appl. No. 09/989,777 dated Sep. 13, 2006; 18 pages.
USPTO Non-Final Rejection for U.S. Appl. No. 09/989,777 dated Apr. 11, 2006; 21 pages.
USPTO Final Rejection for U.S. Appl. No. 09/989,777 dated Dec. 21, 2005; 29 pages.
USPTO Non-Final Rejection for U.S. Appl. No. 09/989,777 dated Jul. 5, 2005; 36 pages.
USPTO Notice of Allowance for U.S. Appl. No. 09/994,601 dated Dec. 22, 2008; 15 pages.

USPTO Final Rejection for U.S. Appl. No. 09/994,601 dated Apr. 17, 2008; 24 pages.
USPTO U.S. Appl. No. 10/033,027: "Microcontrollable Programmable System on a Chip," Warren Snyder; filed on Oct. 22, 2001; 117 pages.
USPTO U.S. Appl. No. 10/803,030: "Programmable Microcontrollable Architecture (Mixed Analog/ Digital)," Snyder at al., filed on Mar. 16, 2004; 13 pages.
USPTO Notice of Allowance for U.S. Appl. No. 09/930,021 dated Nov. 26, 2004; 4 pages.
USPTO Final Rejection for U.S. Appl. No. 09/930,021 dated Aug. 31, 2004; 8 pages.
USPTO Non-Final Rejection for U.S. Appl. No. 09/930,021 dated Apr. 26, 2004; 6 pages.
USPTO Miscellaneous Action with SSP for U.S. Appl. No. 09/930,021 dated Oct. 1, 2001; 1 page.
USPTO Notice of Allowance for U.S. Appl. No. 09/953,423 dated Jul. 12, 2004; 6 pages.
USPTO Non-Final Rejection for U.S. Appl. No. 09/953,423 dated Feb. 6, 2004; 5 pages.
USPTO Notice of Allowance for U.S. Appl. No. 09/957,084 dated May 18, 2004; 5 pages.
USPTO Final Rejection for U.S. Appl. No. 09/957,084 dated Jan. 29, 2004; 8 pages.
USPTO Non-Final Rejection for U.S. Appl. No. 09/957,084 dated Aug. 27, 2003; 8 pages.
USPTO Final Rejection for U.S. Appl. No. 09/957,084 dated Apr. 23, 2003; 8 pages.
USPTO Non-Final Rejection for U.S. Appl. No. 09/957,084 dated Aug. 23, 2002; 6 pages.
USPTO Notice of Allowance for U.S. Appl. No. 09/969,313 dated Oct. 4, 2005; 6 pages.
USPTO Non-Final Rejection for U.S. Appl. No. 09/969,313 dated May 6, 2005; 9 pages.
USPTO Requirement for Restriction/Election for U.S. Appl. No. 09/969,313 dated Mar. 18, 2005; 6 pages.
USPTO Notice of Allowance for U.S. Appl. No. 09/969,311 dated Mar. 1, 2005; 4 pages.
USPTO Non-Final Rejection for U.S. Appl. No. 09/969,311 dated Sep. 21, 2004; 4 pages.
USPTO Advisory Action for U.S. Appl. No. 091969,311 dated Jul. 21, 2003; 2 pages.
USPTO Final Rejection for U.S. Appl. No. 09/969,311 dated Apr. 7, 2003; 7 pages.
USPTO Non-Final Rejection for U.S. Appl. No. 09/969,311 dated Nov. 6, 2002; 8 pages.
USPTO Notice of Allowance for U.S. Appl. No. 09/972,319 dated Dec. 30, 2004; 4 pages.
USPTO Non-Final Rejection for U.S. Appl. No. 09/972,319 dated Sep. 16, 2004; 9 pages.
USPTO Notice of Allowance for U.S. Appl. No. 09/972,003 dated Jul. 14, 2004; 4 pages.
USPTO Requirement for Restriction/Election for U.S. Appl. No. 09/972,003 dated May 6, 2004; 4 pages.
USPTO Non-Final Rejection for U.S. Appl. No. 09/972,003 dated Feb. 2, 2004; 10 pages.
USPTO Non-Final Rejection for U.S. Appl. No. 09/972,003 dated Aug. 19, 2003; 11 pages.
USPTO Notice of Allowance for U.S. Appl. No. 09/972,133 dated Jun. 9, 2006; 6 pages.
USPTO Final Rejection for U.S. Appl. No. 09/972,133 dated Mar. 30, 2006; 8 pages.
USPTO Non-Final Rejection for U.S. Appl. No. 09/972,133 dated Nov. 25, 2005; 9 pages.
USPTO Advisory Action for U.S. Appl. No. 09/972,133 dated Aug. 31, 2005; 3 pages.
USPTO Final Rejection for U.S. Appl. No. 09/972,133 dated Jun. 29, 2005; 10 pages.
USPTO Non-Final Rejection for U.S. Appl. No. 09/972,133 dated Mar. 8, 2005; 9 pages.
USPTO Notice of Allowance for U.S. Appl. No. 09/975,104 dated Oct. 19, 2006; 6 pages.
USPTO Non-Final Rejection for U.S. Appl. No. 09/975,104 dated Jun. 16, 2006; 8 pages.
USPTO Final Rejection for U.S. Appl. No. 09/975,104 dated Feb. 15, 2006; 7 pages.
USPTO Non-Final Rejection for U.S. Appl. No. 09/975,104 dated Aug. 16, 2005; 6 pages.
USPTO Non-Final Rejection for U.S. Appl. No. 09/975,104 dated Mar. 21, 2005; 7 pages.
USPTO Notice of Allowance for U.S. Appl. No. 09/975,030 dated Feb. 6, 2006; 7 pages.
USPTO Non-Final Rejection for U.S. Appl. No. 09/975,030 dated Oct. 20, 2005; 7 pages.
USPTO Non-Final Rejection for U.S. Appl. No. 09/975,030 dated Mar. 29, 2005; 13 pages.
USPTO Notice of Allowance for U.S. Appl. No. 09/977,111 dated Sep. 28, 2006; 6 pages.
USPTO Notice of Allowance for U.S. Appl. No. 10/272,231 dated Mar. 8, 2004; 6 pages.
USPTO Final Rejection for U.S. Appl. No. 10/272,231 dated Nov. 5, 2003; 5 pages.
USPTO Non-Final Rejection for U.S. Appl. No. 10/272,231 dated Jul. 14, 2003; 6 pages.
USPTO Notice of Allowance for U.S. Appl. No. 11/125,554 dated Feb. 7, 2008; 4 pages.
USPTO Notice of Allowance for U.S. Appl. No. 11/125,554 dated Apr. 24, 2007; 7 pages.
Uspto Non-Final Rejection for U.S. Appl. No. 11/125,554 dated Dec. 11, 2006; 9 pages.
USPTO Notice of Allowance for U.S. Appl. No. 09/855,868 dated Apr. 25, 2005; 6 pages.
USPTO Non-Final Rejection for U.S. Appl. No. 09/855,868 dated Aug. 26, 2004; 7 pages.
USPTO Notice of Allowance for U.S. Appl. No. 09/887,923 dated Sep. 27, 2004; 5 pages.
USPTO Non-Final Rejection for U.S. Appl. No. 09/887,923 dated May 25, 2004; 7 pages.
USPTO Notice of Allowance for U.S. Appl. No. 09/875,599 dated Oct. 17, 2006; 4 pages.
USPTO Non-Final Rejection for U.S. Appl. No. 09/875,599 dated May 31, 2006; 18 pages.
USPTO Final Rejection for U.S. Appl. No. 09/875,599 dated Feb. 15, 2006; 18 pages.
USPTO Final Rejection for U.S. Appl. No. 09/875,599 dated Nov. 21, 2005; 16 pages.
USPTO Advisory Action for U.S. Appl. No. 09/875,599 dated Jun. 8, 2005; 3 pages.
USPTO Final Rejection for U.S. Appl. No. 09/875,599 dated Mar. 29, 2005; 20 pages.
USPTO Non-Final Rejection for U.S. Appl. No. 09/875,599 dated Dec. 3, 2004; 16 pages.
USPTO Final Rejection for U.S. Appl. No. 09/875,599 dated Aug. 25, 2004; 17 pages.
USPTO Final Rejection for U.S. Appl. No. 09/875,599 dated Apr. 26, 2004; 15 pages.
USPTO Non-Final Rejection for U.S. Appl. No. 09/875,599 dated Oct. 27, 2003; 13 pages.
USPTO Notice of Allowance for U.S. Appl. No. 10/004,197 dated Feb. 9, 2007; 7 pages.
USPTO Notice of Allowance for U.S. Appl. No. 10/004,197 dated Oct. 6, 2006; 7 pages.
USPTO Non-Final Rejection for U.S. Appl. No. 10/004,197 dated Apr. 3, 2006; 13 pages.
USPTO Final Rejection for U.S. Appl. No. 10/004,197 dated Nov. 23, 2005; 17 pages.
USPTO Non-Final Rejection for U.S. Appl. No. 10/004,197 dated Jun. 6, 2005; 21 pages.
USPTO Notice of Allowance for U.S. Appl. No. 10/004,039 dated Aug. 15, 2006; 7 pages.
USPTO Non-Final Rejection for U.S. Appl. No. 10/004,039 dated Apr. 11, 2006; 14 pages.
USPTO Final Rejection for U.S. Appl. No. 10/004,039 dated Nov. 22, 2005; 19 pages.

USPTO Non-Final Rejection for U.S. Appl. No. 10/004,039 dated Jun. 6, 2005; 17 pages.
USPTO Notice of Allowance for U.S. Appl. No. 10/001,568 dated Mar. 17, 2006; 9 pages.
USPTO Final Rejection for U.S. Appl. No. 10/001,568 dated Oct. 26, 2005; 16 pages.
USPTO Non-Final Rejection for U.S. Appl. No. 10/001,568 dated May 19, 2005; 16 pages.
USPTO Notice of Allowance for U.S. Appl. No. 09/887,955 dated Oct. 12, 2004; 5 pages.
USPTO Non-Final Rejection for U.S. Appl. No. 09/887,955 dated May 26, 2004; 5 pages.
USPTO Notice of Allowance for U.S. Appl. No. 09/826,397 dated Oct. 7, 2004; 8 pages.
USPTO Non-Final Rejection for U.S. Appl. No. 09/826,397 dated Apr. 21, 2004; 6 pages.
USPTO Notice of Allowance for U.S. Appl. No. 09/893,048 dated Jul. 25, 2006; 4 pages.
USPTO Non-Final Rejection for U.S. Appl. No. 09/893,048 dated Jan. 12, 2006; 6 pages.
USPTO Non-Final Rejection for U.S. Appl. No. 09/893,048 dated Jul. 27, 2005; 6 pages.
USPTO Non-Final Rejection for U.S. Appl. No. 09/893,048 dated Oct. 6, 2004; 5 pages.
USPTO Notice of Allowance for U.S. Appl. No. 09/893,050 dated Jul. 5, 2005; 6 pages.
USPTO Non-Final Rejection for U.S. Appl. No. 09/893,050 dated Jan. 5, 2005; 13 pages.
USPTO Final Rejection for U.S. Appl. No. 09/893,050 dated Aug. 30, 2004; 13 pages.
USPTO Non-Final Rejection for U.S. Appl. No. 09/893,050 dated Jan. 15, 2004; 9 pages.
USPTO Notice of Allowance for U.S. Appl. No. 09/909,047 dated May 11, 2005; 25 pages.
USPTO Notice of Allowance for U.S. Appl. No. 09/909,047 dated Feb. 15, 2005; 6 pages.
USPTO Non-Final Rejection for U.S. Appl. No. 09/909,047 dated Jul. 6, 2004; 9 pages.
USPTO Notice of Allowance for U.S. Appl. No. 09/912,768 dated Sep. 13, 2005; 5 pages.
USPTO Non-Final Rejection for U.S. Appl. No. 09/912,768 dated Apr. 11, 2005; 14 pages.
USPTO Final Rejection for U.S. Appl. No. 09/912,768 dated Nov. 17, 2004; 13 pages.
USPTO Non-Final Rejection for U.S. Appl. No. 09/912,768 dated Jun. 22, 2004; 11 pages.
USPTO Notice of Allowance for U.S. Appl. No. 09/922,579 dated Dec. 28, 2004; 6 pages.
USPTO Non-Final Rejection for U.S. Appl. No. 09/922,579 dated Aug. 18, 2004; 6 pages.
USPTO Notice of Allowance for U.S. Appl. No. 09/923,461 dated May 12, 2005; 6 pages.
USPTO Non-Final Rejection for U.S. Appl. No. 09/923,461 dated Jul. 16, 2004; 6 pages.
USPTO Notice of Allowance for U.S. Appl. No. 09/929,891 dated Dec. 23, 2005; 4 pages.
USPTO Notice of Allowance for U.S. Appl. No. 09/929,891 dated Jun. 15, 2005; 6 pages.
USPTO Non-Final Rejection for U.S. Appl. No. 09/929,891 dated Sep. 13, 2004; 6 pages.
USPTO Notice of Allowance for U.S. Appl. No. 10/803,030 dated Jan. 8, 2007; 6 pages.
USPTO Non-Final Rejection for U.S. Appl. No. 10/803,030 dated Jun. 8, 2005; 4 pages.
USPTO Notice of Allowance for U.S. Appl. No. 10/011,214 dated Apr. 11, 2005; 4 pages.
USPTO Final Rejection for U.S. Appl. No. 10/011,214 dated Jan. 21, 2005; 8 pages.
USPTO Non-Final Rejection for U.S. Appl. No. 10/011,214 dated Aug. 13, 2004; 10 pages.
Hong et al., "Hierarchiai System Test by an IEEE 1149.5 MTM-Bus Slave-Module Interface Core," IEEE, 2000; 14 pages.
Haberl et al., "Self Testable Boards with Standard IEEE 1149.5 Module Test and Maintenance (MTM) Bus Interface," IEEE, 1994; 6 pages.
Varma et al., "A Structured Test Re-Use Methodology for Core-Based System Chips," IEEE, 1998; 9 pages.
Andrews, "Roadmap for Extending IEEE 1149.1 for Hierarchical Control of Locally-Stored, Standardized command Set, Test Programs," IEEE, 1994; 7 pages.
Adham et al., "Preliminary Outline of the IEEE P1500 Scalable Architecture for Testing Embedded Cores," 1999, IEEE; 6 pages.
Ghosh et al., "A Low Overhead Design for Testability and Test Generation Technique for Core-based Systems," IEEE, 1997; 10 pages.
Zorian, "Test Requirements for Embedded Core-based Systems and IEEE P1500," IEEE, 1997; 9 pages.
Zorian at al., "Testing Embedded-Core Based System Chips," IEEE, 1998; 14 pages.
Papachristou et al., "Microprocessor Based Testing for Core-Based System on a Chip," IEEE, 1999; 6 pages.
Maroufi et al., "Solving the I/O Bandwidth Problem in System on a Chip Testing," IEEE, 2000; 6 pages.
Marsh, "Smart Tools Illuminate Deeply Embedded Systems," EDN, 2000; 7 pages.
York et al., "On-chip Support Needed for SOC Debug," Electronic Engineering Times, 1999; 2 pages.
Atmel Corporation: AT9OSC Summary: "Secure Microcontrollers for Smart Cards," 1999; 7 pages.
Hwang et al., "Integrated circuit for automatically varying resistance in computer system, has pair of transistors connected in parallel with respective resistors such that resistors are bypassed when corresponding transistors are enabled," Derwent Information Ltd; 2002; 2 pages.
Morrison, "IBM Eyes Merchant Packaging Services," Jul. 13, 1998; Electronic News <http://www.findarticles.com>; 4 pages.
Charles, Jr. et al., "Wirebonding: Reinventing the Process for MCMs," Apr. 1998; IEEE 7th International Conference on Multichip Modules and High Density Packaging; 3 pages.
Tran et al., "Fine Pitch and Wirebonding and Reliability of Aluminum Capped Copper Bond Pads," May 2000, IEEE Electronic Components and Technology Conference; 8 pages.
Song et al., "A 50% Power Reduction Scheme for CMOS Relaxation Oscillator," IEEE, 1999; 4 pages.
"Electronic Circuit Protector-Circuit Breaker;" IBM Technical Disclosure Bulletin; vol. 36, Issue 8, Aug. 1, 1993; 1 page.
USPTO Final Rejection for U.S. Appl. No. 10/001,478 dated Apr. 20, 2009; 16 pages.
USPTO Notice of Allowance for U.S. Appl. No. 09/994,600 dated Apr. 3, 2009; 5 pages.
USPTO Notice of Allowance for U.S. Appl. No. 09/989,777 dated Mar. 9, 2009; 7 pages.
USPTO Notice of Allowance for U.S. Appl. No. 09/992,076 dated Feb. 27, 2009; 6 pages.
USPTO Non-Final Rejection for U.S. Appl. No. 09/989,771 dated Apr. 30, 2009; 11 pages.
USPTO Notice of Allowance for U.S. Appl. No. 091989,762 dated Mar. 25, 2009; 7 pages.
USPTO Notice of Allowance for U.S. Appl. No. 09/989,762 dated Oct. 24, 2008; 7 pages.
USPTO U.S. Appl. No. 09/989,815: "A Data Driven Method and System for Monitoring Hardware Resource Usage for Programming an Electric Device," Bartz et al., filed on Nov. 19, 2001; 36 pages.
USPTO Notice of Allowance for U.S. Appl. No. 09/989,762 dated Jun. 2, 2008; 6 pages.
USPTO Notice of Allowance for U.S. Appl. No. 09/989,762 dated Jan. 2, 2008; 6 pages.
USPTO Non-Final Rejection for U.S. Appl. No. 09/989,762 dated Jul. 23, 2007; 15 pages.
USPTO Final Rejection for U.S. Appl. No. 09/989,762 dated Jan. 26, 2007; 13 pages.
USPTO Non-Final Rejection for U.S. Appl. No. 09/989,762 dated Aug. 10, 2006; 18 pages.
USPTO Final Rejection for U.S. Appl. No. 09/989,762 dated Mar. 14, 2006; 19 pages.

USPTO Non-Final Rejection for U.S. Appl. No. 09/989,762 dated Jul. 27, 2005; 15 pages.
USPTO U.S. Appl. No. 09/275,336: "Programmable Oscillator Scheme," Mar et al., filed on Mar. 24, 1999; 25 pages.
USPTO U.S. Appl. No. 09/721,316: "Programmable Oscillator Scheme," Mar et al., filed on Nov. 22, 2000; 26 pages.
USPTO U.S. Appl. No. 10/324,455: "Programmable Oscillator Scheme," Mar et al., filed on Dec. 20, 2002; 23 pages.
USPTO U.S. Appl. No. 09/998,859: "A System and a Method for Checking Lock Step Consistency between in Circuit Emulation and a Microcontroller while Debugging Process is in Progress," Craig Nemecek, filed on Nov. 15, 2001; 33 pages.
USPTO U.S. Appl. No. 09/998,834: "A System and a Method for Communication between and Ice and a Production Microcontroller while in a Halt State," Craig Nemecek, filed on Nov. 15, 2001; 33 pages.
USPTO U.S. Appl. No. 10/113,065: "System and Method for Automatically Matching Components in a Debugging System," Nemecek et al., filed on Mar. 29, 2002; 32 pages.
USPTO U.S. Appl. No. 09/989,574: "Method and System for using a Graphics user Interface for Programming an Electronic Device," Bartz et al., filed on Nov. 19, 2001; 43 pages.
USPTO U.S. Appl. No. 09/989,816: "Datasheet Browsing and Creation with Data-Driven Datasheet Tabs within a Microcontroller Design Tool," Bartz et al., filed on Nov. 19, 2001; 55 pages.
"New Object Domain R3 Beta Now Available (Build 134)" Mar. 13, 2001; <http://web.archive.org/web/200100331202605/www.objectdomain.com/domain30/index.html; 2 pages.
"OMG XML Metadata Interchange (XMI) Specifications" 2000; 17 pages.
Electronic Tools Company; E-Studio User Manuel; 2000; retrieved from http://web.archive.org for site http://e-tools.com on Mar. 23, 2005; 77 pages.
Cover Pages Technology Reports; XML and Electronic Design Automation (EDA); Aug. 2000; retrieved from http://xml.coverpages.org on Mar. 23, 2005; 5 pages.
Microsoft Computer Dictionary "ActiveX" 2002; Microsoft Press; 5th Edition; 3 pages.
Wikipedia "XML" retrieved on Jan. 29, 2007 from http://en.wikipedia.org/wiki/XML; 16 pages.
"VHDL Samples" retrieved on Jan. 29, 2007 from http://www.csee.umbc.edu/help/VHDL/samples/samples.shtml; 10 pages.
Anonymous, "Lotus Notes FAQ—How do you generate unique document numbers?" Sep. 19, 1999; retrieved from www.keysolutions.com on Jul. 9, 2008; 1 page.
Ashok Bindra, "Programmable SoC Delivers A New Level of System Flexibility"; Electronic Design; Nov. 6, 2000; 11 pages.
Cypress MicroSystem, Inc. "Cypress Customer Forums" retrieved from <http://www.cypress.com/forums/messageview>; Nov. 30, 2004; 1 page.
Cypress MicroSystem, Inc. "PsoC Designer: Integrated Development Environment User Guide"; Rev, 1.18; Sep. 8, 2003; 193 pages.
Hamblen, "Rapid Prototyping Using Field-Programmable Logic Devices" Jun. 2000, IEEE; 9 pages.
USPTO Final Rejection for U.S. Appl. No. 09/943,062 dated Apr. 30, 2004; 9 pages.
Snyder et al., "Xilinx's A-to-Z Systems Platform" Cahners Microprocessor, The Insider's Guide to Microprocessor Hardware, Feb. 6, 2001; 6 pages.
"PSoC Technology Completely Changes 8-bit MCU System Design" Cypress MicroSystem, Inc. Feb. 19, 2001; 21 pages.
USPTO Non-Final Rejection for U.S. Appl. No. 09/943,062 dated Dec. 8, 2003; 9 pages.
USPTO Advisory Action for U.S. Appl. No. 09/943,062 dated Sep. 25, 2003; 3 pages.
USPTO Final Rejection for U.S Appl. No. 09/943,062 dated Jun. 27, 2003; 8 pages.
USPTO Non-Final Rejection for U.S. Appl. No. 09/943,062 dated Jan. 27, 2003; 7 pages.
USPTO Non-Final Rejection for U.S. Appl. No. 09/943,062 dated Sep. 11, 2002; 9 pages.
"PSoC Designer: Integrated Development Environment" User Guide; Revision 1.11; Last Revised Jul. 17, 2001; 109 pages.

Cypress Microsystems, "Cypress Microsystems Unveils Programmable System-on-a-Chip for Embedded Internet, Communications and Consumer Systems;" 2000, <http://www.cypressmicro.com/corporate/CY_Announces_nov_13_2000.html>; 3 pages.
Huang et al., ICEBERG, An Embedded In-Circuit Emulator Synthesizer for Microcontrollers, Proceedings of the 36th Design Automation Conference Jun. 21-26,1999; 6 pages.
Yoo et al., "Fast Hardware-Software Co-verification by Optimistic Execution of Real Processor," Proceedings of Design, Automation and Test in Europe Conference and Exhibition 2000; 6 pages.
USPTO Advisory Action for U.S. Appl. No. 09/943,062 dated Mar. 27, 2008; 3 pages.
USPTO Final Rejection for U.S. Appl. No. 09/943,062 dated Jan. 18, 2008; 8 pages.
USPTO Non-Final Rejection for U.S. Appl. No. 09/943,062 dated Jun. 22, 2007; 12 pages.
USPTO Miscellaneous Action for U.S. Appl. No. 09/943,062 dated Jan. 30, 2006; 2 pages.
USPTO Notice of Allowance for U.S. Appl. No. 10/113,064 dated Sep. 21, 2006; 7 pages.
USPTO Non-Final Rejection for U.S. Appl. No. 10/113,064 dated Apr. 6, 2006; 19 pages.
USPTO Final Rejection for U.S. Appl. No. 10/113,064 dated Oct. 18, 2005; 22 pages.
USPTO Non-Final Rejection for U.S. Appl. No. 10/113,064 dated Apr. 25, 2005; 15 pages.
USPTO U.S. Appl. No. 10/113,064: "Method and System for Debugging through Supervisory Operating Codes and Self Modifying Codes," Roe et al., filed on Mar. 29, 2002; 36 pages.
USPTO U.S. Appl. No. 10/002,726: "Method and Apparatus for Generating Microcontroller Configuration information," Ogami et al., filed on Oct. 24, 2001; 54 pages.
USPTO Notice of Allowance for U.S. AppL. No. 10/002,726 dated Feb. 6, 2007; 7 pages.
USPTO Non-Final Rejection for U.S. Appl. No. 10/002,726 dated Aug. 28, 2006; 10 pages.
USPTO Final Rejection for U.S. Appl. No. 10/002,726 dated Mar. 27, 2006; 8 pages.
USPTO Final Rejection for U.S. Appl. No. 10/002,726 dated Nov. 30, 2005; 10 pages.
USPTO Non-Final Rejection for U.S. Appl. No. 10/002,726 dated Jun. 10, 2005; 10 pages.
USPTO Non-Final Rejection for U.S. Appl. No. 10/002,726 dated Dec. 13, 2004; 7 pages.
USPTO U.S. Appl. No. 11/818,005: "Techniques for Generating Microcontroller Configuration Information," Ogami of al., filed on Jun. 12, 2007; 61 pages.
USPTO Requirement for Restriction/Election for U.S. Appl. No. 11/818,005 dated Jul. 14, 2009; 5 pages.
USPTO U.S. Appl. No. 11/850,260: "Circuit and Method for Improving the Accuracy of a Crystalless Oscillator Having Dual-Frequency Modes," Wright et al., filed on Sep. 5, 2007; 33 pages.
USPTO Non-Final Rejection for U.S. Appl. No. 11/850,260 dated Mar. 6, 2009; 7 pages.
USPTO Non-Final Rejection for U.S. Appl. No. 11/644,100 dated Mar. 9, 2009; 11 pages.
USPTO Advisory Action for U.S. Appl. No. 11/644,100 dated Feb. 9, 2009; 3 pages.
USPTO Final Rejection for U.S. Appl. No. 11/644,100 dated Nov. 18, 2008; 12 pages.
USPTO Non-Final Rejection for U.S. Appl. No. 11/644,100 dated Apr. 14, 2008; 10 pages.
USPTO Notice of Allowance for U.S. Appl. No. 11/415,588 dated Mar. 11, 2008; 6 pages.
USPTO Advisory Action for U.S. Appl. No. 11/415,588 dated Jan. 14, 2008; 3 pages.
USPTO Final Rejection for U.S. Appl. No. 11/415,588 dated Oct. 19, 2007; 8 pages.
USPTO Non-Final Rejection for U.S. Appl. No. 11/415,588 dated Jun. 13, 2007; 8 pages.
USPTO Notice of Allowance for U.S. Appl. No. 12/218,404 dated Mar. 19, 2009; 7 pages.

USPTO Non-Final Rejection for U.S. Appl. No. 12/218,404 dated Sep. 30, 2008; 8 pages.
USPTO U.S. Appl. No. 11/644,100: "Differential-to-single ended signal converter circuit and method," Jonathon Stiff, filed on Dec. 21, 2006; 33 pages.
USPTO U.S. Appl. No. 11/415,588: "Voltage Controlled Oscillator Delay Cell and Method," Sivadasan et al., filed on May 1, 2006; 24 pages.
USPTO U.S. Appl. No. 12/218,404: "Voltage Controlled Oscillator Delay Cell and Method," Sivadasan et al., filed on Jul. 14, 2008; 23 pages.
USPTO Notice of Allowance for U.S. Appl. No. 11/132,894 dated Apr. 26, 2007; 4 pages.
USPTO Non-Final Rejection for U.S. Appl. No. 11/132,894 dated Dec. 19, 2006; 12 pages.
USPTO U.S. Appl. No. 11/132,894: "Open Loop Bandwidth Test Architecture and Method for Phase Locked Loop (PLL)," Jonathon Stiff, filed on May 19, 2005; 38 pages.
USPTO Non-Final Rejection for U.S. Appl. No. 11/322,044 dated May 4, 2009; 18 pages.
USPTO Non-Final Rejection for U.S. Appl. No. 11/322,044 dated Nov. 25, 2008; 15 pages.
USPTO Non-Final Rejection for U.S. Appl. No. 11/322,044 dated Apr. 11, 2008; 11 pages.
USPTO Advisory Action for U.S. Appl. No. 11/322,044 dated Nov. 30, 2007; 2 pages.
USPTO Final Rejection for U.S. Appl. No. 11/322,044 dated Sep. 21, 2007; 14 pages.
USPTO Non-Final Rejection for U.S. Appl. No. 11/322,044 dated Apr. 24, 2007; 13 pages.
USPTO U.S. Appl. No. 11/322,044: "Split charge pump Pll architecture," Jonathon Stiff, filed on Dec. 28, 2005; 19 pages.
USPTO Notice of Allowance for U.S. Appl. No. 10/305,589 dated Feb. 4, 2005; 5 pages.
USPTO Final Rejection for U.S. Appl. No. 10/305,589 dated Oct. 21, 2004; 7 pages.
USPTO Non-Final Rejection for U.S. Appl. No. 10/305,589 dated Oct. 7, 2003; 6 pages.
USPTO U.S. Appl. No. 10/305,589: "Current Controlled Delay Circuit," Jonathon Stiff, filed on Nov. 26, 2002; 18 pages.
USPTO U.S. Appl. No. 09/849,164: "Reduced Static Phase Error CMOS PLL Charge Pump," Jonathon Stiff, filed on May 4, 2001; 30 pages.
Maneatis, "Low-Jitter Process-Independent DLL and PLL Based on Self-Biased Techniques," IEEE Journal of Solid-State Circuits, vol. 31, No. 11, Nov. 1996; 10 pages.
Larsson, "A 2-1600-MHz CMOS Clock Recovery PLL with Low-Vdd Capability," IEEE Journal of Solid-State Circuits, vol. 34, No. 12, Dec. 1999; 10 pages.
USPTO Notice of Allowance for U.S. Appl. No. 10/327,217 dated Aug. 12, 2004; 6 pages.
USPTO Non-Final Rejection for U.S. Appl. No. 10/327,217 dated Apr. 30, 2004; 5 pages.
USPTO Miscellaneous Action for U.S. Appl. No. 10/327,217 dated Feb. 10, 2004; 1 page.
USPTO U.S. Appl. No. 10/327,217: "Single Ended Clock Signal Generator Having a Differential Output," Richmond et al., filed on Dec. 20, 2002; 27 pages.
USPTO Notice of Allowance for U.S. Appl. No. 10/871,582 dated Mar. 30, 2006; 6 pages.
USPTO Final Rejection for U.S. Appl. No. 10/871,582 dated Feb. 1, 2006; 5 pages.
USPTO Non-Final Rejection for U.S. Appl. No. 10/871,582 dated Sep. 7, 2005; 7 pages.
USPTO U.S. Appl. No. 10/871,582: "LVDS Input Circuit with Extended Common Mode Range," Reinschmidt et al., filed on Jun. 17, 2004; 25 pages.
USPTO Notice of Allowance for U.S. Appl. No. 09/404,891 dated Mar. 4, 2005; 6 pages.
USPTO Final Rejection for U.S. Appl. No. 09/404,891 dated Dec. 8, 2004; 7 pages.
USPTO Non-Final Rejection for U.S. Appl. No. 09/404,891 dated Jun. 25, 2004; 6 pages.
USPTO Non-Final Rejection for U.S. Appl. No. 09/404,891 dated Jan. 5, 2004; 5 pages.
USPTO Non-Final Rejection for U.S. Appl. No. 09/404,891 dated Jul. 10, 2003; 6 pages.
USPTO Non-Final Rejection for U.S. Appl. No. 09/404,891 dated Mar. 5, 2003; 6 pages.
USPTO Non-Final Rejection for U.S. Appl. No. 09/404,891 dated Oct. 11, 2002; 5 pages.
USPTO U.S. Appl. No. 09/404,891: "Method, Architecture and Circuitry for Controlling Pulse Width in a Phase and/or Frequency Detector," Scott et al., filed on Sep. 24, 1999; 17 pages.
USPTO Notice of Allowance for U.S. Appl. No. 10/226,911 dated Aug. 20, 2004; 4 pages.
USPTO Non-Final Rejection for U.S. Appl. No. 10/226,911 dated Mar. 19, 2004; 6 pages.
USPTO U.S. Appl. No. 10/226,911: "Calibration of integrated Circuit Time Constants," Gehring et al.; filed on Aug. 22, 2002; 32 pages.
USPTO Notice of Allowance for U.S. Appl. No. 09/943,149 dated Jan. 12, 2004; 7 pages.
USPTO Non-Final Rejection for U.S. Appl. No. 09/943,149 dated Aug. 28, 2003; 9 pages.
USPTO Final Rejection for U.S. Appl. No. 09/943,149 dated May 7, 2003: 10 pages.
USPTO Non-Final Rejection for U.S. Appl. No. 09/943,149 dated Nov. 20, 2002; 7 pages.
USPTO U.S. Appl. No. 09/943,149: "Method for Phase Locking in a Phase Lock Loop," Moyal et al., filed on Aug. 30, 2001; 21 pages.
Durham et al., "Integrated Continuous-Time Balanced Filters for 16-bit DSP Interfaces," IEEE, 1993; 6 pages.
Durham et al., "Circuit Architectures for High Linearity Monolithic Continuous-Time Filtering," IEEE, 1992; 7 pages.
Durham et al., "High-Linearity Conitnuous-Time Filter in 5-V VLSI CMOS," IEEE, 1992; 8 pages.
USPTO U.S. Appl. No. 09/047,595: "Roving Range Control to Limit Receive PLL Frequency of Operation," Paul H. Scott, filed on Mar. 29, 1998; 35 pages.
USPTO U.S. Appl. No. 09/216,460: "Circuit and Method for Controlling an Output of a Ring Oscillator," Abugharbieh et al., filed on Dec. 18, 1998; 21 pages.
USPTO U.S. Appl. No. 09/471,914: "Reference-Free Clock Generator and Data Recovery Pll," Dalmia et al., filed on Dec. 23, 1999; 32 pages.
USPTO U.S. Appl. No. 09/471,576: "Reference-Free Clock Generation and Data Recovery PLL," Kamal Dalmia, filed on Dec. 23, 1999; 30 pages.
USPTO U.S. Appl. No. 10/083,442: "Method/Architecture for a Low Gain Pll with Wide Frequency Range," Meyers et al., filed on Feb. 26, 2002; 28 pages.
USPTO U.S. Appl. No. 09/470,665: "Digital Phase/Frequency Detector, and Clock Generator and Data Recovery PLL Containing the Same," Kamal Dalmia, filed on Dec. 23, 1999; 26 pages.
USPTO U.S. Appl. No. 09/893,161: "Architecture of a PLL with Dynamic Frequency Control on a PLD," Michael T. Moore, filed on Jun. 27, 2001; 32 pages.
USPTO U.S. Appl. No. 09/608,753: "PLL Lockout Watchdog," Wilson et al., filed on Aug. 24, 2004; 24 pages.
USPTO U.S. Appl. No. 09/398,956: "Frequency Acquisition Rate Control in Phase Lock Loop Circuits," Moyal at al., filed on Sep. 17, 1999; 35 pages.
USPTO U.S. Appl. No. 09/747,262: "Linearized Digital Phase-Locked Loop," Williams et al., filed on Dec. 22, 2000; 9 pages.
USPTO U.S. Appl. No. 09/981,448: "Oscillator Tuning Method," Lane T. Hauck, filed on Oct. 17, 2001; 28 pages.
USPTO U.S. Appl. No. 09/538,989: "Memory Based Phase Locked Loop," Rengarajan S. Krishnan, filed on Mar. 30, 2000; 27 pages.
USPTO U.S. Appl. No. 09/048,905: "Programmable Clock Generator," Mann et al., filed on Mar. 26, 1998; 42 pages.
USPTO U.S. Appl. No. 08/865,342: "Programmable Clock Generator," Mann et al., filed on May 29, 1997; 41 pages.
USPTO Notice of Allowance for U.S. Appl. No. 10/293,392 dated Mar. 10, 2004; 6 pages.
USPTO Non-Final Rejection for U.S. Appl. No. 10/293,392 dated Oct. 16, 2003; 6 pages.

USPTO U.S. Appl. No. 10/293,392: "Low Voltage Receiver Circuit and Method for Shifting the Differential Input Signals of the Receiver Depending on a Common Mode Voltage of the Input Signals," Maher et al., filed on Nov. 13, 2002; 20 pages.
USPTO Notice of Allowance for U.S. Appl. No. 10/288,003 dated Jan. 14, 2005; 6 pages.
USPTO Final Rejection for U.S. Appl. No. 10/288,003 dated Oct. 6, 2004; 6 pages.
USPTO Non-Final Rejection for U.S. Appl. No. 10/288,003 dated Apr. 7, 2004; 9 pages.
USPTO U.S. Appl. No. 10/288,003: "Low Voltage Differential Signal Driver Circuit and Method," Roper et al., filed on Nov. 4, 2002; 30 pages.
USPTO Notice of Allowance for U.S. Appl. No. 09/989,777 dated Mar. 9, 2009; 7 pages.
USPTO Advisory Action for U.S. Appl. No. 11/200,619 dated May 11, 2009; 3 pages.
USPTO Final Rejection for U.S. Appl. No. 11/200,619 dated Mar. 3, 2009; 14 pages.
USPTO Non-Final Rejection for U.S. Appl. No. 11/200,619 dated Aug. 27, 2008; 13 pages.
USPTO U.S. Appl. No. 11/200,619: "Providing hardware independence to automate code generation of processing device firmware," Snyder et al., filed on Aug. 10, 2005; 41 pages.
USPTO Notice of Allowance for U.S. Appl. No. 11/201,922 dated Apr. 9, 2009; 4 pages.
USPTO Non-Final Rejection for U.S. Appl. No. 11/201,922 dated Oct. 21, 2008; 12 pages.
USPTO Final Rejection for U.S. Appl. No. 11/201,922 dated Apr. 30, 2008; 10 pages.
USPTO Non-Final Rejection for U.S. Appl. No. 11/201,922 dated Oct. 15, 2007; 10 pages.
USPTO U.S. Appl. No. 11/201,922: "Design model for a hardware device-independent method of defining embedded firmware for programmable systems," McDonald et al., filed on Aug. 10, 2005; 31 pages.
USPTO Non-Final Rejection for U.S. Appl. No. 11/201,627 dated Dec. 12, 2008; 17 pages.
USPTO Final Rejection for U.S. Appl. No. 11/201,627 dated Apr. 29, 2008; 21 pages.
USPTO Non-Final Rejection for U.S. Appl. No. 11/201,627 dated Nov. 16, 2007; 16 pages.
USPTO U.S. Appl. No. 11/201,627: "Method and an apparatus to design a processing system using a graphical user interface," Ogami et al., filed on Aug. 10, 2005; 37 pages.
USPTO Notice of Allowance for U.S. Appl. No. 09/989,808 dated Feb. 13, 2006; 4 pages.
USPTO Non-Final Rejection for U.S. Appl. No. 09/989,808 dated Oct. 19, 2005; 8 pages.
USPTO Non-Final Rejection for U.S. Appl. No. 09/989,808 dated Apr. 14, 2005; 8 pages.
USPTO U.S. Appl. No. 09/989,808: "Automatic generation of application program interfaces, source code, interrupts, and data sheets for microcontroller programming," Bath et al., filed on Nov. 19, 2001; 67 pages.
USPTO Notice of Allowance for U.S. Appl. No. 10/109,979 dated Mar. 14, 2006; 6 pages.
USPTO Non-Final Rejection for U.S. Appl. No. 10/109,979 dated Jun. 30, 2005; 6 pages.
USPTO U.S. Appl. No. 10/109,979: "Graphical user interface with logic unifying functions," Anderson et al., filed on Mar. 29, 2002; 100 pages.
USPTO U.S. Appl. No. 09/989,781: "System and method for decoupling and iterating resources associated with a module," Ogami et al., filed on Nov. 19, 2001; 40 pages.
USPTO U.S. Appl. No. 09/989,775: "User defined names for registers in memory banks derived from configurations," Ogami et al., filed on Nov. 19, 2001; 29 pages.
USPTO Notice of Allowance for U.S. Appl. No. 09/989,819 dated Jan. 11, 2005; 7 pages.
USPTO Non-Final Rejection for U.S. Appl. No. 09/989,819 dated Jul. 13, 2004; 4 pages.
USPTO Miscellaneous Action for U.S. Appl. No. 09/989,819 dated Dec. 14, 2001; 1 page.
USPTO U.S. Appl. No. 09/989,819: "System and method for creating a boot file utilizing a boot template," Ogami et al., filed on Nov. 19, 2001; 43 pages.
USPTO Notice of Allowance for U.S. Appl. No. 09/989,761 dated Jan. 14, 2005; 6 pages.
USPTO Final Rejection for U.S. Appl. No. 09/989,761 dated Aug. 26, 2004; 7 pages.
USPTO Non-Final Rejection for U.S. Appl. No. 09/989,761 dated Mar. 10, 2004; 6 pages.
USPTO Final Rejection for U.S. Appl. No. 09/989,761 dated Oct. 3, 2003; 7 pages.
USPTO Non-Final Rejection for U.S. Appl. No. 09/989,761 dated Apr. 18, 2003; 5 pages.
USPTO U.S. Appl. No. 09/989,761: "Storing of global parameter defaults and using them over two or more design projects," Ogami et al., filed on Nov. 19, 2001; 37 pages.
Wang, et al. "Synthesizing Operating System Based Device Drivers in Embedded Systems," Oct. 1-3, 2003; ACM; 8 pages.
Lutovac et al. "Symbolic Computation of Digital Filter Transfer Function Using MATLAB," Proceedings of 23rd International Conference on Microelectronics (MIEL 2002), vol. 2 NIS, Yugoslavia; 4 pages.
Nouta et al. "Design and FPGA-Implementation of Wave Digital Bandpass Filters with Arbitrary Amplitude Transfer Characteristics," Proceedings of IEEE International Symposium on Industrial Electronics; 1998, vol. 2; 5 pages.
Xilinx, Virtex-II Pro Platform FPGA Developer's Kit, "How Data2BRAM Fits in with Hardware and Software Flows," Chapter 2: Using Data2BRAM; Jan. 2003 Release; 2 pages.
PCT Preliminary Report on Patentability (Chapter 1 of the Patent Cooperation Treaty), PCT/US2005/028793, filed Aug. 12, 2005, mailed Dec. 21, 2007; 2 pages.
PCT Written Opinion of the International Searching Authority for PCTIUS2005/028793, filed Aug. 12, 2005, mailed Nov. 19, 2007; 7 pages.
PCT International Search Report of the International Searching Authority for PCT/US05/28793, filed Aug. 12, 2005, mailed Nov. 19, 2007; 5 pages.
International Search Report and Written Opinion of the International Searching Authority for PCT/US05/28898, filed Aug. 12, 2005, mailed Mar. 6, 2007; 6 pages.
Burogs et at, "Power Converter Analysis and Design using Matlab: a Transfer Function Approach," Proceedings of IEEE International Symposium on Industrial Electronics 1998, vol. 2; 6 pages.
Efstathiou, "Analog Electronics: Basic Circuits of Operational Amplifiers," <http://web,archive.org/web/20021231045232> Dec. 31, 2002, version, retrieved from the internet Archives; 10 pages.
PCT International Search Report for PCT/US05/28791, filed Aug. 12, 2005, mailed Mar. 31, 2008; 4 pages.
PCT International Written Opinion for PCT/US05/28791, filed Aug. 12, 2005, mailed Mar. 31, 2008; 8 pages.
Kory Hopkins, "Definition;" Jan. 16, 1997; <http://www.cs.sfu.ca/cs/people/GradStudent.html>; 1 page.
Ebeling et al., "Validating VLSI Circuit Layout by Wirelist Comparison;" Sep. 1983; in proceedings of the IEEE International Conference on Computer Aided Design (ICCAD-83); 2 pages.
"The Gemini Netlist Comparison Project:" <http://www.cs.washington.edu/research/projects/lis/vvww/gemini/gemini.html> larry@cs.washington.edu; Mar. 19, 2002; 2 pages.
Ohlrich et al., "Sub-Gemini: Identifying Subcircuits using a Fast Subgraph Isomorphism Algorithm;" Jun. 1993; in proceedings of the 30th IEEE/ACM Design Automation Conference; 7 pages.
Ebling, "Gemini II: A Second Generation Layout Validation Program;" 1988; in proceedings of the IEEE International Conference on Computer Aided Design (ICCAD-88); 4 pages.
USPTO U.S. Appl. No. 12/132,527: "System and Method for Performing Next Placements and Pruning of Disallowed Placements for Programming an Integrated Circuit;" Ogami et al., filed on Jun. 3, 2008; 44 pages.

USPTO U.S. Appl. No. 12/356,468: "System and Method for Dynamically Generating a Configuration Datasheet," Anderson et al.; filed on Jan. 20, 2009; 27 pages.
Written Opinion of the International Search Authority for International Application No. PCT/US08/60680 dated Aug. 15, 2008; 4 pages.
USPTO Notice of Allowance for U.S. Appl. No. 09/475,879 dated Oct. 22, 2004; 7 pages.
USPTO Advisory Action for U.S. Appl. No. 09/475,879 dated Mar. 4, 2002; 3 pages.
USPTO Advisory Action for U.S. Appl. No. 09/475,879 dated Dec. 31, 2001; 3 pages.
USPTO Final Rejection for U.S. Appl. No. 09/475,879 dated Oct. 11, 2001; 10 pages.
USPTO Non-Final Rejection for U.S. Appl. No. 09/475,879 dated Mar. 8, 2001; 6 pages.
USPTO U.S. Appl. No. 09/475,879: "Programmable Logic Device," Lacey et al.; filed on Dec. 30, 1999; 50 pages.
USPTO U.S. Appl. No. 09/475,808: "Configurable Memory for Programmable Logic Circuits," Lacey et al., filed on Dec. 30, 1999; 24 pages.
USPTO Non-Final Rejection for U.S. Appl. No. 09/475,808 dated Jun. 6, 2001; 8 pages.
USPTO Notice of Allowance for U.S. Appl. No. 09/475,808 dated Nov. 6, 2001; 8 pages.
USPTO U.S. Appl. No. 10/137,497: "Reconfigurable Testing System and Method," Pleis et al.; filed on May 1, 2002; 40 pages.
USPTO Non-Final Rejection for U.S. Appl. No. 10/137,497 dated Nov. 5, 2004; 17 pages.
USPTO Final Rejection for U.S. Appl. No. 10/137,497 dated May 5, 2005; 13 pages.
USPTO Non-Final Rejection for U.S. Appl. No. 10/137,497 dated Sep. 22, 2005; 21 pages.
USPTO Final Rejection for U.S. Appl. No. 10/137,497 dated Mar. 13, 2006; 15 pages.
USPTO Non-Final Rejection for U.S. Appl. No. 10/137,497 dated Aug. 2, 2006; 21 pages.
USPTO Notice of Allowance for U.S. Appl. No. 10/137,497 dated Jan. 24, 2007; 12 pages.
USPTO Notice of Allowance for U.S. Appl. No. 10/137,497 dated Jul. 20, 2007; 4 pages.
USPTO U.S. Appl. No. 10/653,050: "Method and System for Programming a Memory Device," Snyder et al.; filed on Aug. 29, 2003; 69 pages.
USPTO Non-Final Rejection for U.S. Appl. No. 10/653,050 dated Apr. 6, 2004; 7 pages.
USPTO Notice of Allowance for U.S. Appl. No. 10/653,050 dated Jul. 29, 2004; 3 pages.
USPTO U.S. Appl. No. 10/172,670: "Method and System for Programming a Memory Device," Snyder et al.; filed on Jun. 13, 2002; 66 pages.
USPTO U.S. Appl. No. 11/986,338; Reconfigurable Testing System and Method, Pleis et al., filed on Nov. 20, 2007; 41 pages.
USPTO Notice of Allowance for U.S. Appl. No. 11/965,291 dated May 5, 2009; 7 pages.
USPTO Non-Final Rejection for U.S. Appl. No. 11/965,291 dated Dec. 17, 2008; 8 pages.
USPTO U.S. Appl. No. 11/965,291: "Universal Digital Block Interconnection and Channel Routing," Snyder et al., filed on Dec. 27, 2007; 31 pages.
USPTO Notice of Allowance for U.S. Appl. No. 11/986,338 dated May 7, 2009; 1 page.
USPTO U.S. Appl. No. 11/273,708: "Capacitance Sensor Using Relaxation Oscillators," Snyder et al., filed on Nov. 14, 2005; 33 pages.
USPTO Non-Final Rejection for U.S. Appl. No. 11/273,708 dated Mar. 19, 2007; 16 pages.
USPTO Final Rejection for U.S. Appl. No. 11/273,708 dated Jul. 5, 2007; 8 pages.
USPTO Notice of Allowance for U.S. Appl. No. 11/273,708 dated Aug. 9, 2007; 4 pages.

USPTO U.S. Appl. No. 11/337,272: "Successive Approximate Capacitance Measurement Circuit;" Warren Snyder, filed on Jan. 20, 2006 29 pages.
USPTO Requirement for Restriction/Election for U.S. Appl. No. 11/337,272 dated Sep. 11, 2006; 5 pages.
USPTO Non-Final Rejection for U.S. Appl. No. 11/337,272 dated Oct. 24, 2006; 9 pages.
USPTO Final Rejection for U.S. Appl. No. 11/337,272 dated Feb. 2, 2007; 11 pages.
USPTO Advisory Action for U.S. Appl. No. 11/337,272 dated Apr. 3, 2007; 3 pages.
USPTO Non-Final Rejection for U.S. Appl. No. 11/337,272 dated May 17, 2007; 11 pages.
USPTO Notice of Allowance for U.S. Appl. No. 11/337,272 dated Aug. 15, 2007; 9 pages.
USPTO U.S. Appl. No. 11/983,291: "Successive Approximate Capacitance Measurement Circuit", Warren Snyder, filed on Nov. 7, 2007; 26 pages.
USPTO Non-Final Rejection for U.S. Appl. No. 11/983,291 dated Mar. 9, 2009; 9 pages.
USPTO U.S. Appl. No. 11/698,660: "Configurable Bus," Kutz et al., filed on Jan. 25, 2007; 35 pages.
USPTO Non-Final Rejection for U.S. Appl. No. 11/698,660 dated Dec. 2, 2008; 12 pages.
USPTO Final Rejection for U.S. Appl. No. 11/698,660 dated May 28, 2009; 12 pages.
USPTO U.S. Appl. No. 11/709,866: "Input/Output Multiplexer Bus," Dennis Sequine, filed on Feb. 21, 2007; 33 pages.
USPTO Non-Final Rejection for U.S. Appl. No. 11/709,866 dated Nov. 7, 2008; 14 pages.
USPTO Notice of Allowance for U.S. Appl. No. 11/709,866 dated Apr. 7, 2009; 8 pages.
Sedra et al., "Microelectronic Circuits," 3rd Edition, 1991, Oxford University Press, Feb. 5, 2007; 20 pages.
Van Ess, David; "Simulating a 555 Timer with PSoC," Cypress Semiconductor Corporation, Application Note AN2286, May 19, 2005; 10 pages.
Cypress Semiconductor Corporation, "Fan Controller CG6457AM and CG6462AM," PSoC Mixed Signal Array Preliminary Data Sheet; May 24, 2005; 25 pages.
Cypress Semiconductor Corporation, "PSoC Mixed-Signal Controllers," Production Description; <http://www.cypress.com/portal/server>; retrieved on Sep. 27, 2005; 2 pages.
Cypress Semiconductor Corporation, "CY8C21x34 Data Sheet," CSR User Module, CSR V.1.0; Oct. 6, 2005; 36 pages.
Chapweske, Adam; "The PS/2 Mouse Interface," PS/2 Mouse Interfacing, 2001, retrieved on May 18, 2006; 11 pages.
Cypress Semiconductor Corporation, "Cypress Introduces PSoC(TM)-Based Capacitive Touch Sensor Solution," Cypress Press Release; May 31, 2005; <http://www.cypress.com/portal/server; retrieved on Feb. 5, 2007; 4 pages.
Seguine, Ryan; "Layout Guidelines for PSoC CapSense," Cypress Semiconductor Corporation, Application Note AN2292; Jul. 22, 2005; 13 pages.
Lee, Mark; "EMC Design Considerations for PSoC CapSense Applications," Cypress Semiconductor Corporation, Application Note AN2318; Sep. 16, 2005; 6 pages.
Cypress Semiconductor Corporation, "Release Notes srn017," Jan. 24, 2007; 3 pages.
Cypress Semiconductor Corporation, "PSoC CY8C20x34 Technical Reference Manual (TRM)," PSoC CY8C20x34 TRM, Version 1.0, 2006; 220 pages.
USPTO U.S. Appl. No. 11/166,622: "Touch wake for electronic devices," Beard at al., filed on Jun. 23, 2005; 22 pages.
International Written Opinion of the International Searching Authority for International Application No. PCT/US2006/09572 dated Jan. 10, 2008; 5 pages.
International Search Report for International Application No. PCT/US2006/09572 dated Jan. 10, 2008; 2 pages.
USPTO Notice of Allowance for U.S. Appl. No. 10/024,093 dated Sep. 10, 2002; 7 pages.

USPTO U.S. Appl. No. 10/024,093: "Configurable Memory for Programmable Logic Circuits," Lacey et al., filed on Dec. 18, 2001; 25 pages.
USPTO U.S. Appl. No. 11/088,028: "Method and Circuit for Rapid Alignment of Signals," Moyal et al., filed on Nov. 13, 2007; 34 pages.
USPTO Notice of Allowance for U.S. Appl. No. 11/088,028 dated Jul. 2, 2007; 6 pages.
USPTO Notice of Allowance for U.S. Appl. No. 11/088,028 dated Jan. 26, 2007; 6 pages.
USPTO Non-Final Rejection for U.S. Appl. No. 11/088,028 dated Jun. 16, 2006; 8 pages.
USPTO U.S. Appl. No. 11/985,340: "Method and Circuit for Rapid Alignment of Signals," Moyal et al., filed on Nov. 13, 2007; 34 pages.
USPTO Notice of Allowance for U.S. Appl. No. 11/985,340 dated Jun. 2, 2009; 7 pages.
USPTO Requirement for Restriction for U.S. Appl. No. 11/985,340 dated Mar. 16, 2009; 7 pages.
USPTO Non-Final Rejection for U.S. Appl. No. 11/865,672 dated Jul. 17, 2009; 6 pages.
USPTO Non-Final Rejection for U.S. Appl. No. 11/859,547 dated Oct. 1, 2009; 9 pages.
USPTO Non-Final Rejection for U.S. Appl. No. 11/967,243 dated Sep. 17, 2009; 9 pages.
USPTO Non-Final Rejection for U.S. Appl. No. 11/967,240 dated Jun. 10, 2009; 7 pages.
USPTO Non-Final Rejection for U.S. Appl. No. 11/857,947 dated Mar. 30, 2009; 18 pages.
USPTO Non-Final Rejection for U.S. Appl. No. 12/104,672 dated Aug. 26, 2009; 11 pages.
USPTO Non-Final Rejection for U.S. Appl. No. 12/060,128 dated Apr. 29, 2009; 11 pages.
International Search Report of the International Searching Authority for International Application No. PCT/US08/60695 dated Jul. 22, 2009; 3 pages.
Written Opinion of the International Searching Authority for International Application No. PCT/US08/60695 dated Jul. 22, 2009; 6 pages.
Azim et al., "A Custom DSP Chip to Implement a Robot Motion Controller Proceedings of the IEEE Custom Integrated Circuits Conference," May 1988, pp. 8.7.1-8.7.5; 6 pages.
Catthoor et al., "Architectural Strategies for an Application-Specific Synchronous Multiprocessor Environment," IEEE transactions on Acoustics, Speech, and Signal Processing; vol. 36, No. 2, Feb. 1988, pp. 265-284; 20 pages.
International Search Report of the International Searching Authority for international Application No. PCT/US08/60696 dated Sep. 22, 2008; 2 pages.
International Search Report of the International Searching Authority for international Application No. PCT/US08/60698 dated Sep. 5, 2008; 2 pages.
Shahbahrami et al., "Matrix Register File and Extended Subwords: Two Techniques for Embedded Media Processors," ACM, May 2005; 9 pages.
Jung et al., "A Register File with Transposed Access Mode," 2000, IEEE; 2 pages.
International Search Report of the International Searching Authority for International Application No. PCT/US08/60681 dated Sep. 12, 2008; 2 pages.
Written Opinion of the international Searching Authority for International Application No. PCT/US08/60681 dated Sep. 12, 2008; 4 pages.
USPTO Notice of Allowance for U.S. Appl. No. 11/965,677 dated Sep. 10, 2009; 6 pages.
USPTO Non-Final Rejection for U.S. Appl. No. 11/965,677 dated Mar. 10, 2009; 10 pages.
Written Opinion of the International Searching Authority for International Application No. PCT/US08/60696 dated Sep. 22, 2008; 4 pages.
USPTO Notice of Allowance for U.S. Appl. No. 10/238,966 dated Aug. 5, 2009; 5 pages.
USPTO Notice of Allowance for U.S. Appl. No. 10/033,027 dated Sep. 2, 2009; 4 pages.
USPTO Non-Final Rejection for U.S. Appl. No. 10/001,478 dated Aug. 4, 2009; 17 pages.
USPTO Advisory Action for U.S. Appl. No. 10/001,478 dated Jun. 30, 2009; 3 pages.
USPTO Final Rejection for U.S. Appl. No. 10/001,478 dated Apr. 20, 2009; 16 pages.
USPTO Notice of Allowance for U.S. Appl. No. 10/002,217 dated Sep. 17, 2009; 6 pages.
USPTO Notice of Allowance for U.S. Appl. No. 10/002,217 dated Jun. 8, 2009; 8 pages.
USPTO Notice of Allowance for U.S. Appl. No. 10/001,477 dated Dec. 4, 2009; 7 pages.
USPTO Notice of Allowance for U.S. Appl. No. 10/001,477 dated Aug. 26, 2009; 6 pages.
USPTO Ex Parte Quayle Action for U.S. Appl. No. 09/975,115 dated Aug. 20, 2009; 7 pages.
USPTO Non-Final Rejection for U.S. Appl. No. 09/994,601 dated Jul. 9, 2009; 11 pages.
USPTO Non-Final Rejection for U.S. Appl. No. 11/818,005 dated Nov. 23, 2009; 8 pages.
USPTO Requirement for Restriction/Election for U.S. Appl. No. 11/818,005 dated Jul. 14, 2009; 5 pages.
USPTO Advisory Action for U.S. Appl. No. 09/989,778 dated Jun. 17, 2009; 3 pages.
USPTO Notice of Allowance for U.S. Appl. No. 09/994,600 dated Aug. 25, 2009; 4 pages.
USPTO Notice of Allowance for U.S. Appl. No. 09/994,600 dated Apr. 3, 2009; 5 pages.
USPTO Notice of Allowance for U.S. Appl. No. 09/989,762 dated Oct. 30, 2009; 6 pages.
USPTO Notice of Allowance for U.S. Appl. No. 09/989,762 dated Jul. 16, 2009; 6 pages.
USPTO Non-Final Rejection for U.S. Appl. No. 09/998,848 dated May 12, 2009; 16 pages.
USPTO Non-Final Rejection for U.S. Appl. No. 09/989,767 dated May 12, 2009; 21 pages.
USPTO Final Rejection for U.S. Appl. No. 09/989,771 dated Nov. 25, 2009; 12 pages.
USPTO Notice of Allowance for U.S. Appl. No. 09/989,765 dated Sep. 3, 2009; 7 pages.
USPTO Non-Final Rejection for U.S. Appl. No. 09/989,782 dated Oct. 27, 2009; 9 pages.
USPTO Final Rejection for U.S. Appl. No. 09/989,782 dated May 15, 2009; 10 pages.
USPTO Notice of Allowance for U.S. Appl. No. 11/986,338 dated Oct. 19, 2009; 4 pages.
USPTO Notice of Allowance for U.S. Appl. No. 09/989,777 dated Aug. 6, 2009; 8 pages.
USPTO Notice of Allowance for U.S. Appl. No. 10/008,096 dated Oct. 21, 2009; 6 pages.
USPTO Notice of Allowance for U.S. Appl. No. 10/008,096 dated Jun. 5, 2009; 12 pages.
USPTO Notice of Allowance for U.S. Appl. No. 11/985,340 dated Nov. 9, 2009; 7 pages.
USPTO Advisory Action for U.S. Appl. No. 11/201,627 dated Sep. 21, 2009; 3 pages.
USPTO Final Rejection for U.S. Appl. No. 11/201,627 dated Jul. 7, 2009; 19 pages.
USPTO Miscellaneous Action for U.S. Appl. No. 11/201,922 dated Oct. 1, 2009; 2 pages.
USPTO Non-Final Rejection for U.S. Appl. No. 11/200,619 dated Jun. 17, 2009; 12 pages.
USPTO Non-Final Rejection for U.S. Appl. No. 11/166,622 dated Sep. 29, 2009; 11 pages.
USPTO Advisory Action for U.S. Appl. No. 11/166,622 dated May 27, 2009; 3 pages.
USPTO Final Rejection for U.S. Appl. No. 11/166,622 dated Mar. 10, 2009; 11 pages.
USPTO Notice of Allowance for U.S. Appl. No. 12/218,404 dated Nov. 3, 2009; 8 pages.
USPTO Notice of Allowance for U.S. Appl. No. 12/218,404 dated Jul. 10, 2009; 7 pages.

USPTO Notice of Allowance for U.S. Appl. No. 11/709,866 dated Aug. 4, 2009; 7 pages.
USPTO Non-Final Rejection for U.S. Appl. No. 11/698,660 dated Oct. 7, 2009; 12 pages.
USPTO Advisory Action for U.S. Appl. No. 11/698,660 dated Jul. 31, 2009; 3 pages.
USPTO Notice of Allowance for U.S. Appl. No. 11/983,291 dated Oct. 22, 2009; 7 pages.
USPTO Final Rejection for U.S. Appl. No. 11/983,291 dated Aug. 12, 2009; 10 pages.
USPTO Final Rejection for U.S. Appl. No. 11/322,044 dated Oct. 19, 2009; 10 pages.
USPTO Final Rejection for U.S. Appl. No. 11/644,100 dated Aug. 19, 2009; 12 pages.
USPTO Advisory Action for U.S. Appl. No. 11/850,260 dated Nov. 2, 2009; 3 pages.
USPTO Final Rejection for U.S. Appl. No. 11/850,260 dated Aug. 21, 2009; 9 pages.
USPTO Final Rejection for U.S. Appl. No. 09/989,767 dated Dec. 7, 2009; 22 pages.
USPTO Final Rejection for U.S. Appl. No. 11/698,660 dated Feb. 16, 2010; 14 pages.
USPTO Notice of Allowance for U.S. Appl. No. 09/989,765 dated 12/2212009; 8 pages.
USPTO Notice of Allowance for U.S. Appl. No. 09/994,600 dated Jan. 4, 2010; 4 pages.
USPTO Notice of Allowance for U.S. Appl. No. 10/002,217 dated Jan. 11, 2010; 7 pages.
USPTO Notice of Allowance for U.S. Appl. No. 09/989,777 dated Jan. 15, 2010; 8 pages.
USPTO Notice of Allowance for U.S. Appl. No. 11/965,291 dated Jan. 13, 2010; 4 pages.
USPTO Notice of Allowance for U.S. Appl. No. 09/975,115 dated Jan. 29, 2010; 9 pages.
USPTO Notice of Allowance for U.S. Appl. No. 10/238,966 dated Feb. 1, 2010; 4 pages.
USPTO Final Rejection for U.S. Appl. No. 09/994,601 dated Jan. 5, 2010; 13 pages.
USPTO Non-Final Rejection for U.S. Appl. No. 09/998,848 dated Dec. 10, 2009; 16 pages.
USPTO Notice of Allowance for U.S. Appl. No. 10/008,096 dated Feb. 1, 2010; 6 pages.
USPTO Non-Final Rejection for U.S. Appl. No. 11/201,627 dated Dec. 24, 2009; 22 pages.
USPTO Final Rejection for U.S. Appl. No. 11/200,619 dated Jan. 4, 2010; 18 pages.
USPTO Non-Final Rejection for U.S. Appl. No. 11/644,100 dated Dec. 16, 2009; 13 pages.
USPTO Non-Final Rejection for U.S. Appl. No. 11/850,260 dated Jan. 14, 2010; 8 pages.
USPTO Notice of Allowance for U.S. Appl. No. 10/033,027 dated Feb. 18, 2010; 4 pages.
USPTO Notice of Allowance for U.S. Appl. No. 09/989,762 dated Feb. 22, 2010; 7 pages.
USPTO Notice of Allowance for U.S. Appl. No. 11/986,338 dated Feb. 16, 2010; 4 pages.
USPTO Non-Final Rejection for U.S. Appl. No. 12/136,557 dated Mar. 15, 2010; 10 pages.
USPTO Notice of Allowance for U.S. Appl. No. 11/965,677 dated Feb. 12, 2010; 4 pages.
USPTO Notice of Allowance for U.S. Appl. No. 11/985,340 dated Feb. 19, 2010; 8 pages.
USPTO Notice of Allowance for U.S. Appl. No. 12/218,404 dated Feb. 16, 2010; 7 pages.
USPTO Notice of Allowance for U.S. Appl. No. 11/709,866 dated Feb. 16, 2010; 7 pages.
USPTO Notice of Allowance for U.S. Appl. No. 10/001,477 dated Mar. 23, 2010; 6 pages.
USPTO Notice of Allowance for U.S. Appl. No. 09/989,765 dated Mar. 31, 2010; 8 pages.
USPTO Notice of Allowance for U.S. Appl. No. 12/104,672 dated Jan. 11, 2010; 7 pages.
USPTO Non-Final Rejection for U.S. Appl. No. 11/799,439 dated Nov. 2, 2007; 7 pages.
USPTO Non-Final Rejection for U.S. Appl. No. 11/799,439 dated May 29, 2008; 8 pages.
USPTO Final Rejection for U.S. Appl. No. 11/799,439 dated Dec. 18, 2008; 6 pages.
USPTO Notice of Allowance for U.S. Appl. No. 11/799,439 dated Jun. 25, 2009; 6 pages.
USPTO Notice of Allowance for U.S. Appl. No. 11/799,439 dated Feb. 5, 2010; 4 pages.
USPTO Notice of Allowance for U.S. Appl. No. 10/256,829 dated May 10, 2010; 4 pages.
USPTO Non-Final Rejection for U.S. Appl. No. 10/256,829 dated Oct. 26, 2009; 8 pages.
USPTO Final Rejection for U.S. Appl. No. 10/256,829 dated Jun. 23, 2009; 8 pages.
USPTO Non-Final Rejection for U.S. Appl. No. 10/256,829 dated Jan. 7, 2009; 7 pages.
USPTO Non-Final Rejection for U.S. Appl. No. 10/256,829 dated Jun. 26, 2008; 11 pages.
USPTO Notice of Allowance for U.S. Appl. No. 10/256,829 dated Oct. 29, 2007; 6 pages.
USPTO Final Rejection for U.S. Appl. No. 10/256,829 dated Jun. 1, 2007; 16 pages.
USPTO Non-Final Rejection for U.S. Appl. No. 10/256,829 dated Nov. 2, 2006; 13 pages.
USPTO Non-Final Rejection for U.S. Appl. No. 10/256,829 dated May 3, 2006; 16 pages.
USPTO Final Rejection for U.S. Appl. No. 10/256,829 dated Jan. 27, 2006; 24 pages.
USPTO Non-Final Rejection for U.S. Appl. No. 10/256,829 dated Jul. 28, 2005; 14 pages.
USPTO Notice of Allowance for U.S. Appl. No. 09/989,817 dated May 9, 2005; 6 pages.
USPTO Non-Final Rejection for U.S. Appl. No. 09/989,817 dated Jan. 12, 2005; 5 pages.
USPTO Non-Final Rejection for U.S. Appl. No. 09/989,817 dated Jun. 8, 2004; 7 pages.
USPTO Notice of Allowance for U.S. Appl. No. 10/327,207 dated Jun. 11, 2007; 4 pages.
USPTO Notice of Allowance for U.S. Appl. No. 10/327,207 dated Dec. 26, 2006; 5 pages.
USPTO Non-Final Rejection for U.S. Appl. No. 10/327,207 dated Jul. 21, 2006; 12 pages.
USPTO Final Rejection for U.S. Appl. No. 10/327,207 dated Mar. 2, 2006; 13 pages.
USPTO Non-Final Rejection for U.S. Appl. No. 10/327,207 dated Sep. 20, 2005; 11 pages.
USPTO Miscellaneous Action for U.S. Appl. No. 10/327,207 dated May 13, 2003; 1 page.
USPTO Notice of Allowance for U.S. Appl. No. 09/989,570 dated May 19, 2005; 4 pages.
USPTO Non-Final Rejection for U.S. Appl. No. 09/989,570 dated Jan. 26, 2005; 9 pages.
USPTO Notice of Allowance for U.S. Appl. No. 09/989,570 dated Sep. 10, 2004; 8 pages.
USPTO Non-Final Rejection for U.S. Appl. No. 09/989,570 dated Mar. 25, 2004; 8 pages.
USPTO Non-Final Rejection for U.S. Appl. No. 09/989,570 dated Oct. 7, 2003; 6 pages.
USPTO Advisory Action for U.S. Appl. No. 09/989,570 dated Aug. 14, 2003; 3 pages.
USPTO Final Rejection for U.S. Appl. No. 09/989,570 dated May 30, 2003; 9 pages.
USPTO Non-Final Rejection for U.S. Appl. No. 09/989,570 dated Jan. 2, 2003; 7 pages.
USPTO Notice of Allowance for U.S. Appl. No. 09/989,571 dated Sep. 13, 2005; 6 pages.
USPTO Non-Final Rejection for U.S. Appl. No. 09/989,571 dated May 23, 2005; 8 pages.
USPTO Final Rejection for U.S. Appl. No. 09/989,571 dated Jan. 26, 2005; 11 pages.

USPTO Non-Final Rejection for U.S. Appl. No. 09/989,571 dated Jul. 12, 2004; 9 pages.

M. Mooris Mano, "Computer System Architecture," 1982, Prentice-Hall, 2nd Edition, pp. 261-264 and 435-440; 14 pages.

Dirk Killat, "A One-Chip Solution for Electronic Ballasts in Fluorescent Lamps," Power Electronics, <http://powerelectronics.com/mag/power_onechip_solution_electronic/>, dated Mar. 1, 2004, accessed Sep. 13, 2005; 4 pages.

Fred Eady, "PSoC 101," Circuit Cellar, Aug. 2004, accessed Sep. 13, 2005, <http://www.circuitcellar.com/library/print/0804/eady169/2.htm>; 4 pages.

USPTO Notice of Allowance for U.S. Appl. No. 10/803,030 dated Jan. 8, 2007; 6 pages.

USPTO Non-Final Rejection for U.S. Appl. No. 10/803,030 dated Jun. 8, 2005; 4 pages.

U.S. Appl. No. 12/058,586: "System and Method for Monitoring a Target Device," Ogami et al., filed on Mar. 28, 2008; 41 pages.

U.S. Appl. No. 12/058,534: "System and Method for Controlling a Target Device," Ogami et al., filed on Mar. 28, 2008; 40 pages.

U.S. Appl. No. 12/004,833: "Systems and Methods for Dynamically Reconfiguring a Programmable System on a Chip," Ogami et al., filed on Dec. 21, 2007; 40 pages.

U.S. Appl. No. 12/058,569: "Configuration of Programmable IC Design Elements," Best et al., filed on Mar. 28, 2008; 19 pages.

U.S. Appl. No. 12/057,149: "Power Management Architecture, Method and Configuration System," Kenneth Ogami, filed on Mar. 27, 2008; 34 pages.

U.S. Appl. No. 12/765,400: "Autonomous Control in a Programmable System," Sullam et al., filed on Apr. 22, 2010; 30 pages.

International Search Report for International Application No. PCT/US10/33626 mailed Jun. 24, 2010; 3 pages.

The Written Opinion of the International Search Report for International Application No. PCT/US10/33626 mailed Jun. 24, 2010; 5 pages.

USPTO Non-Final Rejection for U.S. Appl. No. 12/060,176 dated Mar. 30, 2010; 22 pages.

John Mangino, "Using DMA with High Performance Peripherals to Maximize System Performance," 2007, Texas Instruments, pp. 1-23; 23 pages.

Balough et al., "White Paper: Comparing IP Integration Approaches for FPGA Implementation," Feb. 2007, Version 1.1, Altera, pp. 1-7; 7 pages.

A.F. Harvey, "DMA Fundamentals on Various PC Platforms," 2001, 2004, National Instruments Corporation, pp. 1-19; 19 pages.

Vixel, "InSpeed SOC 320 Embedded Storage Switch," 2003, Vixel, pp. 1-5; 5 pages.

USPTO Advisory Action for U.S. Appl. No. 09/994,601 dated Mar. 23, 2010; 2 pages.

USPTO Non-Final Rejection for U.S. Appl. No. 11/818,005 dated Oct. 26, 2010; 10 pages.

USPTO Final Rejection for U.S. Appl. No. 12/132,527 dated Oct. 14, 2010; 8 pages.

USPTO Notice of Allowance for U.S. Appl. No. 09/998,848 dated Oct. 13, 2010; 4 pages.

USPTO Non-Final Rejection for U.S. Appl. No. 09/998,848 dated Jun. 21, 2010; 15 pages.

USPTO Advisory Action for U.S. Appl. No. 09/998,848 dated Feb. 24, 2010; 3 pages.

USPTO Non-Final Rejection for U.S. Appl. No. 09/989,767 dated Jul. 9, 2010; 22 pages.

USPTO Non-Final Rejection for U.S. Appl. No. 09/989,771 dated Jul. 20, 2010; 12 pages.

USPTO Advisory Action for U.S. Appl. No. 09/989,771 dated Feb. 3, 2010; 3 pages.

USPTO Miscellaneous Action for U.S. Appl. No. 10/113,581 dated Jun. 23, 2010; 6 pages.

USPTO Notice of Allowance for U.S. Appl. No. 10/113,581 dated Sep. 3, 2010; 11 pages.

USPTO Advisory Action for U.S. Appl. No. 11/698,660 dated Nov. 10, 2010; 3 pages.

USPTO Final Rejection for U.S. Appl. No. 11/698,660 dated Sep. 3, 2010; 19 pages.

USPTO Final Rejection for U.S. Appl. No. 12/060,176 dated Oct. 12, 2010; 22 pages.

USPTO Notice of Allowance for U.S. Appl. No. 12/057,149 dated Nov. 30, 2010; 7 pages.

USPTO Notice of Allowance for U.S. Appl. No. 09/943,062 dated Jun. 29, 2010; 4 pages.

USPTO Non-Final Rejection for U.S. Appl. No. 12/104,678 dated Jul. 2, 2010; 8 pages.

USPTO Miscellaneous Action for U.S. Appl. No. 10/001,478 dated Feb. 23, 2010; 5 pages.

USPTO Notice of Allowance for U.S. Appl. No. 10/001,478 dated Jun. 2, 2010; 11 pages.

USPTO Notice of Allowance for U.S. Appl. No. 11/985,340 dated Jun. 9, 2010; 8 pages.

USPTO Notice of Allowance for U.S. Appl. No. 11/850,260 dated Jul. 2, 2010; 8 pages.

USPTO Notice of Allowance for U.S. Appl. No. 12/060,128 dated Oct. 19, 2009; 8 pages.

USPTO Non-Final Rejection for U.S. Appl. No. 09/975,338 dated Apr. 30, 2010; 2 pages.

USPTO Advisory Action for U.S. Appl. No. 11/818,005 dated Jul. 30, 2010; 3 pages.

USPTO Non-Final Rejection for U.S. Appl. No. 12/132,527 dated Apr. 29, 2010; 7 pages.

USPTO Advisory Action for U.S. Appl. No. 11/201,627 dated Aug. 5, 2010; 3 pages.

USPTO Final Rejection for U.S. Appl. No. 11/201,627 dated May 24, 2010; 26 pages.

USPTO Non-Final Rejection for U.S. Appl. No. 11/166,622 dated Jun. 22, 2010; 11 pages.

USPTO Final Rejection for U.S. Appl. No. 11/166,622 dated Mar. 18, 2010; 12 pages.

USPTO Non-Final Rejection for U.S. Appl. No. 11/698,660 dated May 21, 2010; 15 pages.

USPTO Advisory Action for U.S. Appl. No. 11/644,100 dated Jul. 21, 2010; 3 pages.

USPTO Final Rejection for U.S. Appl. No. 11/644,100 dated May 19, 2010; 13 pages.

USPTO Final Rejection for U.S. Appl. No. 11/865,672 dated Dec. 30, 2009; 6 pages.

USPTO Final Rejection for U.S. Appl. No. 11/857,947 dated Oct. 14, 2009; 22 pages.

USPTO Non-Final Rejection for U.S. Appl. No. 11/857,947 dated Feb. 3, 2010; 23 pages.

USPTO Non-Final Rejection for U.S. Appl. No. 11/857,947 dated Jul. 21, 2010; 15 pages.

USPTO Non-Final Rejection for U.S. Appl. No. 12/058,569 dated Aug. 2, 2010; 9 pages.

USPTO Final Rejection for U.S. Appl. No. 11/968,145 dated Aug. 2, 2010; 6 pages.

USPTO Non-Final Rejection for U.S. Appl. No. 11/968,145 dated Mar. 4, 2010; 11 pages.

USPTO Non-Final Rejection for U.S. Appl. No. 11/644,100 dated Dec. 16, 2009; 13 pages.

USPTO Advisory Action for U.S. Appl. No. 11/644,100 dated Jul. 21, 2010; 3 pages.

USPTO Final Rejection for U.S. Appl. No. 11/166,622 dated Mar. 18, 2010; 12 pages.

USPTO Non-Final Rejection for U.S. Appl. No. 11/201,922 dated Jun. 11, 2010; 12 pages.

USPTO Non-Final Rejection for U.S. Appl. No. 12/132,527 dated Apr. 29, 2010; 7 pages.

USPTO Final Rejection for U.S. Appl. No. 11/818,005 dated May 24, 2010; 8 pages.

USPTO Notice of Allowance for U.S. Appl. No. 09/943,062 dated Jun. 29, 2010; 4 pages.

USPTO Non-Final Rejection for U.S. Appl. No. 11/201,922 dated Jun. 11, 2010; 12 pages.

USPTO Non-Final Rejection for U.S. Appl. No. 12/070,547 dated Jun. 3, 2009; 6 pages.

USPTO Final Rejection for U.S. Appl. No. 12/070,547 dated Oct. 30, 2009; 5 pages.

USPTO Notice of Allowance for U.S. Appl. No. 12/070,547 dated Feb. 24, 2010; 4 pages.
USPTO Non-Final Rejection for U.S. Appl. No. 11/347,189 dated Jun. 8, 2007; 6 pages.
USPTO Notice of Allowance for U.S. Appl. No. 11/347,189 dated Sep. 27, 2007; 4 pages.
USPTO Non-Final Rejection for U.S. Appl. No. 11/698,660 dated Dec. 13, 2010; 20 pages.
USPTO Notice of Allowance for U.S. Appl. No. 11/644,100 dated Jan. 6, 2011; 6 pages.
USPTO Non-Final Rejection for U.S. Appl. No. 11/201,922 dated Dec. 28, 2010; 14 pages.
USPTO Final Rejection for U.S. Appl. No. 11/166,622 dated Dec. 7, 2010; 12 pages.
USPTO Non-Final Rejection for U.S. Appl. No. 11/166,622 dated Jun. 22, 2010; 11 pages.
USPTO Final Rejection for U.S. Appl. No. 09/989,771 dated Jan. 4, 2011; 12 pages.
USPTO Non-Final Rejection for U.S. Appl. No. 09/975,338 dated Apr. 30, 2010; 10 pages.
USPTO Non-Final Rejection for U.S. Appl. No. 11/818,005 dated Oct. 26, 2010; 10 pages.
USPTO Non-Final Rejection for U.S. Appl. No. 11/968,145 dated Jan. 5, 2011; 8 pages.
USPTO Non-Final Rejection for U.S. Appl. No. 12/004,833 dated Dec. 21, 2010; 8 pages.
USPTO Notice of Allowance for U.S. Appl. No. 12/058,569 dated Dec. 13, 2010; 6 pages.
USPTO Non-Final Rejection for U.S. Appl. No. 09/989,782 dated Oct. 27, 2009; 9 pages.
USPTO Final Rejection for U.S. Appl. No. 12/104,678 dated Dec. 3, 2010; 9 pages.
USPTO Final Rejection for U.S. Appl. No. 11/857,947 dated Jan. 4, 2011; 14 pages.
USPTO Non-Final Rejection for U.S. Appl. No. 12/058,534 dated Jan. 11, 2011; 17 pages.
USPTO Non-Final Rejection for U.S. Appl. No. 12/004,833 dated Dec. 21, 2010; 8 pages.
USPTO Requirement Restriction for U.S. Appl. No. 12/004,833 dated Sep. 22, 2010; 6 pages.
U.S. Appl. No. 12/058,586; "System and Method for Monitoring a Target Device," Kenneth Ogami et al. filed on Mar. 28, 2008; 56 pages.
USPTO Notice of Allowance for U.S. Appl. No. 10/118,682 dated Apr. 3, 2006; 4 pages.
USPTO Final Rejection for U.S. Appl. No. 10/118,682 dated Oct. 12, 2005; 11 pages.
USPTO Non-Final Rejection for U.S. Appl. No. 10/118,682 dated Jun. 16, 2005; 12 pages.
USPTO Requirement Restriction for U.S. Appl. No. 10/118,682 dated Apr. 28, 2005; 4 pages.
USPTO Non-Final Rejection for U.S. Appl. No. 10/118,682 dated Jan. 12, 2005; 11 pages.
USPTO Non-Final Rejection for U.S. Appl. No. 10/118,682 dated Sep. 24, 2004; 8 pages.
USPTO Final Rejection for U.S. Appl. No. 10/118,682 dated May 3, 2004; 8 pages.
USPTO Non-Final Rejection for U.S. Appl. No. 10/118,682 dated Feb. 25, 2004; 9 pages.
USPTO Non-Final Rejection for U.S. Appl. No. 10/118,682 dated Nov. 3, 2003; 8 pages.
USPTO Notice of Allowance for U.S. Appl. No. 10/329,162 dated Jul. 5, 2007; 7 pages.
USPTO Non-Final Rejection for U.S. Appl. No. 10/329,162 dated Jan. 29, 2007; 10 pages.
USPTO Final Rejection for U.S. Appl. No. 10/329,162 dated Aug. 25, 2006; 12 pages.
USPTO Non-Final Rejection for U.S. Appl. No. 10/329,162 dated Mar. 10, 2006; 9 pages.
USPTO Final Rejection for U.S. Appl. No. 10/329,162 dated Sep. 21, 2005; 12 pages.
USPTO Non-Final Rejection for U.S. Appl. No. 10/329,162 dated Apr. 21, 2005; 10 pages.
USPTO Advisory Action for U.S. Appl. No. 10/329,162 dated Mar. 29, 2005; 2 pages.
USPTO Final Rejection for U.S. Appl. No. 10/329,162 dated Dec. 15, 2004; 10 pages.
USPTO Non-Final Rejection for U.S. Appl. No. 10/329,162 dated Aug. 2, 2004; 8 pages.
USPTO Final Rejection for U.S. Appl. No. 09/989,767 dated Jan. 18, 2011; 24 pages.
USPTO Notice of Allowance for U.S. Appl. No. 11/201,627 dated Jan. 20, 2011; 8 pages.
USPTO Non-Final Rejection for U.S. Appl. No. 11/200,619 dated Jan. 31, 2011; 14 pages.
USPTO Advisory Action for U.S. Appl. No. 11/779,439 dated Mar. 30, 2009; 3 pages.
USPTO Notice of Allowance for U.S. Appl. No. 10/001,478 dated Sep. 7, 2010; 10 pages.
USPTO Notice of Allowance for U.S. Appl. No. 11/818,005 dated Oct. 26, 2010; 10 pages.
USPTO Final Rejection for U.S. Appl. No. 12/132,527 dated Oct. 14, 2010; 8 pages.
USPTO Non-Final Rejection for U.S. Appl. No. 11/201,627 dated Sep. 30, 2010; 6 pages.
USPTO Final Rejection for U.S. Appl. No. 11/698,660 dated Sep. 3, 2010; 19 pages.
USPTO Advisory Action for U.S. Appl. No. 11/698,660 dated Nov. 10, 2010; 3 pages.
USPTO Non-Final Rejection for U.S. Appl. No. 11/644,100 dated Sep. 15, 2010; 10 pages.
USPTO Non-Final Rejection for U.S. Appl. No. 11/201,922 dated Jun. 11, 2010; 12 pages.
USPTO Final Rejection for U.S. Appl. No. 12/060,176 dated Oct. 12, 2010; 22 pages.
USPTO Advisory Action for U.S. Appl. No. 12/136,577 dated Oct. 29, 2010; 3 pages.
USPTO Non-Final Rejection for U.S. Appl. No. 11/644,100 dated Dec. 16, 2009; 13 pages.
USPTO Final Rejection for U.S. Appl. No. 11/166,622 dated Mar. 18, 2010; 12 pages.
USPTO Advisory Action for U.S. Appl. No. 09/994,601 dated Mar. 23, 2010; 2 pages.
USPTO Non-Final Rejection for U.S. Appl. No. 11/818,005 dated Oct. 26, 2010; 10 pages.
USPTO Final Rejection for U.S. Appl. No. 12/132,527 dated Oct. 14, 2010; 8 pages.
USPTO Notice of Allowance for U.S. Appl. No. 09/998,848 dated Oct. 13, 2010; 4 pages.
USPTO Non-Final Rejection for U.S. Appl. No. 09/998,848 dated Jun. 21, 2010; 15 pages.
USPTO Advisory Action for U.S. Appl. No. 09/998,848 dated Feb. 24, 2010; 3 pages.
USPTO Non-Final Rejection for U.S. Appl. No. 09/989,767 dated Jul. 9, 2010; 22 pages.
USPTO Non-Final Rejection for U.S. Appl. No. 09/989,771 dated Jul. 20, 2010; 12 pages.
USPTO Advisory Action for U.S. Appl. No. 09/989,771 dated Feb. 3, 2010; 3 pages.

USPTO Miscellaneous Action for U.S. Appl. No. 10/113,581 dated Jun. 23, 2010; 6 pages.

USPTO Notice of Allowance for U.S. Appl. No. 10/113,581 dated Sep. 3, 2010; 11 pages.

USPTO Advisory Action for U.S. Appl. No. 11/698,660 dated Nov. 10, 2010; 3 pages.

USPTO Final Rejection for U.S. Appl. No. 11/698,660 dated Sep. 3, 2010; 19 pages.

USPTO Final Rejection for U.S. Appl. No. 12/060,176 dated Oct. 12, 2010; 22 pages.

USPTO Notice of Allowance for U.S. Appl. No. 12/057,149 dated Nov. 30, 2010; 7 pages.

USPTO Notice of Allowance for U.S. Appl. No. 11/818,005 dated Mar. 23, 2011; 7 pages.

USPTO Notice of Allowance for U.S. Appl. No. 09/998,848 dated Feb. 17, 2011; 7 pages.

USPTO Notice of Allowance for U.S. Appl. No. 09/998,848 dated Jun. 10, 2011; 8 pages.

USPTO Non-Final Rejection for U.S. Appl. No. 09/989,767 dated May 17, 2011; 27 pages.

* cited by examiner

600

| BITS(S) | DATA WORD | DESCRIPTION |
| --- | --- | --- |
| 31 | 0 | EVENT THREAD ENABLE |
| 30:25 | 0 | POINTER TO NEXT EVENT CELL |
| 24 | 0 | INVERT DECISION LOGIC OUTPUT |
| 23 | 0 | EXTERNAL TRIGGER |
| 22 | 0 | TRACE OFF |
| 21 | 0 | TRACE ON |
| 20 | 0 | BREAK |
| 19:16 | 0 | INPUT BUS SELECT<br>0 - PROGRAM COUNTER (PC)<br>1 - MICRO IO ADDRESS BUS (DA)<br>2 - MICRO MEM ADDRESS BUS (DA)<br>3 - MICRO IO DATA BUS (DB)<br>4 - MICRO MEM DATA BUS (DB)<br>5 - MICRO INSTRUCTION REGISTER (IR)<br>6 - EXTERNAL LOGIC PINS<br>7 - MICRO EXTRA REGISTER (X)<br>8 - MICRO ACCUMULATOR (A)<br>9- STACK POINTER (SP)<br>a - IO DA AND IO DB<br>b - MEM DA AND MEM DB<br>c - EXTRA REGISTER AND ACCUMULATOR (X HIGH)<br>d - IR AND SP (IR HIGH) |
| 15:0 | 0 | COUNTER START VALUE |
| 31:16 | 1 | MAXIMUM VALUE FOR WORD COMPARE |
| 15:0 | 1 | MINIMUM VALUE FOR WORD COMPARE |

| BITS(S) | DATA WORD | DESCRIPTION |
|---|---|---|
| 31 | 0 | EVENT THREAD ENABLE |
| 30:25 | 0 | POINTER TO NEXT EVENT CELL |
| 24 | 0 | INVERT DECISION LOGIC OUTPUT |
| 23 | 0 | EXTERNAL TRIGGER |
| 22 | 0 | TRACE OFF |
| 21 | 0 | TRACE ON |
| 20 | 0 | BREAK |
| 19:16 | 0 | INPUT BUS SELECT<br>0 - BIT FIELD:<br>    7 - EXTENDED IO FLAG<br>    6 - CARRY FLAG<br>    5 - ZERO FLAG<br>    4 - GLOBAL INTERRUPT FLAG<br>    3 - IO WRITE FLAG<br>    2 - IO READ FLAG<br>    1 - MEMORY WRITE FLAG<br>    0 - MEMORY READ FLAG<br>1- MICRO IO ADDRESS BUS (DA)<br>2 - MICRO MEM ADDRESS BUS (DA)<br>3 - MICRO IO DATA BUS (DB)<br>4 - MICRO MEM DATA BUS (DB)<br>5 - MICRO INSTRUCTION REGISTER (IR)<br>6 - EXTERNAL LOGIC PINS<br>7 - MICRO EXTRA REGISTER (X)<br>8 - MICRO ACCUMULATOR (A)<br>9 - STACK POINTER (SP) |
| 15:0 | 0 | COUNTER START VALUE |
| 31:24 | 1 | RESERVED |
| 23:16 | 1 | MAXIMUM VALUE FOR RANGE COMPARE |
| 15:8 | 1 | BIT MASK |
| 7:0 | 1 | MINIMUM VALUE FOR RANGE COMPARE |

| BITS(S) | DATA WORD | DESCRIPTION |
| --- | --- | --- |
| 31 | 0 | RESERVED |
| 30:24 | 0 | POINTER TO NEXT STATE FOR THIS CHAIN |
| 23:18 | 0 | RESERVED |
| 17 | 0 | ENABLE BIT |
| 16 | 0 | OUTPUT INVERT |
| 15 | 0 | EVENT THREAD 7 POSITIVE LOGIC ENABLE |
| 14 | 0 | EVENT THREAD 7 NEGATIVE LOGIC ENABLE |
| 13 | 0 | EVENT THREAD 6 POSITIVE LOGIC ENABLE |
| 12 | 0 | EVENT THREAD 6 NEGATIVE LOGIC ENABLE |
| 11 | 0 | EVENT THREAD 5 POSITIVE LOGIC ENABLE |
| 10 | 0 | EVENT THREAD 5 NEGATIVE LOGIC ENABLE |
| 9 | 0 | EVENT THREAD 4 POSITIVE LOGIC ENABLE |
| 8 | 0 | EVENT THREAD 4 NEGATIVE LOGIC ENABLE |
| 7 | 0 | EVENT THREAD 3 POSITIVE LOGIC ENABLE |
| 6 | 0 | EVENT THREAD 3 NEGATIVE LOGIC ENABLE |
| 5 | 0 | EVENT THREAD 2 POSITIVE LOGIC ENABLE |
| 4 | 0 | EVENT THREAD 2 NEGATIVE LOGIC ENABLE |
| 3 | 0 | EVENT THREAD 1 POSITIVE LOGIC ENABLE |
| 2 | 0 | EVENT THREAD 1 NEGATIVE LOGIC ENABLE |
| 1 | 0 | EVENT THREAD 0 POSITIVE LOGIC ENABLE |
| 0 | 0 | EVENT THREAD 0 NEGATIVE LOGIC ENABLE |

| FIELD | OR | AND | NOR | NAND |
|---|---|---|---|---|
| CHAIN ENABLE | 1 | 1 | 1 | 1 |
| INVERT OUTPUT | 1 | 0 | 0 | 1 |
| POSITIVE LOGIC ENABLE | 1 | 0 | 1 | 0 |
| NEGATIVE LOGIC ENABLE | 0 | 1 | 0 | 1 |

| FIELD | OR | AND | NOR | NAND |
|---|---|---|---|---|
| CHAIN ENABLE | 1 | 1 | 1 | 1 |
| INVERT OUTPUT | 1 | 0 | 0 | 1 |
| POSITIVE LOGIC ENABLE EVENT A | 0 | 0 | 1 | 0 |
| NEGATIVE LOGIC ENABLE EVENT A | 1 | 1 | 0 | 1 |
| POSITIVE LOGIC ENABLE EVENT B | 1 | 1 | 0 | 1 |
| NEGATIVE LOGIC ENABLE EVENT B | 0 | 0 | 1 | 0 |
| POSITIVE LOGIC ENABLE EVENT C | 1 | 0 | 1 | 1 |
| NEGATIVE LOGIC ENABLE EVENT C | 0 | 1 | 0 | 0 |

|       | $E_1$ 120a | $E_2$ 120b | $E_3$ 120c | $E_4$ 120d |
|-------|------------|------------|------------|------------|
| $C_1$ 1110a | BE | BE | BE | 1 |
| $C_2$ 1110b | 1  | 1  | 1  | 1 |

CHAIN OUTPUT SIGNAL 1125

1860

|       | $E_1$ | $E_2$ | $E_3$ | $E_4$ |
|-------|-------|-------|-------|-------|
| $C_1$ | BE | BE | 1  | 1  |
| $C_2$ | 1  | 1  | BE | BE |

1870

|       | $E_1$ | $E_2$ | $E_3$ | $E_4$ |
|-------|-------|-------|-------|-------|
| $C_1$ | 1 | 1 | 1 | 1 |
| $C_2$ | 1 | 1 | 1 | 1 |

```
BEGIN
  ↓
STORE DATA IN CONFIGURATION RAM TO CONFIGURE CHAIN
LOGIC TO CONFIGURE THE EXECUTION SCHEME OF EVENT
ENGINES
1910
  ↓
CONFIGURE CHAIN LOGIC WITH THE DATA TO CONFIGURE EVENT
ENGINES TO EITHER RUN INDEPENDENTLY OR CHAIN GROUP(S) OF
EVENT ENGINES
1920
  ↓
IN RESPONSE TO A CONDITION FOR WHICH ONE OF THE EVENT
ENGINES WAS MONITORING BEING SATISFIED, RECONFIGURE THE
CHAIN LOGIC TO RECONFIGURE THE EXECUTION SCHEME OF THE
EVENT ENGINES
1930
  ↓
RE-CONFIGURE CHAIN LOGIC AGAIN? 1940 —YES→ (back to 1930)
  ↓ NO
END
```

FIGURE 19

EXTERNAL INTERFACE FOR EVENT ARCHITECTURE

FIELD OF THE INVENTION

The present invention relates to the field of testing electronic devices. Specifically, the present invention relates to an external interface for an event architecture.

BACKGROUND ART

Logic analyzers and in-circuit emulators have been used for many years by software and hardware developers to help diagnose and debug hardware and software. Such devices may be able to monitor and analyze various circuit and software conditions during debugging and testing of the design. For example, they may store trace information, such as time stamps, register values, data memory content, etc., which may be later analyzed. They may also provide various configurable breakpoints, which allow the designer to analyze the state of the design at a point in its operation by stopping operation when a specified condition occurs. The breakpoints may also be chained together such that a series of conditions happen before the operation is stopped.

For example, conventional logic analyzers and in-circuit-emulators may have a relatively small number of configurable complex breakpoints. A designer may program between one and a few of these breakpoints to cause the analyzing device to perform a specified action upon a condition's occurrence. For example, a first breakpoint might be programmed to look for a write to a certain memory address. When the first breakpoint triggers, it activates a second complex breakpoint, which may look for a certain program counter value. When the program counter reaches that value, a third complex breakpoint is activated, which may watch for a certain stack pointer value. When the stack pointer reaches the specified value, a fourth complex breakpoint is activated, which may watch for a certain accumulator value. Finally, when the accumulator value is reached the operation breaks.

Unfortunately, conventional analyzing devices offer only a few breakpoints, which are implemented as dedicated pieces of hardware, each looking for one condition. Because much of the hardware is dedicated to one function, it is prohibitively expensive to provide a substantial number of breakpoints. Consequently, only a limited number of events can be programmed and only a limited number of conditions can be monitored.

Furthermore, conventionally, separate systems are required to perform both logic analyzer and in-circuit-emulation functions. For example, conventional logic analyzers are able to monitor signals that an in-circuit-emulator would not normally analyze, such as signals that originate outside the circuit containing the emulator. Likewise, a logic analyzer would not normally provide emulation functionality. Consequently, substantial added expensive must be taken to purchase and maintain both systems.

Therefore, it would be advantageous to provide a device that may be used to analyze electronic circuits and software, that is relatively inexpensive, and can track a substantial number of complex conditions occurring during operation of an electronic circuit or software. It would also be advantageous to provide an analyzing device that uses hardware more efficiently than conventional analyzing devices, such as logic analyzers and emulators. It would be further advantageous to provide a device with more flexibility than conventional analyzing devices. It would be still further advantageous to provide a device with the functionality of both a logic analyzer and an in-circuit emulator.

SUMMARY OF THE INVENTION

Embodiments of the present invention provide a cost efficient device that may be used to analyze a circuit or software under test. Embodiments of the present invention provide a solution that uses less hardware than conventional solutions to track a substantial number of conditions occurring during operation of an electronic circuit or software. Embodiments of the present invention provide more flexibility than conventional analyzing devices. Embodiments of the present invention provide the functionality of both a logic analyzer and an in-circuit emulator. Embodiments of the present invention provide these advantages and others not specifically mentioned above but described in the sections to follow.

A device for monitoring events is disclosed. The device of one embodiment may comprise a programmable event engine for detecting events and a memory array coupled to the event engine. The array may store data for programming the event engine to monitor for the events. The device may have an external pin coupled to the event engine. The event engine may monitor a signal on the external pin to detect events external to the device.

Another embodiment provides for a system for monitoring events. The present embodiment may comprise a programmable event engine for monitoring for events and a memory array coupled to the event engine. The array may store data for programming the event engine to monitor for the events. An external pin may be coupled to the event engine, which may output a signal on the external pin in response to detecting one of the events.

BRIEF DESCRIPTION OF THE DRAWINGS

FIG. 6 is an exemplary structure that may be used to program a memory array with values to configure an event engine, according to embodiments of the present invention.

FIG. 9 is an exemplary data structure that may be used to program a memory array with values to configure an event engine, according to embodiments of the present invention.

FIG. 12 is an exemplary data structure that may be used to program a memory array with values to configure combinational logic, according to embodiments of the present invention.

FIG. 13 is a table illustrating how values in the data structure of FIG. 12 may be used to implement various Boolean expressions, according to embodiments of the present invention.

FIG. 14 is a table illustrating how values in the data structure of FIG. 12 may be used to implement various complex Boolean expressions, according to embodiments of the present invention.

FIG. 18B illustrates tables describing output signals of chain logic blocks, according to embodiments of the present invention.

FIG. 19 is a flowchart illustrating a process of configuring event architecture, according to embodiments of the present invention.

DETAILED DESCRIPTION OF THE INVENTION

In the following detailed description of the present invention, an interface for an event architecture, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Re-Configurable Event Engines

Embodiments of the present invention may be able to reconfigure an event engine during execution of an event thread. In this fashion, the underlying hardware may be able to be used to execute many different states of the event thread by re-configuring the hardware during execution of the event thread. This may allow embodiments of the present invention to implement an event engine that supports very large numbers of states in the event thread, without dedicating hardware to perform a single state of an event thread.

Figure 1:
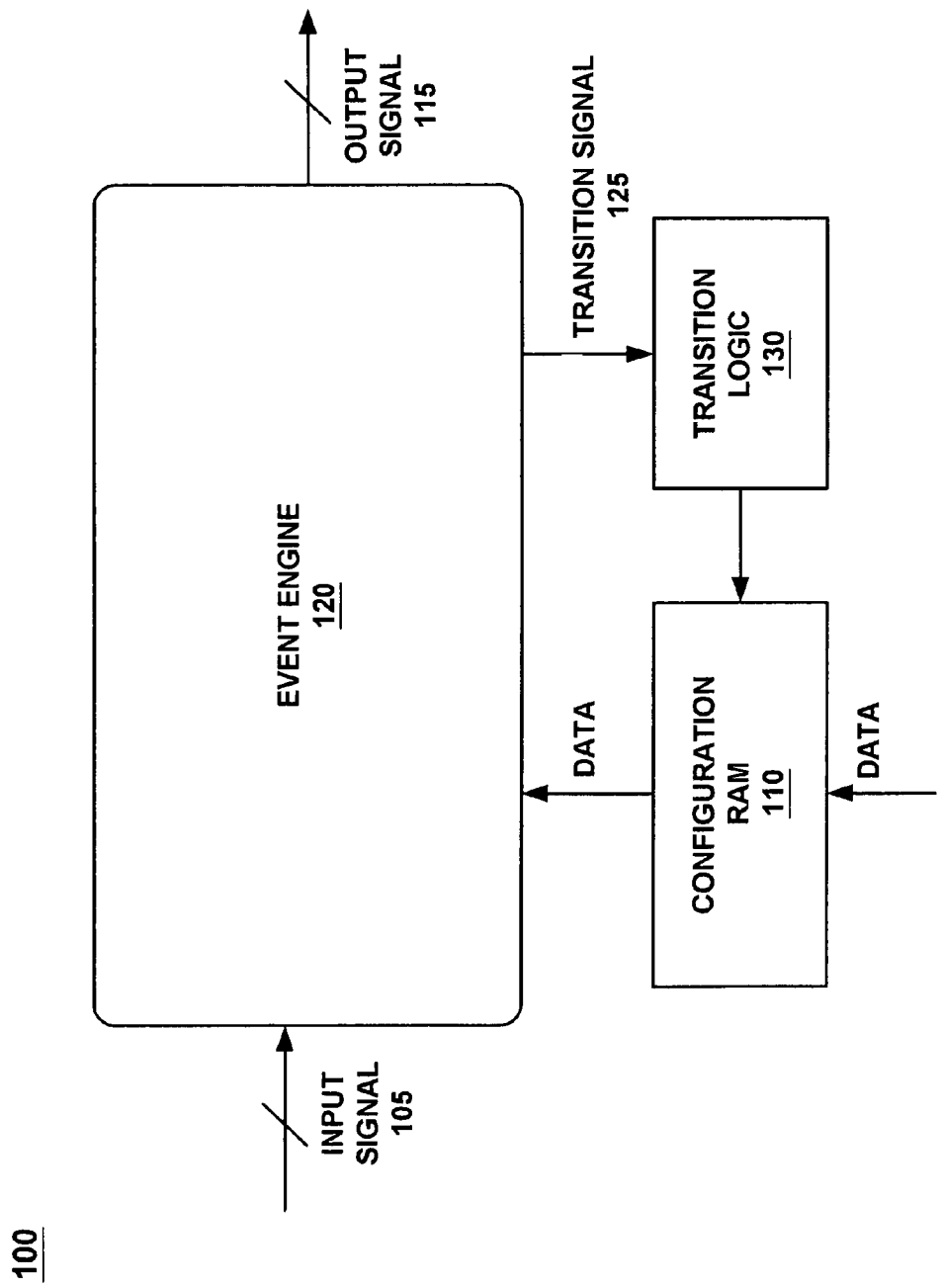
FIG. 1 is a block diagram of a device for implementing a programmable event engine, according to embodiments of the present invention.

FIG. 1 illustrates an embodiment of a device 100 for implementing an event engine 120. The device 100 may comprise programmable logic 110 (e.g., a memory array) for storing data to define a number of states in an event thread to be executed by the event engine 120. Throughout this description, the event engine 120 may also be referred to as execution logic 120. Throughout this description, the programmable logic 110 may also be referred to as configuration RAM 110. A designer who may be testing and debugging a circuit or software may define the event thread using a software package. The data defining the event thread may then be loaded into the configuration RAM 110. A first portion of the data stored in the configuration RAM 110 may be used to configure or to program the event engine 120 to execute a state of the event thread. Then, new data may be loaded from the configuration RAM 110 to reconfigure the event engine 120 to execute the next state of the event thread. One embodiment uses 64 bytes per state. Therefore, a substantial number of states may be programmed into the configuration RAM 110.

Still referring to FIG. 1, the event engine 120 may receive a number of inputs 105 and may be configured by the data in the configuration RAM 110 to select between the inputs 105. The event engine 120 may also be configured to look for a condition or event with respect to a selected input signal. Upon the condition's occurrence, the event engine 120 may output none, one, or multiple signals 115. The output signal(s) 115 may be used to initiate an action, such as a breakpoint, setting a trace buffer on or off, toggling an external trigger, etc. The event engine 120 may also be configured by the data in the configuration RAM 110 to select which signal it should output upon detection of the condition or event. The event engine 120 may also output a transition signal 125 when the condition it was configured to look for occurs.

The transition signal 125 may be fed into transition logic 130, which upon receiving the transition signal 125, may cause a new state to be entered by loading data out of the configuration RAM 110 to re-configure the event engine 120. In this fashion, the event engine 120 may be reconfigured on-the-fly or during the execution of an event thread.

Figure 2:
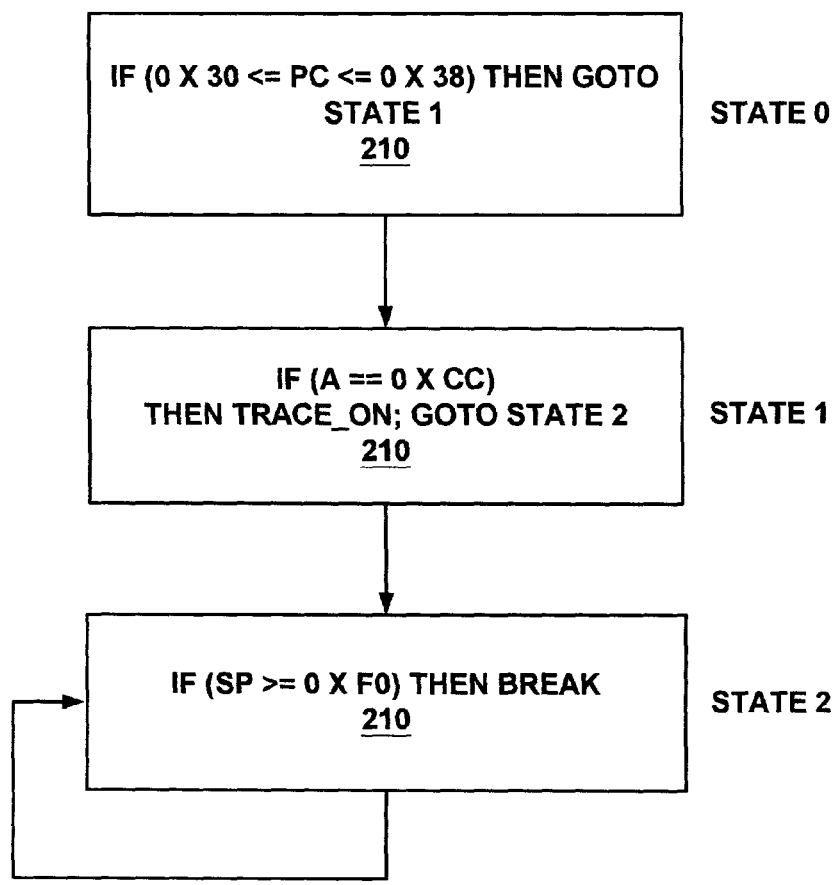
FIG. 2 is a diagram illustrating an event thread, which embodiments of the present invention may execute.

FIG. 2 illustrates an exemplary event thread 200 that may be executed in the event engine 120 of FIG. 1 and also in other embodiments of the present invention. The exemplary event thread 200 has three event cells 210; each event cell 210 may correspond to one state of the event thread 200. Embodiments may program or load the configuration RAM 110 with data that describe the event thread 200. In this example, during state 0, some of the data is used to configure the event engine 120 to monitor for the condition of the program counter being between 0x30 and 0x38. When this condition occurs, the event engine 120 may be put into state 1 by the transition logic 130. This may cause the configuration RAM 110 to reconfigure the event engine 120 to monitor for the condition of the accumulator equal to 0xcc. When this condition occurs, the event engine 120 may cause a trace to be turned on by outputting an appropriate signal. Additionally, state 2 may be loaded. In state 2, the event engine 120 may look for the condition of the stack pointer greater than or equal to 0xf0. When this occurs, the event engine 120 may cause a breakpoint signal to be output, which may stop the execution of, for example, code running in a microprocessor. When this occurs, state 2 may be reloaded, which may cause the event engine 120 to continue to monitor the stack pointer and to issue a break signal when, for example, the stack pointer is out of a valid range.

Figure 3:
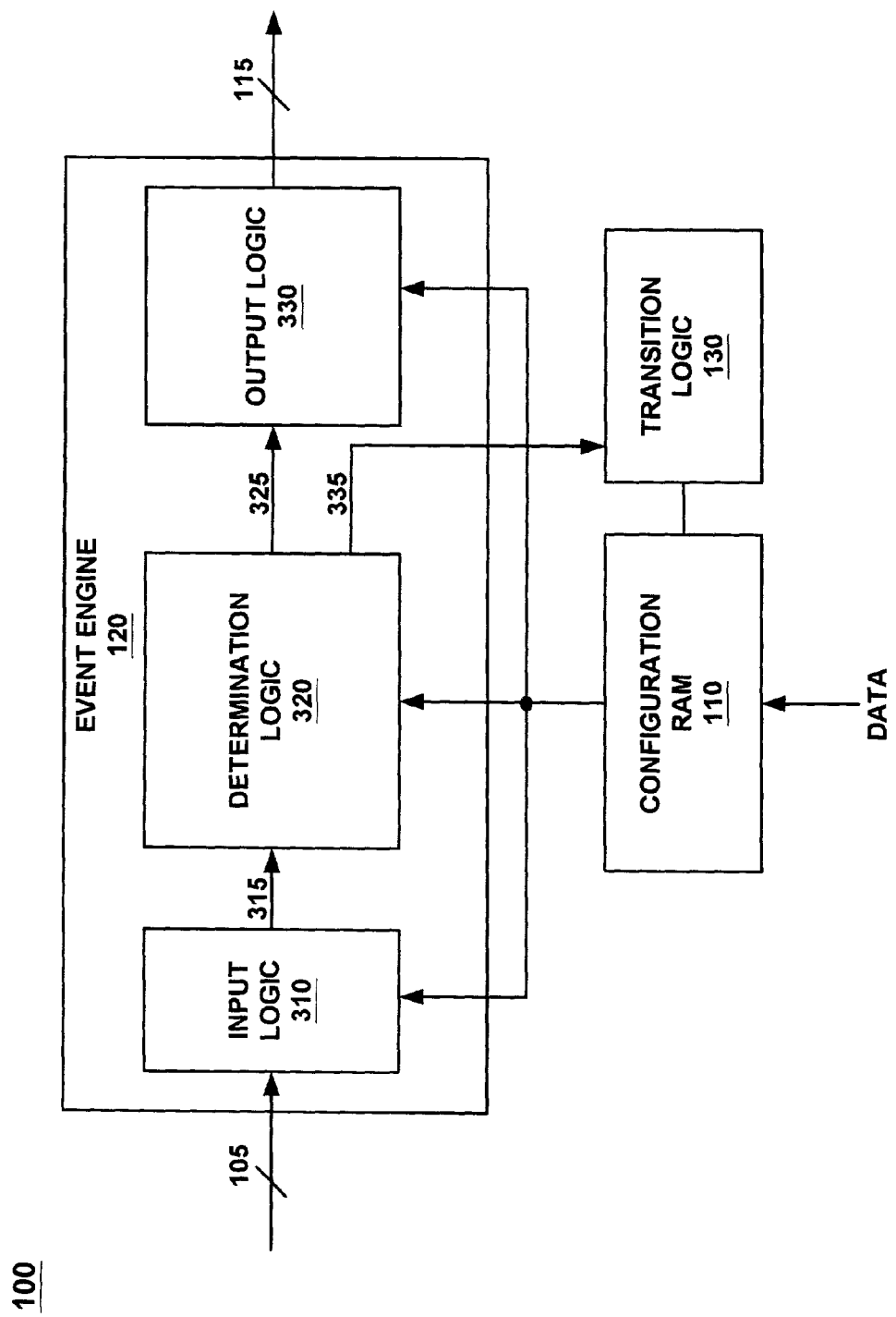
FIG. 3 is a block diagram of a device for implementing a programmable event engine, according to embodiments of the present invention.

Referring now to FIG. 3, to select between a number of inputs 105, the event engine 120 may have input logic 310 coupled to the configuration RAM 110. The input logic 310 may be configurable to select between a plurality of inputs 105 in response to the data from the configuration RAM 110. In this fashion, the input logic 310 is re-configurable when entering the new state by data from the configuration RAM 110. For example, in state 0 of FIG. 2, the input logic 310 may be configured to select the program counter, which may feed the determination logic 320. When the event engine 120 transitions to state 1, the input logic 310 may be reconfigured to select the accumulator, which may feed into the determination logic 320.

Still referring to FIG. 3, determination logic 320 may be coupled to the configuration RAM 110 and may be configurable by data from the configuration RAM 110 to detect a condition with respect to a selected input 315. Throughout this description, the determination logic 320 may also be known as detection logic 320. The determination logic 320 may also issue a trigger or hit signal 325 upon detection of the condition. The determination logic 320 may be re-configurable to detect a new condition during the new state. For example, in state 0 of FIG. 2, the determination logic 320 may be configured to look for the condition of the selected signal 315 fed to it by the input logic 310 (e.g., the program counter) being in a certain range. When the next state is entered, the determination logic 320 may be reconfigured by new data from the configuration RAM 110 to look for the condition of the selected signal 315 being equal to 0xcc, for example.

When the selected signal 315 is within the specified range, the determination logic 320 may also output a transition signal 335 to the transition logic 130. However, the same signal may be used for both the trigger signal 325 and the transition signal 335.

Still referring to FIG. 3, the event engine 120 may further have an output (or output logic) 330 coupled to the configuration RAM 110. The output 330 may be configured by data from the configuration RAM 110 as to which signal of a plurality of signals 115 it is to output upon receiving the trigger signal 325. For example, the output logic 330 could send out a breakpoint signal, an external trigger signal, a trace on/off signal, etc.

Figure 4:
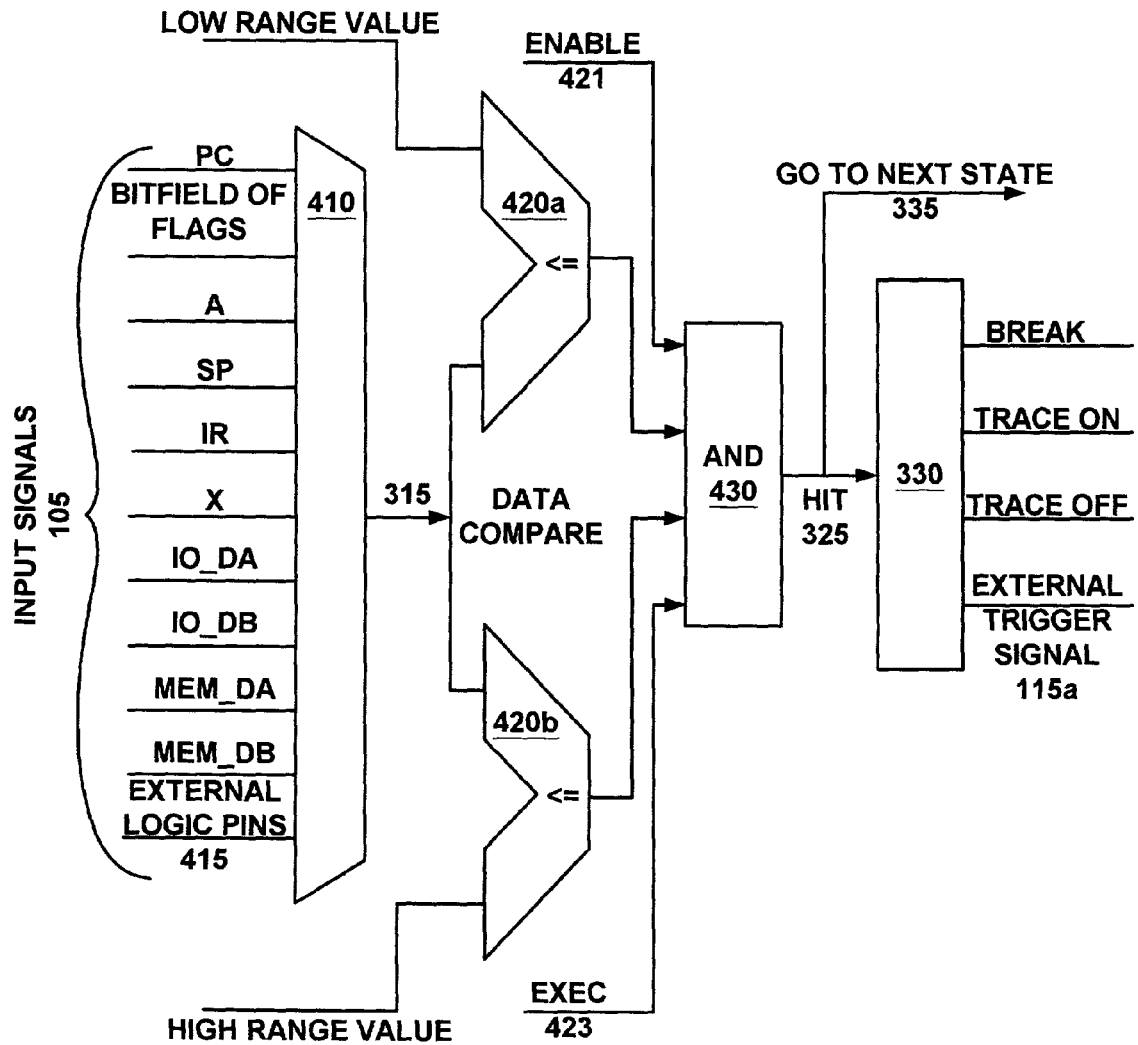
FIG. 4 is a block diagram of logic for executing an event thread, according to embodiments of the present invention.

FIG. 4 illustrates an embodiment of the event engine 120, in which the determination logic 320 is performed by a comparator. The input logic 310, in this embodiment, comprises a multiplexer 410 which inputs a number of input signals 105, which may include the program counter (PC), a bitfield of flags, the accumulator (A), the stack pointer (SP), the instruction register (IR), scratch register (X) (or index register), I/O data address (IO_DA), I/O data byte (IO_DB), memory data address (MEM_DA), memory data byte (MEM_DB), and external logic pin signals 415. Embodiments are suitable to receive any desired input. In this case, the inputs may be various signals and values of interest when testing and debugging a circuit or software.

The determination logic 320, in this embodiment, may comprise two comparators 420a, 420b. The upper comparator 420a may be fed a low range value, which may come from the configuration RAM 110. The lower comparator 420b may be fed a high range value, which may also come from the configuration RAM 110. As described herein, a user may enter data into a design program to build various data structures to implement the various event cells 210. For example, the user may input a low range value and a high range value for a given state of an event thread 200. Those values may be loaded in the configuration RAM 110 and then fed to the comparators 420a, 420b when the event engine 120 is to execute the given state of the given event thread 200.

Rather than using comparators, embodiments may use combinational logic, a mathematical block, or some arbitrary block of logic to see if the selected input signal 315 meets a condition specified by the data in the configuration RAM 110.

The comparators 420a, 420b may also be fed with the selected input signal 315. The determination logic 320 may also comprise a logical AND 430, which may have, as inputs, the output of each comparator 420a, 420b, an enabled bit 421, and an execute bit 423. The enabled bit 421 may be specified by the user and may be a part of the data stored in the configuration RAM 210. The enabled bit 421 may control whether a given event cell 210 will be executed. The optional execute bit 423 may allow a signal to be fed in from logic peripheral to the event engine 120. Thus, the event engine 120 may be effectively controlled by logic external to the event engine 120. For example, by preventing or allowing the decision logic 320 to output the trigger signal 325 and/or the transition signal 335, the event engine 120 and hence the event engine 120 may be controlled by external logic (not shown).

The determination logic 320 outputs a trigger signal 325 if all of the inputs to the logical AND are true. In the present embodiment, the output 330 is shown outputting, in response to the trigger signal 325, four different signals, which may be used to execute a break, to put trace on or off, or to initiate an external trigger, for example. The trigger signal 325 may also be fed into logic, such as transition logic 130, to cause the next state to be loaded. Alternatively, there may be a separate transition signal 335 and trigger signal 325, with one or the other not influenced by the execute bit 423 or influenced by a second bit. Thus, embodiments are able to output a signal 115, such that an action such as a breakpoint is initiated, without advancing to the next state of the thread 200. In a similar fashion, embodiments are also able to advance to the next state of the thread 200 without outputting the signal 115.

Figure 5:
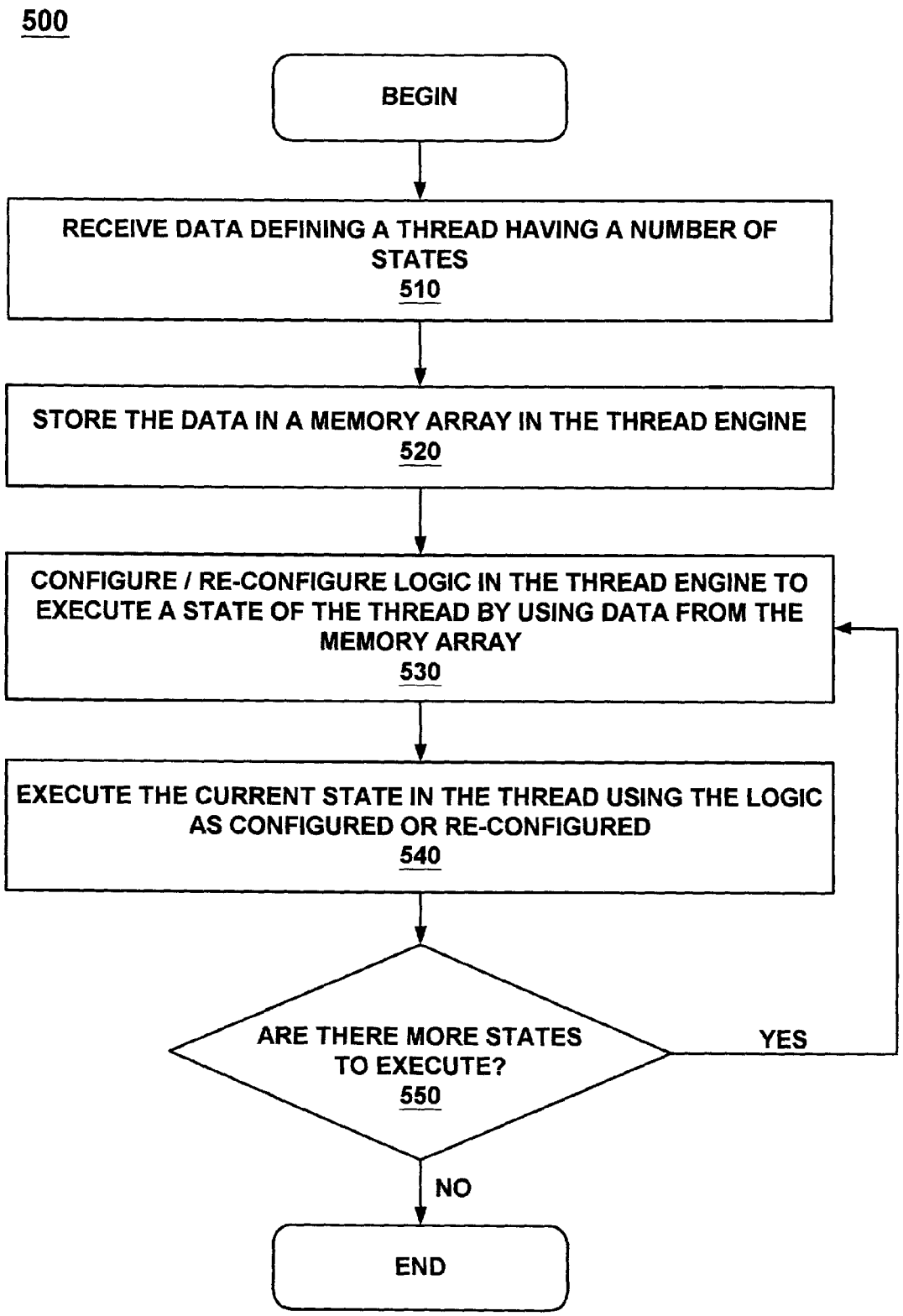
FIG. 5 is a flowchart of steps of a process of executing an event thread, according to embodiments of the present invention.

Referring now to process 500 of FIG. 5, an embodiment of the present invention provides for a method of executing an event thread 200. Step 510 may comprise receiving data defining an event thread 200 having a plurality of states as defined by event cells 210. For example, the event engine 120 may receive this data from the configuration RAM 110.

In step 520, the data may be stored in a configuration RAM 110 coupled to the event engine 120. For a given state of the thread 200, the data may define a condition to monitor for with respect to a selected input 315. The data may also define one or more actions to take upon the condition being met. The output logic 330 outputs a signal 115 to cause the action, such as initiating a breakpoint or setting trace on or off, etc. Optionally, the data may define that no action be taken.

Step 530 may comprise configuring the event engine 120 to execute a state of the thread 200 by using data from the configuration RAM 110. Thus, the input logic 310 may be configured to select between a number of input signals 105 and to output the selected signal 315. The determination logic 320 may be configured to determine if a selected input 315 meets a condition (e.g., an event is detected). The output logic 330 may be configured to select between a plurality of signals (e.g., it outputs one or more of the signals, such as breakpoint, trace on/off, toggle external trigger, etc.). This step may be repeated to execute additional states by re-configuring the event engine 120 by using additional data from the configuration RAM 110.

In step 540, the event engine 120 may execute the current state, as it has been configured or re-configured. In embodiments in which the event engine 120 is divided into several components (e.g., input logic 310, determination logic 320, and output logic 330), one or more of the components may be re-configured to execute the next state.

Step 550 may comprise a determination of whether there has been a transition to a new state. If so, step 530 may be repeated. Thus, the event engine 120 may be reconfigured during the execution of an event thread 200. If there has not been a transition, step 540 of the process 500 may be repeated.

Referring now to FIG. 6, an exemplary event cell data structure 600 for defining an event cell 210 is illustrated (e.g., a 16-bit event cell 210). Thus, the event cell structure 600 may be used to specify a single event thread state 210. While the exemplary structure is 64 bits, any suitable size may be used. Multiple such event cell structures 600 may be chained together to define the data for an event thread 200. Referring now to word 0 of the event cell structure 600, bit 31 may be for event thread enable. If this bit is off, then all of the associated control logic may be off and the event thread is not used. In this fashion, event threads 200 that are not being used may be turned off. Alternatively, an event thread 200 may be run for several states and then turned off. This may be implemented, for example, by feeding the enabled bit 421 in FIG. 4 into the AND logic 430.

Still referring to FIG. 6, bits 30:25 are the 'next' field, which may contain a pointer to the location of the next event cell data structure 600, and hence the next state in the event thread 200. This may allow a user to chain event cells 210 together by specifying the next event cell 210 to be executed in this field. If the event thread 200 meets its current condition, it may will transition to the state specified in this field. Bit 24 is an invert decision bit and may invert the output of the determination logic 320 (e.g., the trigger signal 325).

Figure 7:
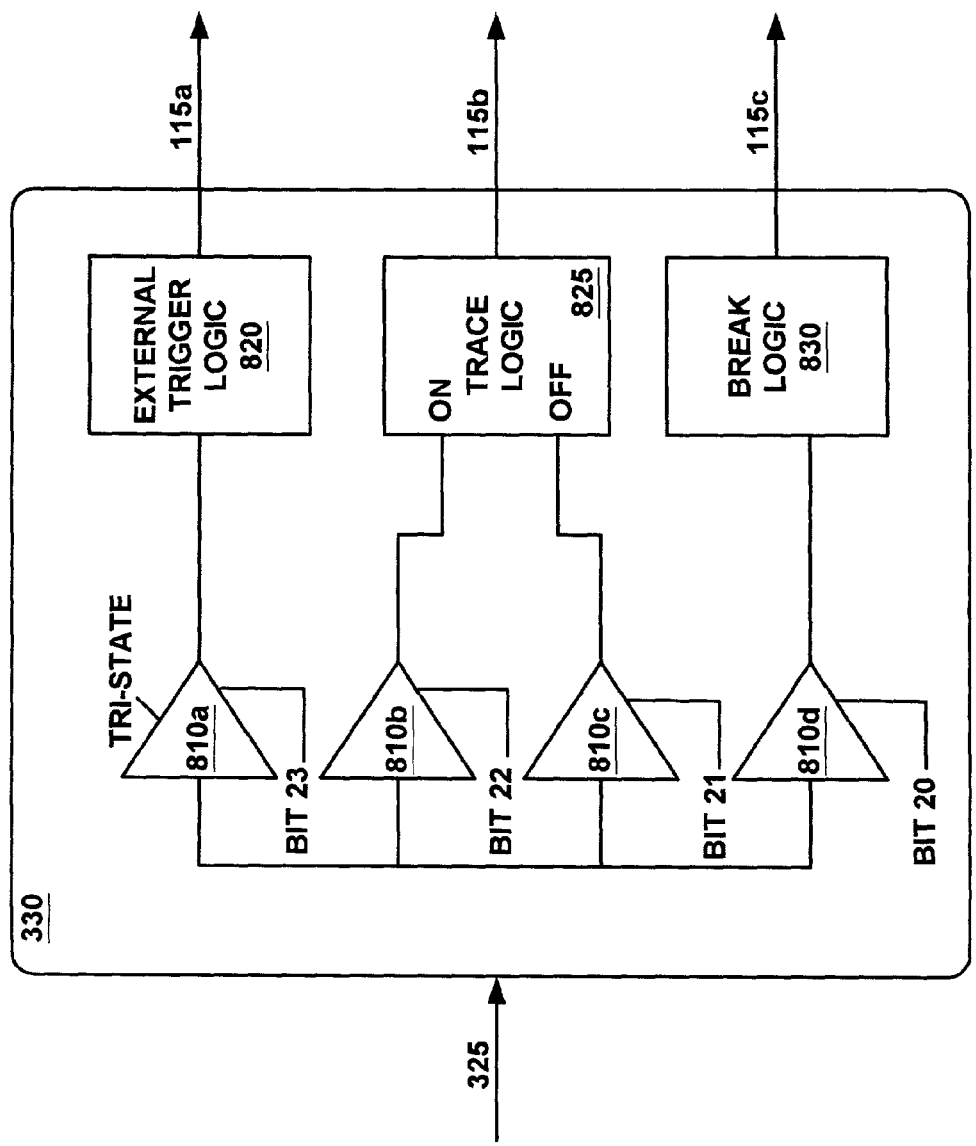
FIG. 7 illustrates exemplary output logic for an event engine, according to embodiments of the present invention.

In one embodiment, bits 20-23 may act as enables to tri-state buffers. Referring now to FIG. 7, the trigger signal 325 may be input to the output logic 330, which may have a number of tri-state buffers 810. If a tri-state buffer 810 is enabled then the trigger signal 325 may pass through tri-state 810 to its associated logic. For example, if bit 23 (external trigger bit) is set, it may enable tri-state buffer 810a, which may allow the trigger signal 325 to propagate through to the external trigger logic 820, which may toggle the value of an external logic pin. Bit 22 and 21 may be for setting trace on and trace off. The value of these bits may be fed into tri-state buffers 810b and 810c, respectively. In this fashion, the trace logic 825 may cause the trace signal 115b to be turned on or off when a condition occurs and the trigger signal 325 is propagated through. Bit 20 may be for initiating a break signal 115 and may be fed into the tri-state buffer 810d. Thus, when a condition is detected the break logic 830 may output a break signal 115c provided tri-state 810d is enabled. The output logic 330 may output many other signals, as well.

Embodiments allow multiple event engines 120 to be operating concurrently. In these embodiments, there may be a logical scheme to decide what to do when event engines 120 issue contradictory signals 115. For example, if one event engine 120 issues a signal 115 to turn the trace on and another issues a signal 115 to turn the trace off, the trace may be turned on to be sure information is stored. Any suitable scheme may be used when there is a conflict between signals 115 from different event engines 120.

Figure 8:
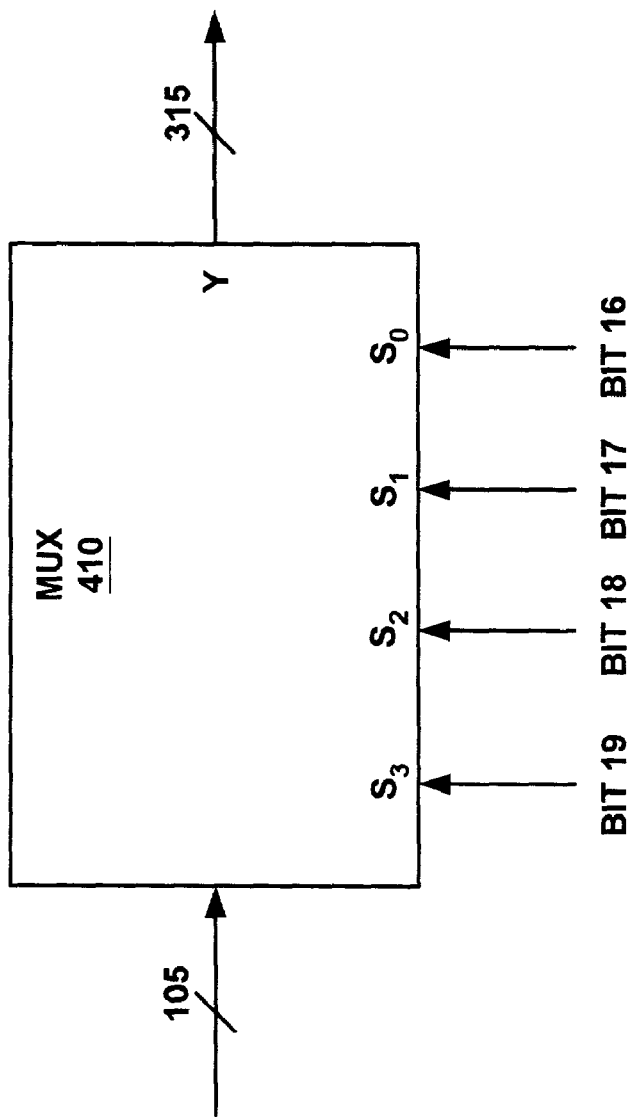
FIG. 8 illustrates exemplary input logic for an event engine, according to embodiments of the present invention.

Referring again to FIG. 6, bits 19:16 may control the input logic 310. For example, referring to FIG. 8, in one embodiment, bits 16-19 are fed into a multiplexer 410 to select between the inputs 105. The output of the multiplexer 410 may be the selected signal 315. The data format of FIG. 6 shows one method of allowing the user to specify which of the exemplary signals 105 is to be selected by the multiplexer 410.

Still referring to FIG. 6, bits 15:0 are for a counter start value and may allow the user to specify how many times a condition happens before the before the determination logic 320 generates a trigger signal 325 to initiate taking an action (e.g., outputting signal 115) and entering the next state. Thus, these bits may be fed into a counter logic (not shown), which is coupled to the determination logic 320.

Still referring to FIG. 6, word 1 of the exemplary data format may be used for range compare. Bits 31:16 are for a high word of the range compare and may specify the maximum value to look for. These bits may be fed into the upper comparator logic 410a, for example. Bits 15:0 specify the minimum value to look for in the range compare, and may be fed into the lower comparator logic 410b, for example.

Structure 900 of FIG. 9 is an exemplary data format for an eight-bit event cell 210. The present invention may use other formats with different fields. Bits 31:20 of word 0 are similar to the corresponding bits of the 16 bit exemplary structure 600. Bits 19:16 may define what the input logic 310 selects. Bits 15:0 are for the counter start value.

Referring now to word 1 of structure 900, bits 31:24 are reserved. Bits 23:16 may specify the maximum value for the range compare. Bits 15:8 are for bit masking and may be used to specify active bits for the compare. For example, active bits may be marked with a zero. Bits 7:0 are for the minimum value for range compare.

Chaining Event Threads

Figure 10:
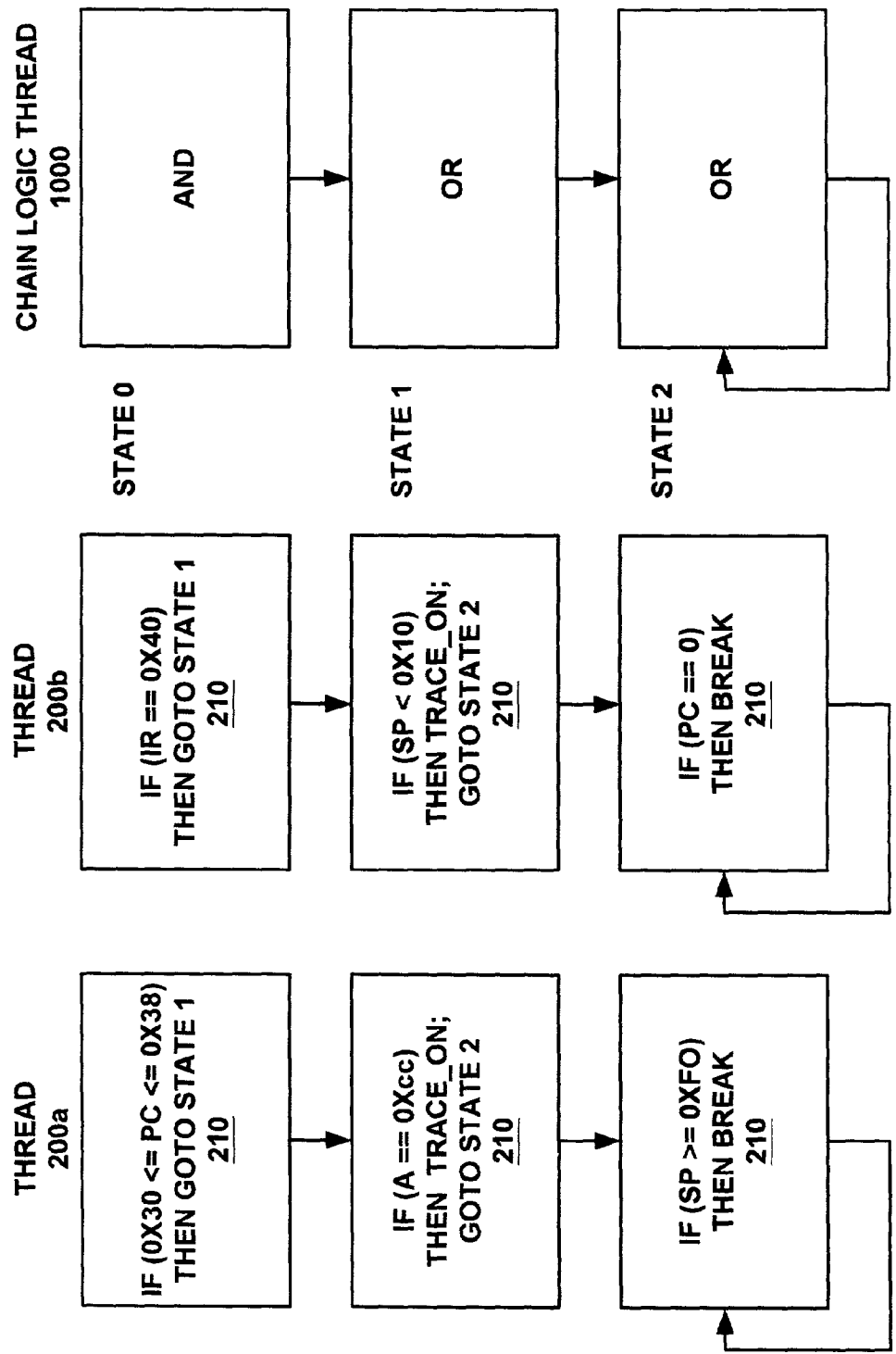
FIG. 10 is a flowchart illustrating a process of chaining event threads, according to embodiments of the present invention.

Referring now to FIG. 10, embodiments of the present invention provide for chaining together multiple event threads 200. An example of two event threads 200 that are chained together is illustrated in the flow diagram of FIG. 10. Thread 200a may be analogous to the thread illustrated in FIG. 2. Thread 200b has three states that are executed in parallel with the three states of thread 200a. For example, each event thread 200 may advance to its next state at the same time as the other event thread 200. However, when event threads 200 are chained, the next state may be entered based on a logical combination of signals from the event threads 200. For example, each event thread 200 may produce a hit signal 325 when a condition occurs. These hit signals 325 may be logically combined according to a Boolean expression formed by a logical operator in the given state in the chain logic thread 1000.

An example of such a logical combination will be discussed by referring to FIG. 10. In state 0, event thread 200a is testing for the occurrence of the program counter being between 0x30 and 0x38, while event thread 200b is testing for the condition of the instruction register equal to 0x40. In state 0, the chain thread 1000 has a logical operator of AND. Thus, the Boolean expression of "(thread 200a condition) AND (thread 200b condition)" may be formed. The event threads 200 may not advance to state 1 until the Boolean condition is true.

When the Boolean condition for state 0 is true, state 1 may be entered in which event thread 200a tests for the condition of the accumulator equal to 0xcc. During state 1, event thread 200b may test for the condition of the stack pointer less than 0x10. Based on the logical operator in state 1 of the chain logic thread 1000, the Boolean expression is "(accumulator=0xcc) OR (stack pointer<0x10)." Thus, state 2 may be entered when either condition is satisfied. In this case, both event threads 200a, 200b may issue a signal to set the trace on when their condition is satisfied. Since the logical operator is OR, the event thread 200 which caused the Boolean expression to be true may also cause the trace to turn on.

Embodiments of the present invention also provide for cases in which the logical operator is, for example, an AND with two or more event threads 200 triggering events upon the condition for which they are testing being satisfied. For example, if state 1 of the chain event 1000 were a logical AND, then the event threads 200a and 200b may not advance to state 2 until both conditions are satisfied. However, the trace may be set on when either event thread 200a or 200b has its condition satisfied. Alternatively, embodiments may require that the Boolean expression be true for the trace to be set to on.

Still referring to FIG. 10, in state 2, the Boolean expression that is formed is "(stack pointer>=0xf0) OR (program counter=0)." In this case, the action that may be triggered is a break (e.g., a break in the operation of the underlying software under test). State 2 is then repeated. While the embodiment illustrated in FIG. 10 comprises two event threads 200, embodiments of the present invention are suitable to chaining together large numbers of event threads 200. Furthermore, logical operators such as, for example, NAND and NOR, may be applied to the event threads 200 in addition to AND and OR.

Figure 11A:
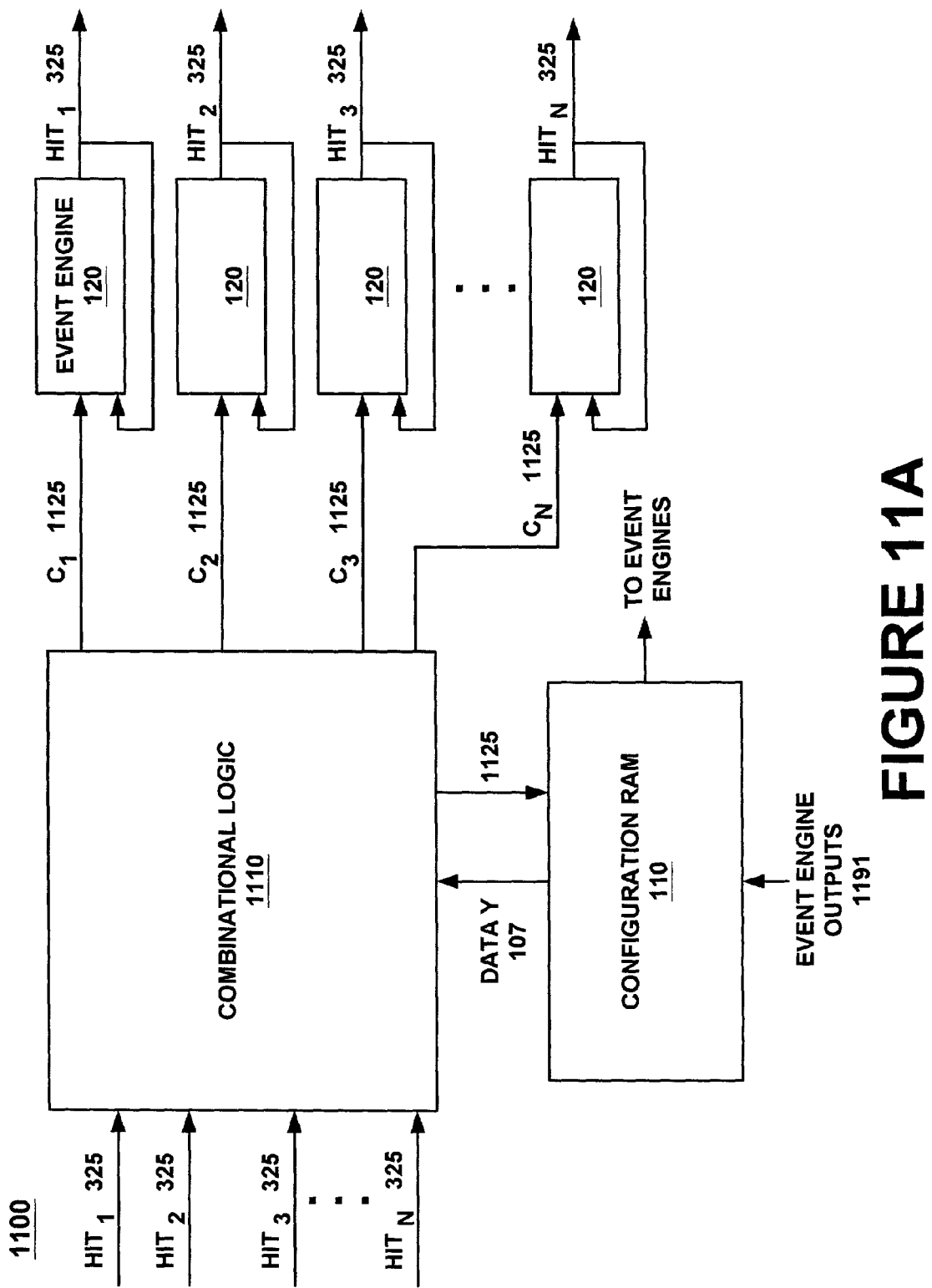
FIG. 11A is a block diagram of a device comprising chained event engines, according to embodiments of the present invention.

Referring now to FIG. 11A, embodiments of the present invention provide for chaining together multiple event threads 200 that are executed in event engines 120. Throughout this description, the phrase "chained event threads 200" may be equivalent to the phrase "chained event engines 120." The device for chaining event threads 1100 of FIG. 11A may have combinational logic or a chain logic block 1110, which may be programmed or configured by data stored in the configuration RAM 110 (e.g., a memory, array or programmable logic) to output the result of a Boolean expression that is formed with selected inputs. Throughout this description, the term re-configurable combinational logic may comprise the combinational logic 1110, the configuration RAM 110, as well as other elements. The selected inputs may be chosen from the hit signals 325 that the event engines 120 produce in response to the occurrence of various conditions or events. In this fashion, the event threads 200 are chained together. However, the present invention is not limited to selecting the hit signals 325 as the operands in the Boolean expressions.

The event engines 120 may be programmed by the configuration RAM 110 to execute event threads 200 as discussed herein. The event threads 200 that run in the event engines 120 may be chained or run independently. The combinational logic 1110 may output a chain logic signal 1125 to each event engine 120. The chain logic signal 1125 may be formed from the result of a Boolean expression formed from selected input (e.g., hit) signals 325, along with a condition that may determine whether an event engine 120 is to be part of a chain. For example, to run all of the event threads 200 in the event engines 120 independently, the combinational logic 1110 outputs chain logic signals 1125 of: C1=C2=C3=Cn=true. In this fashion, the event engines 120 all see a true input from the combinational logic 1110 and thus are not affected by the input signal. To run any single event engine 120 independently, the combinational logic 1110 feeds it a "1". Event engines 120 that are chained may see a chain logic signal 1125 that has the same value and whose value may depend on whether a Boolean condition is true. The hit signals 325 of the event engines 120 may also be fed back into the event engines 120.

In one embodiment, chain logic signals 1125 from the combinational logic 1110 may be fed into the configuration RAM 110 (possibly though other logic that is not shown). The chain logic signals 1125 may be used to select the data that the configuration RAM 110 outputs to re-configure the combinational logic 1110. However, this is not required. Event engine outputs 1191 (e.g., hit signals 325 or other signals from the event engines 120) may also be input to the configuration RAM 110 to select data 1107 from the configuration RAM 110. The data may be used to re-configure the combinational logic 1110 and/or the event engines 120.

Referring briefly to FIG. 4, an embodiment inputs a signal (e.g., signal 1125) from the combinational logic 1110 as the exec signal 423 into the logical AND 430. In this fashion, if the exec signal 423 is true, the output of the AND 430 may be controlled by the other inputs to the AND 430. The hit signal from the event engine 120 may be taken from a gate (not shown) which combines the inputs of the AND gate 430 except the exec signal 423. In this fashion, when the condition for which the event engine 120 tests for is satisfied, a hit signal 325 may be output to the combinational logic 1110.

Figure 11B:
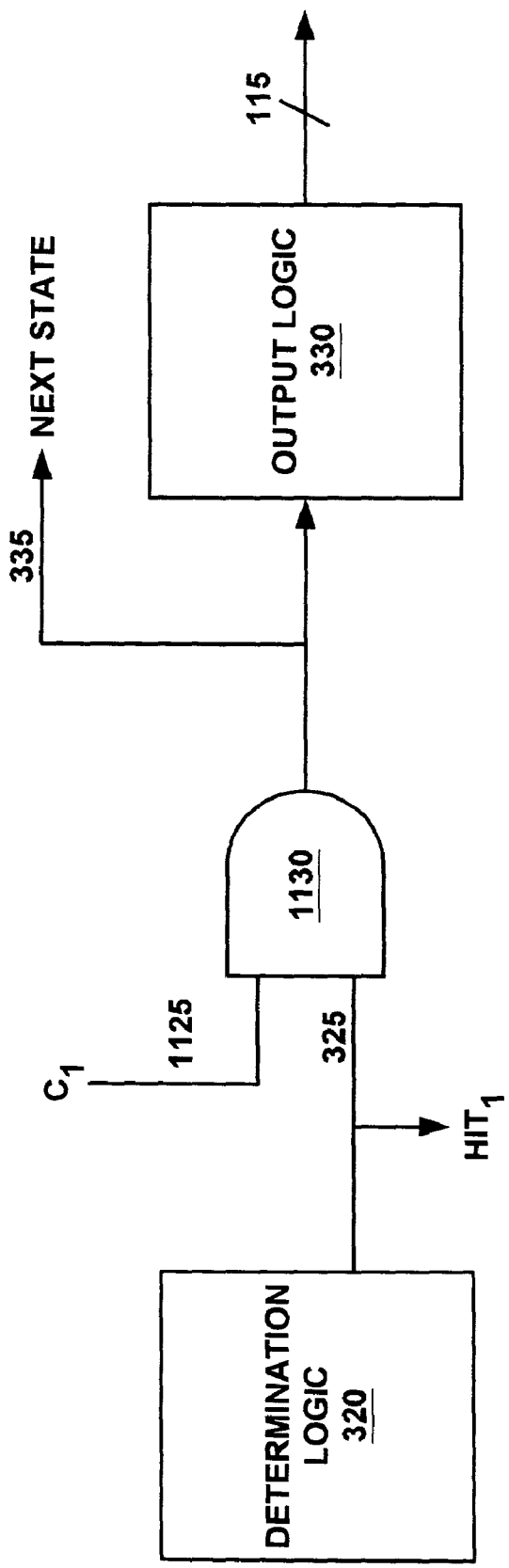
FIG. 11B and FIG. 11C are block diagrams illustrating a signal input into a portion of an event engine, according to embodiments of the present invention.

This technique may also be performed by the embodiment illustrated in FIG. 11B, in which a signal 1125 (e.g., C1) from the combinational logic 1110 is input to the AND gate 1130, which may also input the trigger or hit signal 325. The hit signal 325 may also be fed to the input of the combinational logic 1110. The output of the AND gate 1130 may be input to the output logic 330 and may also be used as the transition signal 335, which may be fed into transition logic 130. Each event engine 120 may have a signal 1125 (e.g., C1, C2, etc.) fed from the combinational logic 1110, though not necessarily the same signal. Those event engines 120 running the event threads 200 that are being chained may have the result of the Boolean expression input into their respective AND gates 1130. However, those that are not being chained (e.g., are being run independently) may have a logic "1" input. If signal C1 is always "1", the output of the AND 1130 may be controlled by the hit signal 325. In this fashion, when the event engine 120 is not a part of a chain, it may execute independently.

When an event engine 120 is chained, the signal 1125 (e.g., C1) may be equal to the result of the Boolean expression, and the output of the AND gate 1130 may be "0" while the Boolean expression is false. In this case, the next state may not be entered and no actions may be triggered by the output logics 330 of any of the event engines 120. When the Boolean expression is true, the event engine(s) 120 which produced a hit signal(s) 325 may have a logical "1" at the output of their AND gate(s) 1130, which may trigger a next state and may also will trigger the output logic(s) 330 of the event engine(s) 120 which produced a hit signal(s) 325. The next state may be initiated in all of the chained event engines 120 by having the memory array 110 send the data for the next state to each chained event engine 120.

Figure 11C:
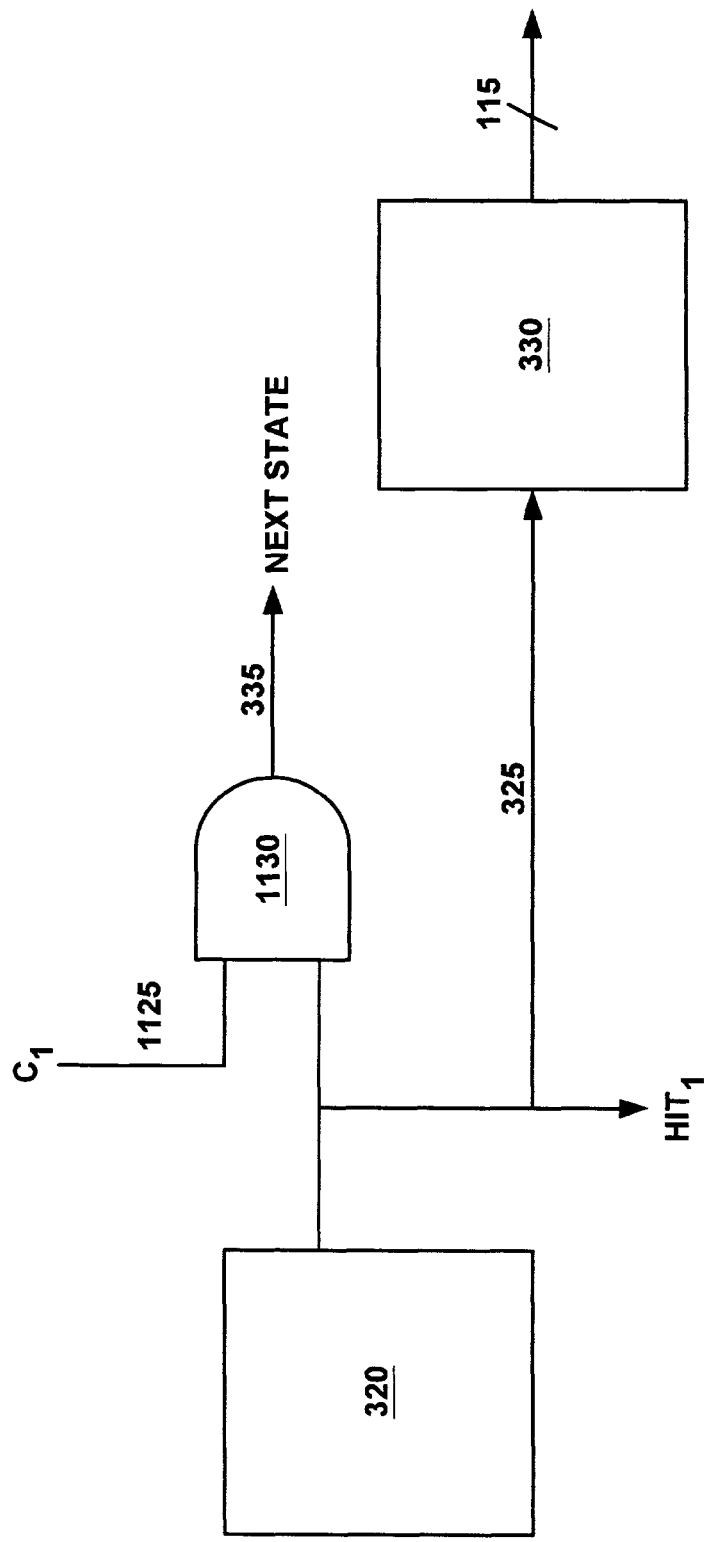

In some cases, it may be desirable to trigger an action when the event for which a chained event engine 120 is testing for is satisfied, even if the next state is not to be entered because the Boolean expression is false. Referring now to FIG. 11C, a block diagram is illustrated to implement such an embodiment. In this embodiment, the input to the output logic 330 may be received directly from the trigger or hit signal 325. In this fashion, the action may be triggered by the output logic 330 regardless of the result of the Boolean expression (e.g., regardless of the value of signal 1125 or C1). However, the next state may still be triggered by the combination of the trigger or hit signal 325 and the output signal 1125 (e.g., C1) of the combinational logic 1110. The present invention is not limited to the methods illustrated in FIGS. 11B and 11C for inputting the result (e.g., signal 1125) of the Boolean expression into the event engines 120 and for producing next states and output actions from the output logic 330.

Referring now to FIG. 12, an exemplary chain data structure 1200 that is used to configure a chain logic block 1110 is shown. A single chain data structure 1200 may be used to configure the chain logic block 1110 for a single state and may be used to chain together a number of event threads 200.

Bits 30:24 specify a pointer to the next chain data structure 1200 to execute. Thus, these bits may specify the next slave chain logic state for the chain logic block 1110 to execute. In this fashion, the logical function (e.g., AND, OR, NAND, NOR) may be altered from state to state. Also, the event threads 200 that are being chained may be changed from state to state. Bit 17 is for an enable bit, which may enable the chain logic block 1110 that the chain data structure 1200 configures.

Bit 16 is an inverting bit, which may invert the result of the Boolean expression. For example, if the chain logic block 1110 was implementing "thread 0 AND thread 1," the invert may implement "NOT (thread 0 AND thread 1)."

Bits 15:0 may specify which event threads 200 are to be chained together. There is a positive logic enable and a negative logic enable for each event thread 200, which may allow the chain logic block 1110 to use the inverse of the input from a given event thread 120 in the Boolean expression. Both bits may be set to "0" to cause the chain logic block 1110 to ignore given the event engine 120. For example, it may not use the hit signal 325 from the given event engine 120 and it may output a constant logical "1" to the event engine 120 so that it is not affected by the combinational logic 1110.

In the example in FIG. 12, up to eight event threads 200 may be chained together. Embodiments of the present invention are able to chain together very large numbers of event threads 200. To do this, the data structure 1200 may be made larger to specify additional event threads 200. Then, the underlying chain logic block 1110 is made wider but not deeper. This may not slow down the chain logic block 1110 because embodiments implement the chain logic block 1110 with tri-state logic, as opposed to multiplexers.

As discussed herein, embodiments of the present invention are able to implement logical operators such as, for example, OR, AND, NOR, and NAND. The table 1300 illustrated in FIG. 13 demonstrates how various bits in the structure 1200 of FIG. 12 may be set to implement various logical operators. To form a logical OR, the chain enable bit (e.g., bit 17) may be set to "1" to enable this chain logic thread 1000. The invert output bit (e.g., bit 16) may be set to "1". For each event thread 200 to be chained, the positive logic enable may be set to "1". In this fashion, a logical OR may be created. For example, if the positive logic enables of event threads 7, 6, and 1 are set to "1", and if the event threads 200 are testing for the occurrence of conditions A, B, and C respectively, then the Boolean expression may be "A OR B OR C."

Still referring to Table 1300 of FIG. 13, a logical NOR may be applied to the event thread 200 conditions or events by setting the invert output bit to "0" and the enable bit to "1". For each event thread 200 to be chained, the positive logic enable may be set to "1". In this fashion, the expression "NOT (A OR B OR C)" may be formed using the exemplary event threads from the previous paragraph.

To form an expression with AND as the logical operator, the chain enable bit may be set to "1" and the invert output bit may be set to "0". For each event thread 200 to be chained, the positive logic enable may be set to "0" and the negative logic enable bit may be set to "1". Thus, an expression such as, "A AND B AND C" may be formed, where A, B, and C are conditions being tested for by separate event threads 200.

To form a logical NAND, the chain enable bit may be set to "1" and the invert output bit may be set to "1". The rest of the bits may be set as for the previously described logical AND.

Embodiments of the present invention are also able to form Boolean expressions in which selected inputs are inverted. For example, expressions such as "A(NOT) AND B AND C" may be created. The expression may be stored in the configuration RAM 110, which may be used to configure the combinational logic 1110. Referring now to FIG. 14, the table 1400 illustrates one way such expressions may be formed. For example, to form the Boolean expression, "A(NOT) OR B OR C," the chain enable and invert bits may be set to "1". The negative logic enable for event thread A may be set to "1". For event threads B and C, the positive logic enable bit may be set to "1". In this fashion, the expression may be stored in the configuration RAM 110, which may be used to configure the combinational logic 1110.

Similar expression may be formed with the logical operators AND, NOR, and NAND. For example, table 1400 illustrates one possible set of rules for forming the following expressions: "A AND B(NOT) AND C"; "NOT (A OR B(NOT) OR C)"; and "NOT (A AND B(NOT) AND C(NOT))".

Figure 15:
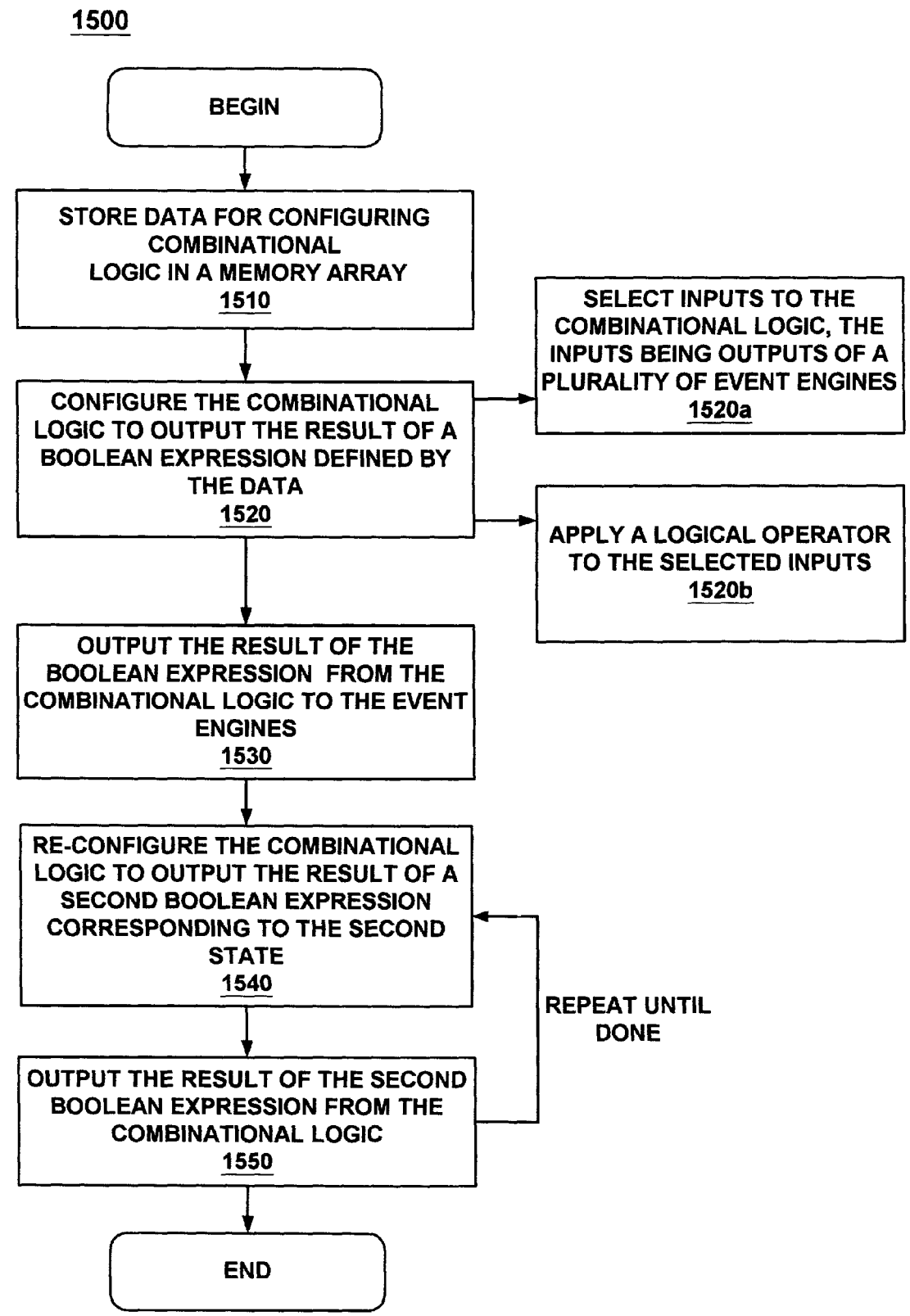
FIG. 15 is a flowchart illustrating a process of chaining event threads, according to embodiments of the present invention.

An embodiment of the present invention provides for a method of chaining event engines 120. Referring now to Process 1500 of FIG. 15, in step 1510, data for configuring combinational logic 1110 may be stored in a configuration RAM 110. The data may allow the configuration logic 1110 to be configured to implement Boolean expression formed by selected inputs.

In step 1520, the combinational logic 1110 may be configured to output the result of a Boolean expression. This step may comprise sub-steps 1520a of selecting inputs to the combination logic 1110. For example, the inputs may be selected from available outputs of a number of event engines 120. This step may also include inverting one or more of the selected inputs.

Step 1520 may also comprise sub-step 1520b in which a logical operator may be applied to the selected inputs. For example, the logical operator may be defined as described herein with respect to the discussion of FIG. 13.

In step 1530, the combinational logic 1110 may output the result of the Boolean expression that it was configured to implement. The output may be fed into the event engines 120 that had their outputs selected as inputs to be used in the Boolean expression. In this fashion, the event engines 120 may be chained together by the Boolean expression. This step may also include inverting the result.

In step 1540, the combinational logic 1110 may be re-configured to output the result of another Boolean expression, based on further data from the configuration RAM 110. This re-configuration may comprise changing the logical operator from the previous Boolean expression. It may also include changing which event engines 120 are chained. For example, it may include changing which outputs from the event engines 120 are selected as inputs to be used in the new Boolean expression. It may also include changing which event engines 120 receive the output of the combinational logic 120 (e.g., the result of the Boolean expression).

In step 1550, the combinational logic 1110 may output the result of the new Boolean expression to the event engines 120 that were selected to be chained in this state. The process 1500 may repeat steps 1540 and 1550 until all states are executed.

Figure 16:
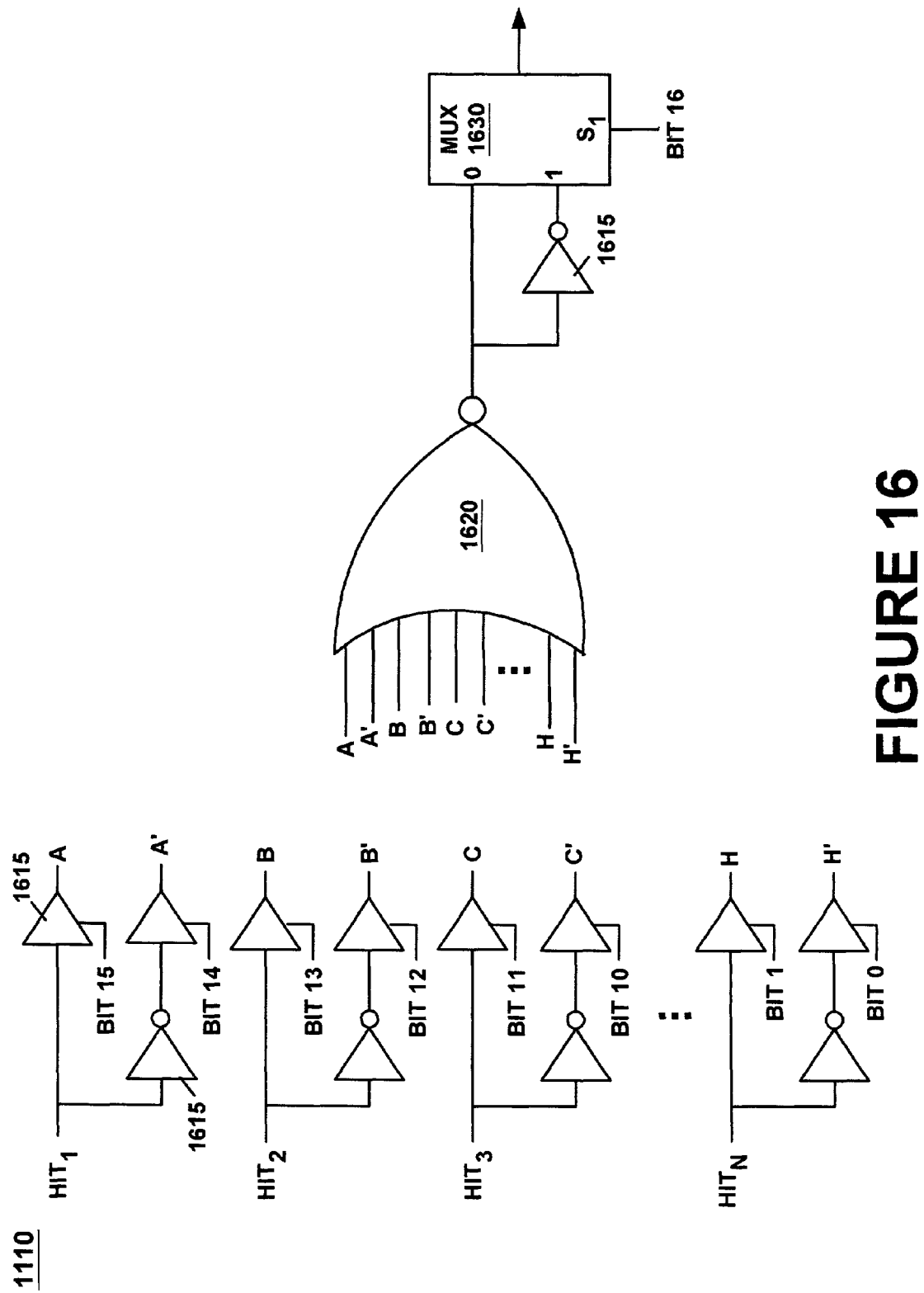
FIG. 16 is a diagram illustrating exemplary logic to implement re-configurable combinational logic, according to embodiments of the present invention.

FIG. 16 illustrates an exemplary logical block diagram for implementing the combinational logic 1110 including various bits from a slave chain logic data structure 1200. The hit signals 325 from the event engines 120 may be input into the combinational logic 1110 by splitting a given hit signal 325 (e.g., hit 1) into two signals. One of the signals 325 may be fed directly into a tri-state buffer 1610 and the other may be input into an inverter 1615 before a tri-state buffer 1610. Bits 15:0 of the slave chain logic data structure 1200 may control the tri-state buffers 1610, whose outputs may be input to the NOR gate 1620. In this fashion, the hit signals 325 that have their bits set to "1" in the slave chain logic data structure 1200 may have their signals input to the NOR gate 1620.

The NOR gate 1620 may have its output split with one branch going directly into the MUX 1630 and the other branch first going through an inverter 1615. Bit 16 (e.g., the invert output bit) of the slave chain logic data structure 1200 may be used to select the final output of the combinational logic 1110. The present invention is not limited to the logical circuitry illustrated in FIG. 16 for implementing the combinational logic 1110.

Event System Architecture

Embodiments of the present invention are able to configure event engines 120 into multiple chains and reconfigure the chains on the fly. The event engines 120 may be allowed to run independently or may be chained in multiple chains. For example, the initial execution scheme may comprise two chains. The first chain may have two event engines 120 chained together with one monitoring for the PC to be outside a given range and the other event engine 120 monitoring for the accumulator going over a specified value. The second chain may comprise two other event engines 120 chained with one monitoring for a specified address being accessed and the other monitoring for a specific data value crossing the bus. If the first chain detects its condition (or combination of conditions for which its event engines 120 were configured to monitor), the configuration of the first two event engines 120 may be altered, without affecting the second two event engines 120. For example, if the PC goes out of range, the execution scheme may be re-configured by breaking the first chain. For example, the first two event engines 120 may execute independently to monitor two conditions that are different from when they were chained. As another example, in an initial execution scheme the event engines 120 may be monitoring for different conditions, but in a chained fashion, such that when any of them detects its condition, the execution scheme is modified. For example, the modification may be that all event engines 120 begin to execute independently, other chains of event engines 120 are formed, etc.

Figure 17:
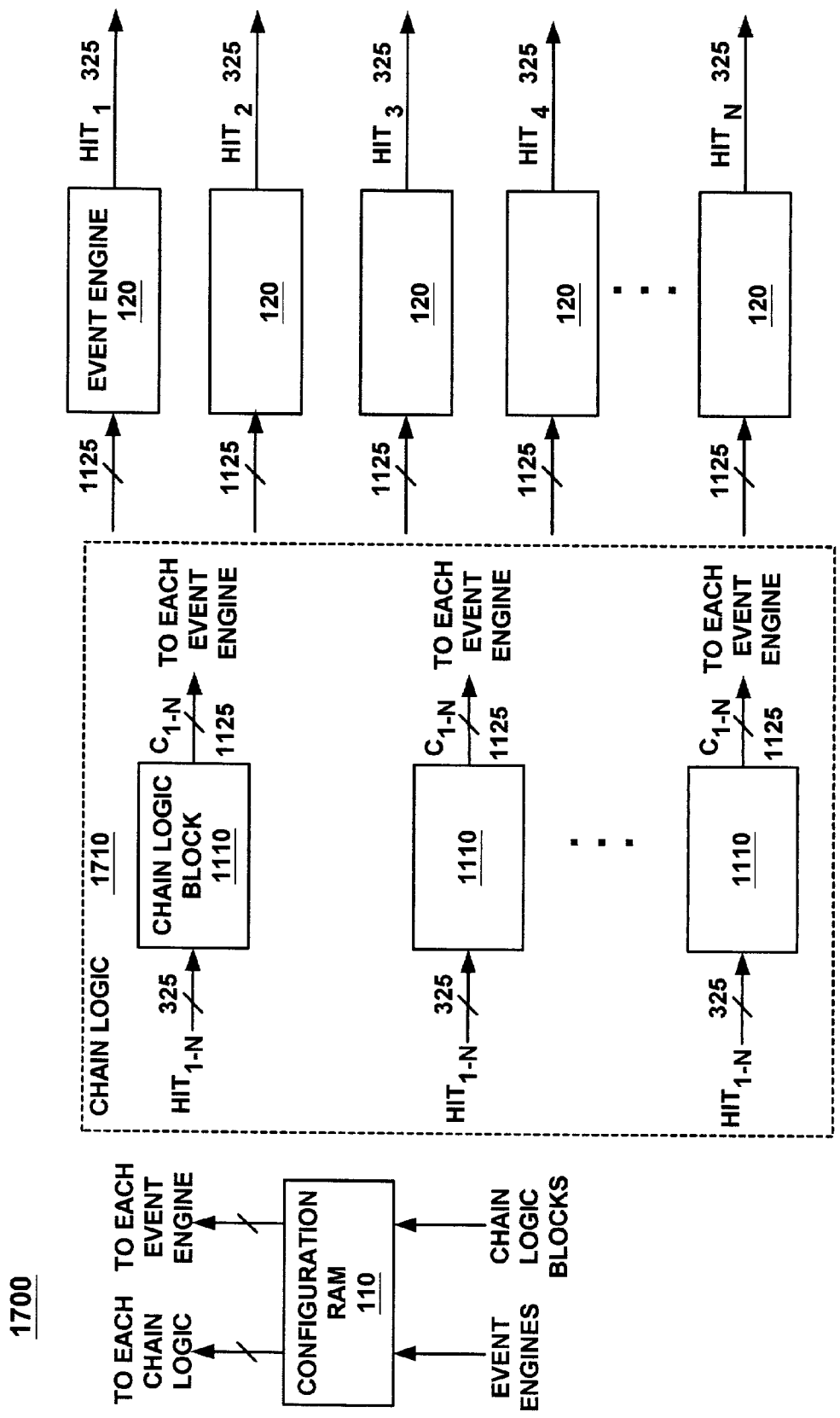
FIG. 17 is a block diagram illustrating event architecture, according to embodiments of the present invention.

Referring now to FIG. 17, an event system architecture 1700 is illustrated. The event system architecture 1700 may have a number of event engines 120, which may be for monitoring conditions and may produce hit signals 325 in response to conditions being satisfied or events being detected. The event system architecture 1700 may have a chain logic 1710 comprising a number of combinational logics or chain logic blocks 1110 that input the hit signals 325. The event system architecture 1700 may also have a configuration RAM 110 for storing data to configure the chain logic blocks 1110 such that the chain logic blocks 1110 configure the execution scheme of the event engines 120. For example, the event engines 120 may be chained in any fashion or may execute independently.

Still referring the FIG. 17, the chain logic blocks 1110 may each output a chain logic signal 1125 to each event engine 120. If a given chain logic block 1110 is not currently chaining the execution of a given event engine 120 it may output a chain logic signal 1125 of "1". In this fashion, the event engine 120 may be unaffected by the chain output signal 1125. For example, active event engines 120 may be run independently. By active event engines 120 it may be meant that a given event engine 120 is currently monitoring for a condition. Event engines 120 may be made active or inactive as described herein by setting, for example, a bit in the data block (e.g., bit 31 of FIG. 6 or FIG. 9) that may configure that event engine 120. The chain logic blocks 1110 may also configure the event engines 120 to form one or more chains of execution.

The chain logic blocks 1110 may be configured by data from the configuration RAM 110 to configure the execution scheme of the event engines 120. For example, each chain logic block 1110 may be configured to select certain hit signals 325 and form a Boolean expression with them. Each chain logic block 1110 may then output a chain logic signal 1125, which may be based on both the result of its Boolean expression and whether the event engine 120 to which the chain output signal 1125 is sent is to be chained. In this fashion, the chain output signals 1125 may chain the execution of the event engines 120.

In one embodiment, chain logic signals 1125 from the chain logic 1710 may be fed into the configuration RAM 110 (possibly though other logic that is not shown). The chain logic signals 1125 may be used to select the data that the configuration RAM 110 outputs to re-configure the chain logic 1710. However, this is not required. Event engine outputs (e.g., hit signals 325 or other signals from the event engines 120) may also be input to the configuration RAM 110 to select data from the configuration RAM 110. The data may be used to re-configure the chain logic 1710 and/or the event engines 120.

Figure 18A:
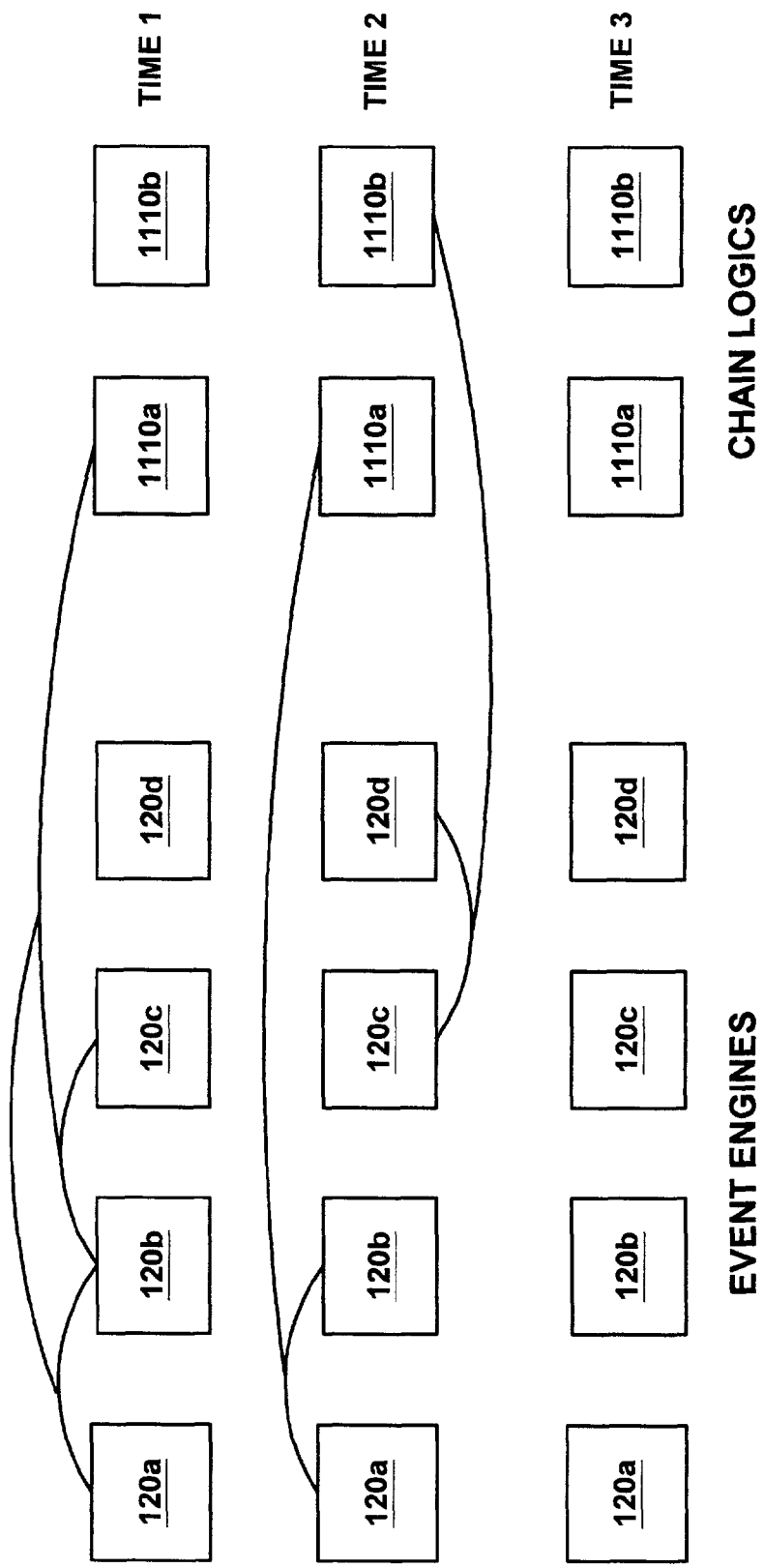
FIG. 18A is a diagram illustrating event engines chained in various execution schemes, according to embodiments of the present invention.

Embodiments that have at least one chain logic block 1110 for every two event engines 120 may configure the execution scheme of the event engines 120 in any fashion. Referring now to time 1 of FIG. 18A, the configuration may be a first chain logic block 1110a chaining a first group of event engines 120a, 120b, 120c while a second chain logic block 1110b does not chain any event engines 120. Event engine 120d may or may not be executing. Tables 1850-1870 of FIG. 18B illustrate the chain output signals 1125 that chain logic blocks 1110a and 1110b may output to event engines 120a-120d. As table 1850 shows, chain logic block 1110a may output to event engines 120a-120c the result of the Boolean expression for which it was configured to perform. It outputs a "1" to event engine 120d. Chain logic block 1110b outputs a "1" to event engines 120a-120d. In this fashion, chain logic block 1110b may have no effect on the event engines 120a-120d.

Referring again to FIG. 18A and now to time 2, the execution scheme may be the first and second chain logic blocks 1110a, 1110b chaining separate groups of event engines 120 (e.g., chain logic block 1110a chains event engines 120a and 120b, while chain logic block 1110b chains event engines 120c and 120d). Referring to table 1860 of FIG. 18B, chain logic block 1110a may output to event engines 120a and 120b a chain logic signal 1125 that may be equal to the Boolean expression (BE) it is configured to form at that time. Chain logic block 1110b may output to event engines 120c and 120d a chain logic signal 1125 that may be equal to the Boolean expression it is configured to form at that time. The chain logic blocks 1110a and 1110b output a "1" to other event engines 120 at this time.

Referring again to FIG. 18A, still another possibility is that neither the first nor the second chain logic block 1110a, 1110b chain the execution any of the event engines 120. For example, time 3 illustrates such a configuration, in which one or more of event engines 120a-120d are executing independently. Referring again to FIG. 18B, both chain logic blocks 1110*a*, 1110*b* may output chain logic signals 1125 of "1" to all event engines 120 at this time.

Another way of stating the execution scheme of the event engines 120 is that the chain logic blocks 1110 either configure the execution scheme of the event engines 120 to execute independently (e.g., as in time 3 of FIG. 18A) or the chain logic blocks 1110 configure at least two of the event engines 120 to execute together in a chain (e.g., as in times 1 and 2). When the execution scheme chains event engines 120, multitudes of possibilities exist. The states illustrated in FIG. 18A are not necessarily the states that each chain logic block 1110 and event engine 120 is presently in. Generally, not all event engines 120 and chain logic blocks 1110 will be in the same state. For example, during time 1 of FIG. 18, event engine 120*d* may be going through numerous states independently while event engines 120*a*-120*c* stay in their initial state until their condition is satisfied.

Embodiments of the present invention are well suited to other ratios of chain logic blocks 1110 to event engines 120 than a 1:2 ratio. Furthermore, embodiments may have many more then four event engines 120 and many more than two chain logic blocks 1110.

Referring now to Process 1900 of FIG. 19, an embodiment that provides a method of configuring event architecture 1700 will be described. In step 1910, data may be stored in the configuration RAM 110. The data to configure the chain logic 1710 may be formatted as illustrated FIG. 12, for example. The configuration of the chain logic 1710 may create the execution scheme (e.g., how the event engines 210 are chained, if at all). Thus, there may be a block in the configuration RAM 110 for each chain logic block 1110 for each state for which a given chain logic block 1110 is to be configured. The configuration RAM 110 may also be loaded with data such as illustrated in FIG. 6 or FIG. 9 to configure the execution of the event engines 210. The configuration of the event engines 210 may cause the event engines 210 to monitor for various conditions.

In step 1920, the chain logic 1710 may be configured with data from the configuration RAM 110 to configure the execution scheme of the event engines 120. The event engines 120 may be configured to execute independently or event engines 120 may be grouped into one or more chains. The event engines 120 may also be configured with data from the configuration RAM 110. The event engines 120 execute according to how they are configured to monitor conditions. As they detect conditions, they may output hit signals 325 and event engines 120 that are executing independently may proceed to further states, in which case they may be re-configured by additional data (e.g., a data block shown in FIG. 6 or FIG. 9) from the configuration RAM 110. However, this will not necessarily cause the configuration of the execution scheme of the event engines 120 to be altered. For example, event engines that were executing independently may continue to execute independently and those whose execution was chained may continue to execute in chained fashion.

In step 1930, the chain logic 1710 may be re-configured to implement a new execution scheme of the event engines 120, in response to one of the event engines 120 determining that a condition for which it was monitoring being satisfied. The event engine 120 may be one that whose execution was chained to another event engine 120. The re-configured execution scheme may take a number of forms. For example, if the original execution scheme had event engines 120 executing as a first chain, the re-configuration may be that at least one event engine 120 that constituted the first chain is to execute independently. In this case, the other event engines 120 in the first chain may form another chain, stop executing, execute independently, etc. Event engines 120 from the first chain forming a new chain may do so with only members of the first chain or with event engines 120 that were not part of the first chain.

The event engines 210 themselves may be re-configured as illustrated in steps 530-550 of FIG. 5 while the chain logic 1710 remains in the same configuration (e.g., while the execution scheme remains unchanged). Process 1900 may re-configure the execution scheme of the event engines 120 any number of times and in any fashion, as reflected in step 1940 by repeating step 1930. Eventually process 1900 may end when, for example, the chain logic 1710 does not need to be re-configured any more, based on data stored in the configuration RAM 110.

Figure 20:
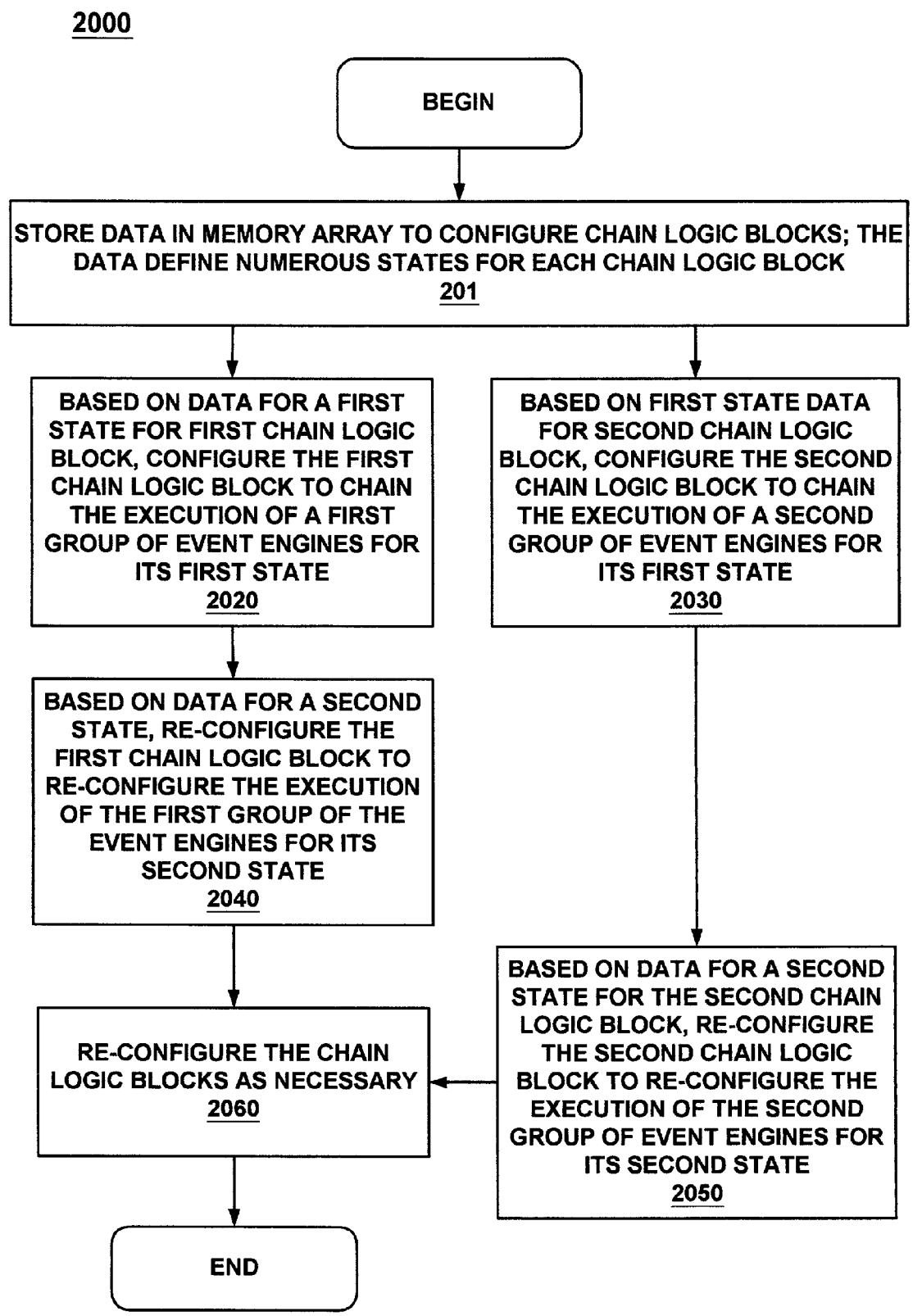
FIG. 20 is a flowchart illustrating a process of configuring event architecture, according to embodiments of the present invention.

FIG. 20 illustrates another embodiment for configuring event architecture 1700. In step 2010 of Process 2000, data may be stored in the configuration RAM 110. The data may comprise a block (e.g., as illustrated in FIG. 12) for each state for each chain logic block 1110. Not all chain logic blocks 1110 need to be used at the same time. An unused chain logic block 1110 may be configured to have no effect on the event engines 120.

In step 2020, a first chain or combinational logic 1110 may be configured to chain the execution of a first group of event engines 120 for the first state for this chain logic block 1110. The first state data for the first chain logic block 1110 may be for configuring the first chain logic block 1110 to output the result of a Boolean expression formed from input signals 325 from selected event engines 120. Therefore, step 2020 may further comprise configuring the first chain logic block 1110 to output the result of a first Boolean expression for the first state.

In step 2030, a second chain logic block 1110 may be configured to chain the execution of a second group of event engines 120 for the first state for the second chain logic block 1110. Steps 2020 and 2030 may be undertaken essentially simultaneously. The execution scheme may have other event engines 120 executing independent of the two chains described in step 2020 and 2030. Step 2030 may further comprise configuring the second chain logic block 1110 to output the result of a second Boolean expression for the first state.

Step 2030 may further comprise outputting the result of the first and second Boolean expression from the first and second combinational logics 1110 to the first and second groups of event engines 120, wherein the first group of event engines 120 are chained by the first Boolean expression and the second group of event engines 120 are chained by the second Boolean expression.

In step 2040, the first chain logic block 1110 is re-configured to, in turn, re-configure the execution scheme of the first group of the event engines 210. This may be termed a second state of the first chain logic block 1110. The reconfiguration of the first group of event engines 120 may comprise: re-configuring at least one event engine 120 of the first group to run independently, forming a third chain comprising at least one event engine 120 from the first event engines 120 and at least on event engine 120 that is not one of the first event engines 120, etc.

Step 2040 may further comprise re-configuring the first combinational logic 1110 to output the result of a third Boolean expression for its second state. Step 1940 may further comprise outputting the result of the third Boolean expression to the third group of event engines 120, wherein the third group of event engines 120 is chained by the third Boolean expression. It is also possible that multiple combinational logics 1110 are re-configured at this time. However, it is not required that more than one chain logic block 1110 be reconfigured at a time. In this fashion, the chain logic blocks 1110 do not necessarily step through their states in lock-step. However, embodiments do allow for lock-step operation.

In step 2050, the second chain logic block 1110 may be re-configured to alter the execution scheme. For example it may alter the way the second group of event engines 210 are chained. This may be termed a second state of the second chain logic block 1110. The re-configuration of the second group of event engines 120 may comprise: re-configuring the second combinational logic 1110 to chain the execution of a fourth group of the event engines 210 for the second state, wherein the fourth group comprises a different set of event engines 210 than the second group; re-configuring the second combinational logic 1110 to not chain the execution of any group of the event engines 210 for the second state, wherein only the first combinational logic 1110 chains the execution of the event engines 210; re-configuring the first and second combinational logics 1110 to not chain the execution of any group of the event engines 210 for the second state, wherein the event engines 210 execute independently, etc.

Each combinational logic 1110 may be re-configured as often as desired, as represented by step 2060. When no more reconfigurations are needed, as defined by the data in the configuration RAM 110, the process 2000 may end. Process 2000 may be modified to provide for additional combinational logics 1110.

External Interface to Event Architecture

Embodiments of the present invention provide external pins to a device that comprises the event architecture 1700, such that the event engines 120 may detect events external to the device. In addition, embodiments may be able to detect events that may be termed to occur within a device that houses the event architecture 1700. Furthermore, embodiments provide one or more external output pins, such that the event engines 120 may output signal(s) in response to events being detected. These events may be either internal or external to the device housing the event architecture 1700.

Figure 21:
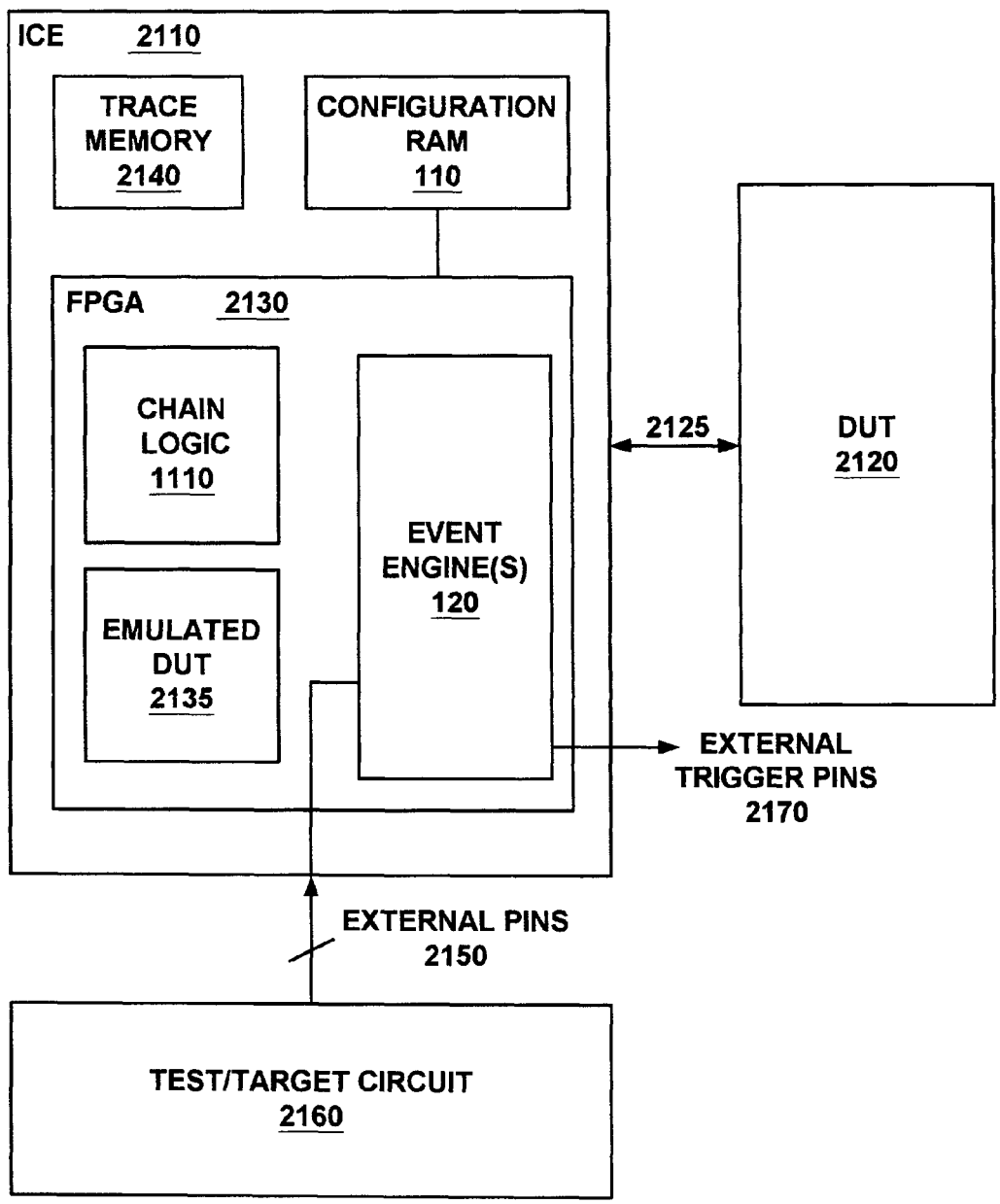
FIG. 21 is a block diagram illustrating an in-circuit emulator coupled to other devices, according to embodiments of the present invention.

FIG. 21 illustrates an embodiment in which the event architecture 1700 resides in an in-circuit emulator (ICE) 2110. The system 2100 of FIG. 21 comprises an ICE 2110, which may be able to emulate a device under test 2120. The device under test 2120 may be a microcontroller; however, the present invention is not limited to testing microcontrollers. For example, the device under test 2120 may be a digital signal processor or another device. Thus, the ICE 2110 may emulate a microcontroller, with which it may interface via interface 2125. However, the present invention is not limited to emulating microcontrollers. The ICE 2110 may implement an emulated version 2135 of the device under test 2120 in the Field Programmable Gate Array (FPGA) 2130; however, the present invention is not limited to emulating the device under test 2120 in an FPGA 2130. The Verilog™ description language may be used to facilitate the implementation.

Using an example in which the device under test 2120 is a microcontroller, the FPGA 2130 may emulate core processor functionality of the microcontroller, such as, for example, microprocessor functions, Arithmetic Logic Unit functions, and RAM and ROM functions. However, the present invention is not limited to emulating core processor functions. The emulated device under test (DUT) 2135 may operate substantially analogously to the microcontroller or other DUT 2120. Emulating the microcontroller in the ICE 2110 may provide significant advantages, such as, for example, providing debugging tools, which may include readout of registers and memory locations, for example. Thus, the amount of debugging support that is built into the device under test 2120 (e.g., a microcontroller) may be minimized. However, information may be passed between the ICE 2110 and the microcontroller via interface 2125, for example, I/O read information, interrupt vectors, etc. may be passed over interface 2125 to the ICE 2110.

A device that provides an in-circuit emulator 2110 is described in co-pending U.S. patent application Ser. No. 09/975,030, filed Oct. 10, 2001, entitled "EMULATOR CHIP/BOARD ARCHITECTURE AND INTERFACE," by Snyder et al., Now U.S. Pat. No. 7,076,420 and assigned to the assignee of the present invention, which is hereby incorporated by reference.

The FPGA 2130 may also comprise portions of the event architecture 1700. For example, the chain logic 1110 and the event engines 120 may reside in the FPGA 2130. The configuration RAM 110, which may also form a portion of the event architecture 1700, may reside in the ICE 2110 and be coupled to the FPGA 2130. The ICE 2110 may further comprise trace memory 2140, which may store information when the trace is on.

Still referring to FIG. 21, the ICE 2110 may have a number of external pins 2150 that may allow it to receive signals from an external device. The external pins 2150 may couple to the event engines 120 such that external events may be monitored. For example, in FIG. 21, the external pins 2150 may be coupled to a test/target circuit or circuit under test 2160. For example, the circuit under test 2160 may be a motor controller; however, this example is not limiting. The external pins 2150 may be used to monitor signals from the circuit under test 2160. Thus, in one embodiment, the external pins 2150 may function analogously to logic channels on a logic analyzer. However, unlike a conventional logic analyzer, embodiments of the present invention may react on a state-by-state basis to external events and change the configuration of the event engines 120 not only to look for different events on the external pins 2150, but also to look for different events that occur inside the ICE 2110. In another embodiment, the circuit under test 2160 may be replaced by a logic analyzer board.

In one embodiment, the signals on the external logic pins 2150 are automatically fed into the trace memory 2140 of the ICE 2110. Therefore, the state of events external to the ICE 2110 may be correlated to the state of events inside the ICE 2110. For example, the state of a device or circuit outside (e.g., circuit under test 2160) the ICE 2110 may be correlated to a portion of the code running when external events trigger.

Still referring to FIG. 21, the ICE 2110 may also include an external trigger pin 2170, which may be fed the output signal 115*a* from the external trigger logic 820 shown in FIG. 7. The ICE 2110 may have multiple external trigger pins 2170. Thus, one or more external devices may be controlled in response to the detection of events being monitored. For example, an event engine 120 may monitor for the program counter being in a certain range, and in response to the detection of that event, outputting a signal 115*a*, which may trigger an oscilloscope to capture data related to a circuit or device under test. While the external interface pins 2150, 2170 have been described as input or output pins, it will be clear to those of ordinary skill in the art that a pin may serve as both input and output.

By being able to monitor both internal events and external events, as well as being able to emulate a device under test 2120 and control devices with external trigger signal(s), embodiments of the present invention are able to provide the functionality of both an ICE 2110 and a logic analyzer. However, the example illustrated in FIG. 21, in which the device comprising event architecture 1700 with external interfaces is an ICE 2110, is not limiting. Embodiments of the present invention are well suited to other devices with external interfaces hosting the event architecture 1700. Furthermore, coupling the external pins 2150 to a circuit under test 2160 is not limiting; embodiments of the present invention are well suited to receiving signals from other devices via the external pins 2150.

Referring again to the embodiment illustrated in FIG. 4, the multiplexer 410 receives a number of signals 105, some of which may originate from within the device that houses the event architecture 1700 (e.g., the program counter, accumulator, etc.). However, the multiplexer 410 may also receive signals 105 that originate from outside the device that houses the event architecture 1700. For example, external logic pin signals 415 may originate from outside the device and may be received by the physical external pins 2150. Furthermore, some signals 105 may originate from the device under test 2120, such as a microcontroller. For example, I/O signals may originate from a microcontroller, although the present invention is not so limited. As discussed herein, the multiplexer 410 may be used to select which signals 105 are to be monitored for the occurrence of events or for conditions being satisfied.

Figure 22:
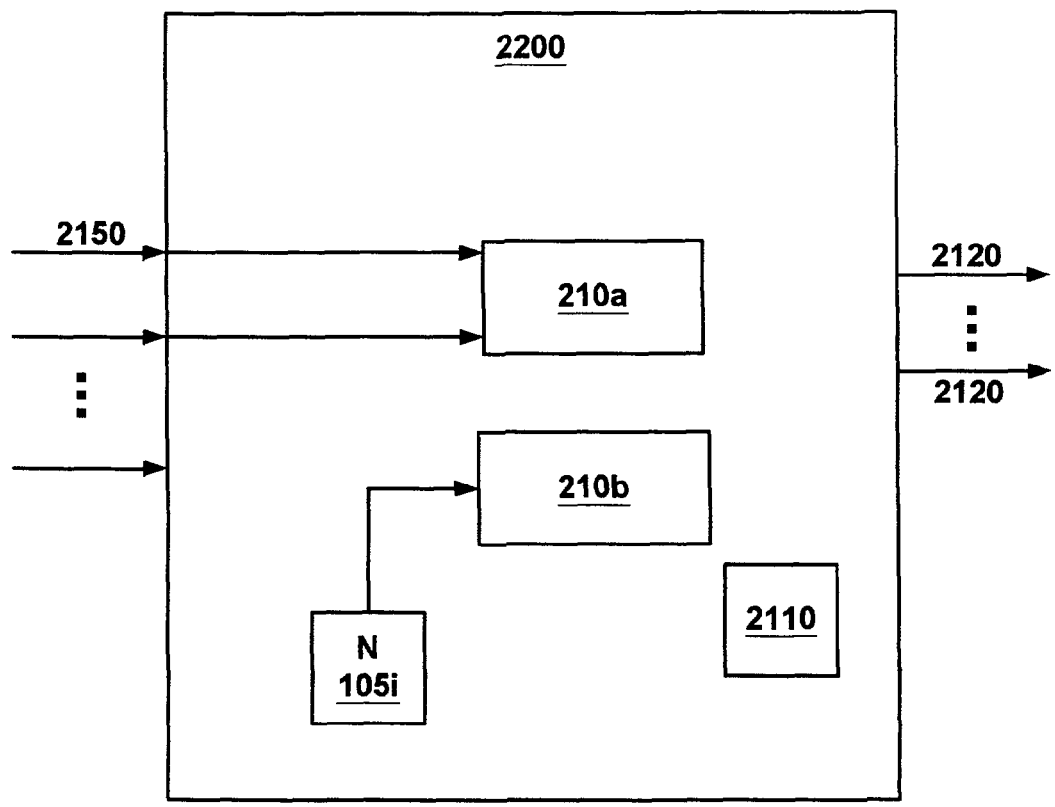
FIG. 22 is a block diagram illustrating a device having event engines, external input pins, and external output pins, according to embodiments of the present invention.
Figure 23:
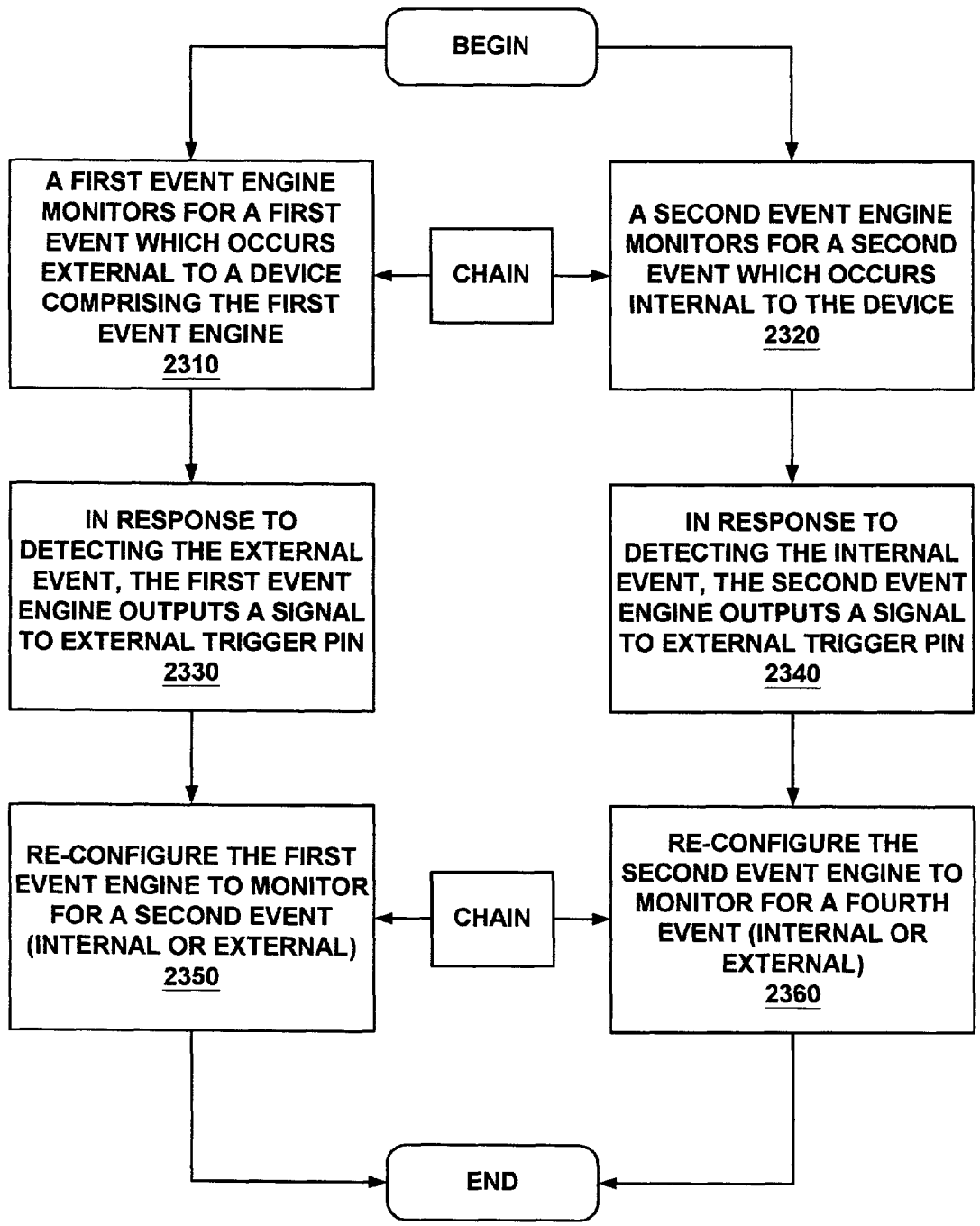
FIG. 23 is a flowchart illustrating steps of a process of monitoring events, according to embodiments of the present invention.

As discussed herein, the device housing the event architecture 1700 may have any number of external interface pins 2150, 2170 and may monitor both internal and external events. By internal events, it may be meant that the events are related to the operation of the emulated DUT 2135 in the FPGA 2310. By external events, it may be meant that the events relate to information received on external interface pins 2150. However, the present invention is not limited to monitoring only such events. For example, the ICE 2110 may receive information from the device under test 2120 (e.g., a microcontroller) via interface 2125. The block diagram of FIG. 22 and the Process 2300 of FIG. 23 will now be discussed. In step 2310, a first event engine 210a monitors for a first event that occurs external to a device 2200 comprising the first event engine 210a. The event engine 210a may select one or more external logic pins 2150 as discussed herein.

In step 2320, a second event engine 210b monitors for a second event that occurs internal to the device 2200, which also comprises the second event engine 210b. In so doing, the second event engine 210b may select a signal 115, such as, for example, the value of the program counter (see, e.g., FIG. 4, FIG. 6, FIG. 9, and their associated descriptions). The second event engine may also receive the information relating to the program counter from a microcontroller under test via the interface 2125. The execution of the first and second event engines 210a, 210b may be chained by one or more chain logic blocks 1110 as discussed herein; however, they may also execute independently.

The device housing the event engines 210 may also be performing emulation. For example, the ICE 2110 may be emulating a device under test 2120. In this case, the signal 105 that is input to the event engine 210 may be a signal 105 related to the emulated DUT 2135. However, the signal 105 may also originate from an actual DUT 2120, for example a microcontroller.

In step 2330, the first event engine 210a may output a trigger signal(s) 115a on one or more of the external trigger pins 2170, in response to the external event for which it was monitoring being detected.

In optional step 2340, the second event engine 210b may output a trigger signal(s) 115a on one or more of the external trigger pins 2170, in response to the internal event for which it was monitoring being detected. Thus, trigger signals 115a may be issued based on internal or external events. Also, the device 2200 housing the event architecture may have any number of external trigger pins 2170.

In step 2350, the first event engine 210a may be re-configured to monitor for a third event, which may be an internal or an external event. Thus, the first event engine 210a may input any of the internal signals 105i or any of the signals from the external logic pins 2150.

In step 2360, the second event engine 210a may be re-configured to monitor for a fourth event, which may be an internal or an external event. Thus, the second event engine 210b may input any of the internal signals 105i or any of the signals from the external logic pins 2150. Process 2300 may then end. Additional steps may be inserted in Process 2300 such as, for example, steps for monitoring for additional events, etc.

Process 2300 may be modified to execute only selected steps thereof, such as, for example, not performing step 2310 of monitoring for external events. Thus, embodiments provide for a process in which an event engine 210 outputs an signal 115a on an external trigger pin 2170, in response to internal events only, as illustrated in steps 2320 and 2340.

The preferred embodiment of the present invention, an interface for event architecture, is thus described. While the present invention has been described in particular embodiments, it should be appreciated that the present invention should not be construed as limited by such embodiments, but rather construed according to the below claims.

What is claimed is:

1. A device comprising:
a programmable event engine for executing an event thread and further for detecting events in accordance with a plurality of programmable states of said event thread;
a memory coupled to said event engine and for storing said plurality of programmable states of said event thread, wherein said plurality of programmable states are for re-configuring said event engine in response to detecting one of said events during execution of said event thread, and wherein said re-configuring said event engine comprises changing at least one condition used by said event engine to detect said events; and
wherein said event engine is further for monitoring a first signal on a first external pin, wherein said event engine is further operable to detect a first event in accordance with a first programmable state of said plurality of programmable states, wherein said event engine is further operable to change from operation in accordance with the first programmable state to operation in accordance with a second programmable state of said plurality of programmable states in response to detecting the first event, wherein said event engine is configured to change from operation in accordance with the first programmable state to operation in accordance with a second programmable state by loading data from the memory, wherein said event engine is further operable to detect a second event when operating in accordance the second programmable state, and wherein said event engine is further operable to detect said first and second events contemporaneously with said execution of said event thread, and
wherein said event engine is further operable to generate an output signal in response to detection of said first event.

2. The device of claim 1, wherein said output signal is a trigger signal.

3. The device of claim 1 further comprising:
a logic component coupled to said memory and for implementing at least one of said plurality of programmable states.

4. The device of claim 1, wherein said event engine is further operable to monitor a second signal on a second external pin, and wherein said first event comprises a multi-signal external event associated with said first signal and said second signal.

5. The device of claim 1, wherein said event engine is further operable to monitor a second signal on a second external pin, wherein said first event comprises a signal-specific external event associated with said first signal, and wherein said second event comprises a signal-specific external event associated with said second signal.

6. The device of claim 1, wherein said event engine is further operable to access at least one internal signal originating from within said device, and wherein said event engine is further for monitoring said at least one internal signal and further for detecting at least one event associated with said at least one internal signal.

7. The device of claim 6, wherein said internal signal is related to an emulated device under test.

8. The device of claim 7, wherein said device is an in-circuit-emulator (ICE).

9. The device of claim 8, wherein said first external pin is for coupling to a circuit under test.

10. The device of claim 1, further comprising:
an additional event engine for detecting said events, wherein said device comprises a plurality of event engines; and
wherein said additional event engine is coupled to a plurality of internal signals originating from within said device, and wherein said additional event engine is for monitoring at least one of said internal signals to detect internal events of said events.

11. The device of claim 10, wherein said device is operable to emulate a device under test, and wherein said plurality of internal signals comprise information related to emulation of said device under test.

12. The device of claim 11, further comprising:
at least one chain logic block for implementing an execution scheme of said plurality of event engines.

13. An event architecture device with external interface, said event architecture device comprising:
a programmable event engine for detecting events based upon an execution of an event thread;
a memory coupled to said event engine and for storing data for programming said event engine to detect said events, wherein said data comprises a plurality of programmable states of said event thread, and wherein said plurality of programmable states are for re-configuring said programmable event engine in response to detecting one of said events during execution of said event thread, and wherein said reconfiguring said programmable event engine comprises changing at least one condition used by said programmable event engine to detect said events;
an external pin coupled to said event engine; and
wherein said event engine is further for outputting a signal on said external pin in response to detecting a first event of said events, and wherein said event engine is configured to change from operation in accordance with a first programmable state to operation in accordance with a second programmable state by loading data from the memory.

14. The device of claim 13 further comprising:
at least one additional external pin coupled to said event engine; and
wherein said event engine is further for outputting a signal on at least one external pin in response to detecting a second event of said events, wherein said at least one external pin is selected from a group consisting of said external pin and said at least one additional external pin.

15. The device of claim 13 further comprising:
an additional event engine for detecting said events and coupled to said memory; and wherein said additional event engine is for outputting a signal on said external pin in response to detecting said second event of said events.

16. The device of claim 15 further comprising:
at least one chain logic block for implementing an execution scheme of plurality of event engines.

17. The device of claim 13, wherein said device is operable to emulate a device under test, and wherein said events comprise information related to said device under test.

18. The device of claim 17, wherein said information is further related to emulation of said device under test.

19. A method of monitoring events, said method comprising:
monitoring a first pin using a first programmable event engine, wherein said first pin provides an external interface to a device comprising said first programmable event engine;
detecting, using said first programmable event engine, a first event on said first pin in accordance with a first programmable state of an event thread;
outputting a signal from said first programmable event engine in response to said detecting said first event; and
in response to detecting the first event, re-configuring said first programmable event engine to monitor for a second event in accordance with a second programmable state of said event thread, wherein said re-configuring said first programmable event engine further comprises changing at least one condition used by said first programmable event engine to monitor for said second event, and wherein said re-configuring said first programmable event engine further comprises loading data from a memory coupled to said first programmable event engine to change from operation in accordance with said first programmable state to operation in accordance with said second programmable state.

20. The method of claim 19, wherein said outputting said signal comprises outputting said signal from said first programmable event engine to a second pin providing an external interface to said device.

21. The method of claim 20, wherein said outputting said signal further comprises triggering a device external to said device.

22. The method of claim 19 further comprising:
monitoring for a third event which occurs internal to said device using a second programmable event engine, wherein said device monitors for both internal and external events, wherein said third event is related to operation of an emulated device under test.

23. The method of claim 22 further comprising:
emulating a device under test.

24. The method of claim 23, wherein said monitoring for said third event comprises monitoring a signal comprising information related to emulation of said device under test using said second programmable event engine.

25. The method of claim 22 further comprising:
re-configuring said second programmable event engine to monitor for a fourth event.

26. The method of claim 25 further comprising:
chaining the execution of said first and second event engines, wherein said device is operable to correlate said external event and said internal event.

27. A method comprising:
detecting the occurrence of a first condition using a first programmable event engine, wherein said detecting further comprises detecting occurrence of said first condition in accordance with a first programmable state of an event thread;
in response to detecting said first condition, outputting a signal from said first programmable event engine to a pin providing an external interface to a device comprising said first programmable event engine; and
in response to detecting occurrence of said first condition, re-configuring said first programmable event engine, in accordance with a second programmable state of said event thread, to detect the occurrence of a second condition, wherein said re-configuring comprises loading data from a memory coupled to said first programmable event engine to change from operation in accordance with said first programmable state to operation in accordance with said second programmable state.

28. The method of claim 27, wherein said outputting said signal further comprises triggering a device external to said device comprising said first programmable event engine.

29. The method of claim 27 further comprising:
emulating a device under test.

30. The method of claim 29, wherein said detecting further comprises monitoring a signal comprising information related to emulation of said device under test using said first programmable event engine.

* * * * *